(12) United States Patent
Quesada Saborio

(10) Patent No.: US 7,921,659 B2
(45) Date of Patent: Apr. 12, 2011

(54) TRANSPORT REFRIGERATION SYSTEM

(76) Inventor: Carlos Quesada Saborio, San José (CR)

(*) Notice: Subject to any disclaimer, the term of this patent is extended or adjusted under 35 U.S.C. 154(b) by 0 days.

(21) Appl. No.: 12/590,473

(22) Filed: Nov. 9, 2009

(65) Prior Publication Data

US 2010/0058791 A1    Mar. 11, 2010

Related U.S. Application Data

(63) Continuation of application No. 12/214,403, filed on Jun. 18, 2008, now Pat. No. 7,614,242, which is a continuation of application No. 11/286,150, filed on Nov. 23, 2005, now abandoned.

(60) Provisional application No. 60/629,887, filed on Nov. 23, 2004.

(51) Int. Cl.
*B60H 1/32* (2006.01)

(52) U.S. Cl. .................. 62/77; 62/239; 62/298

(58) Field of Classification Search .......... 62/239, 62/285, 298, 77
See application file for complete search history.

(56) References Cited

U.S. PATENT DOCUMENTS

| | | | | | |
|---|---|---|---|---|---|
| 4,736,597 | A | * | 4/1988 | Anderson et al. | 62/239 |
| 4,949,554 | A | * | 8/1990 | Branz et al. | 62/248 |
| 5,182,922 | A | * | 2/1993 | Allread et al. | 62/239 |
| 5,609,037 | A | * | 3/1997 | Fischler | 62/239 |
| 6,279,334 | B1 | * | 8/2001 | Ishikawa et al. | 62/239 |

* cited by examiner

*Primary Examiner* — William E Tapolcai
(74) *Attorney, Agent, or Firm* — James Creighton Wray

(57) ABSTRACT

Self-contained refrigeration units include evaporator modules, condenser modules, compressor modules, control subassemblies, and all other refrigeration components in compact interconnected modular packages. The modules, which are assembled in rigid or flexible self-contained monoblock refrigeration units, are installable, removable and replaceable as complete self-contained refrigeration units without requiring transport downtime for servicing and repairing of the refrigeration units. Vehicles with refrigeration systems arrive at a distributor and have malfunctioning units removed and complete units replaced and installed and are back on the road within minutes. Dealers' inventories are small and non complex and dealers' workers need not be skilled transport refrigeration mechanics. Dealer trucks have light cranes to remove and replace complete self-contained refrigeration units on site.

25 Claims, 61 Drawing Sheets

TITLE
COMPREHENSIVE TRANSPORT REFRIGERATION SYSTEM
COMPRISING A:
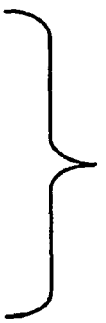
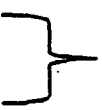
FIG. 1

COMPREHENSIVE TRANSPORT REFRIGERATION SYSTEM
COMPRISING A:
COMPACT
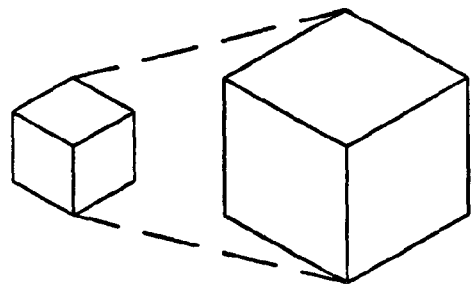
SELF-CONTAINED
REMOVABLE
FIG. 2
MODULAR
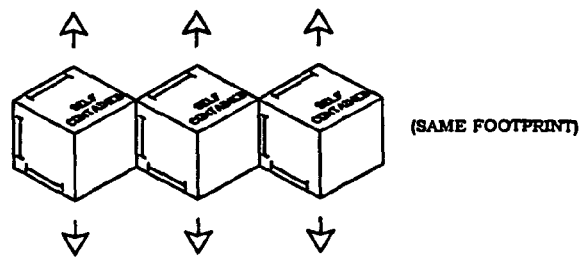
(SAME FOOTPRINT)

FLEXIBLE
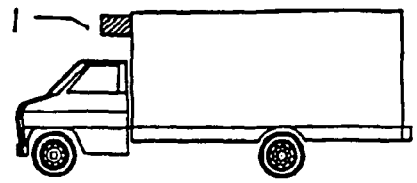
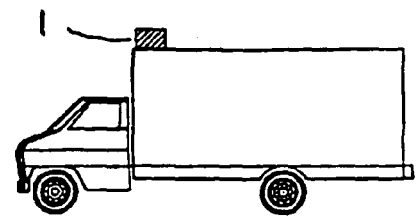
FIG. 3
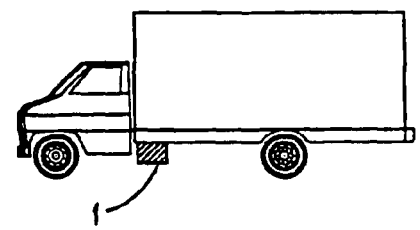
VARIABLE CAPACITY
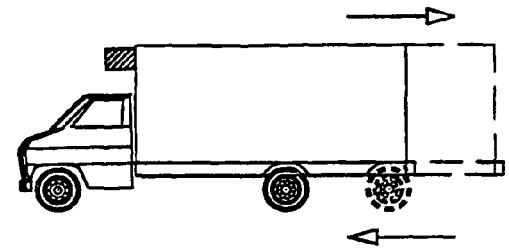
FULL TEMPERATURE RANGE
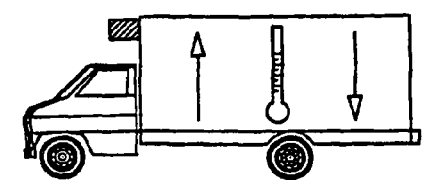

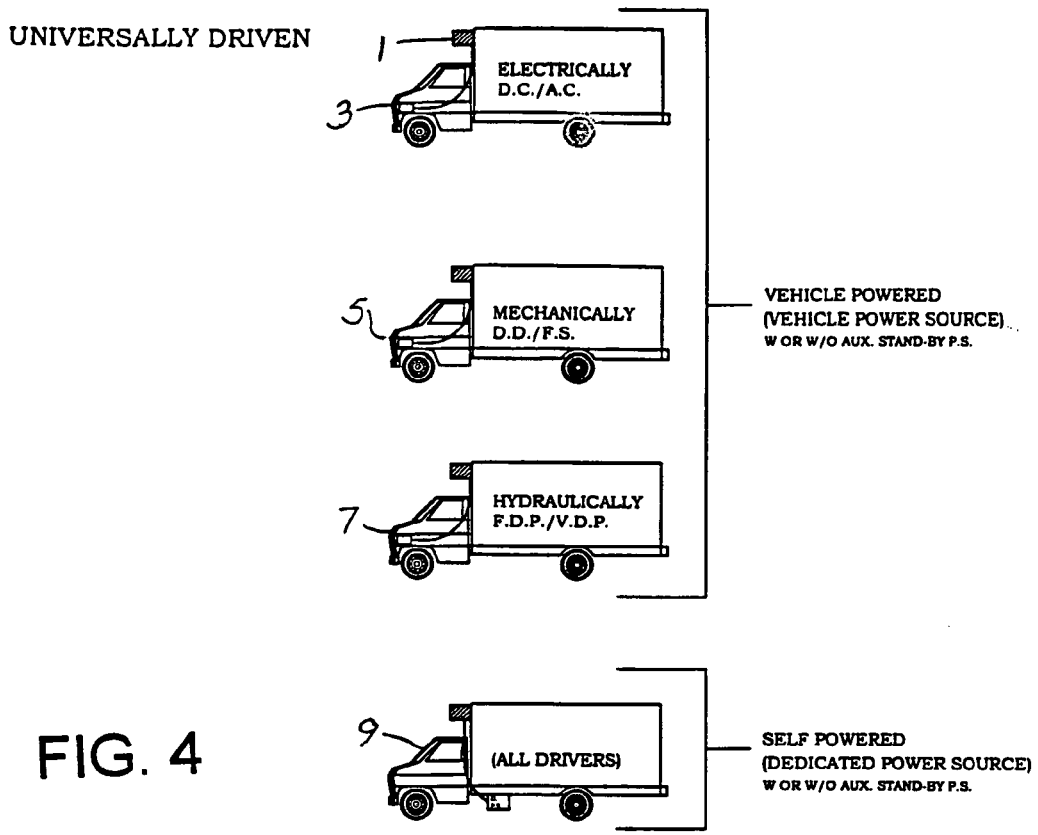
FIG. 4
TRANSPORT REFRIGERATION UNIT
FIG. 5
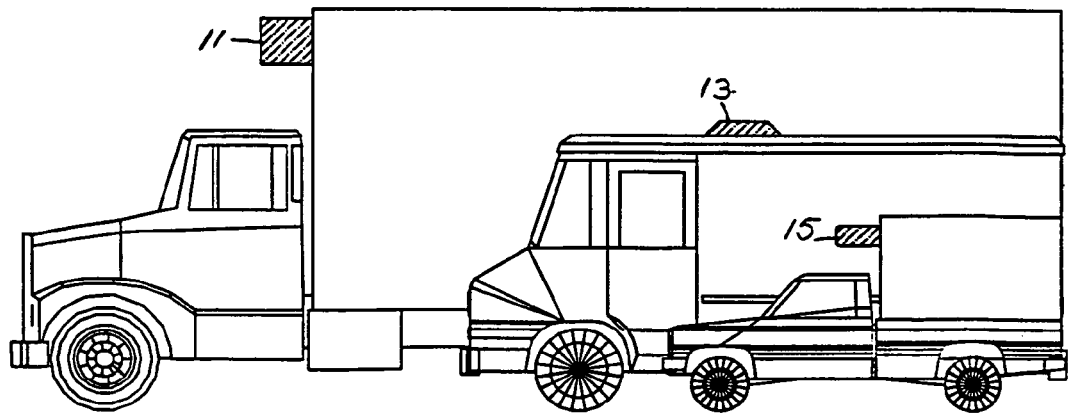

COMPREHENSIVE TRANSPORT REFRIGERATION SYSTEM

COMPRISING A:

I. VARIABLE OUTPUT

TRANSPORT REFRIGERATION SYSTEM

WITH A

II. FLEXIBLE

TRANSPORT REFRIGERATION HOUSING

AND

III. UNIVERSAL COMPATIBILITY WITH ALL

TRANSPORT REFRIGERATION DRIVERS

FIG. 6

TRANSPORT REFRIGERATION
(VARIABLES)

I. CAPACITY (CONTAINER VOLUME)
- MINI - SMALL TRUCKS
- MEDIUM - LARGE TRUCKS  (REFRIGERATION CAPACITY)
- TRAILERS

II. TEMPERATURE (CONTAINER TEMP.)
- FRESH (35° F)
- FROZEN (0° F)
- DEEP FROZEN (-20° F)   (TEMPERATURE CONTROL)
- OPTIONAL HEAT.

} REFRIGERATION SYSTEM

III. HOUSING CONFIGURATION & UNIT MOUNTING LOCATION
- SPLIT
- MONOBLOCK

FRONTMOUNT
  ROOFTOPMOUNT    (HOUSING CONFIGURATION)
  UNDERMOUNT

IV. CONTAINER CONFIGURATION
- SINGLE COMPRATMENT
- MULTIPLE COMPARTMENT   (REFRIGERATION UNITS ARRANGEMENTS)

} REFRIGERATION HOUSING

V. POWER SOURCE
- SELF POWERED
- VEHICLE POWERED   (POWER SOURCE & OPTIONS)
- W OR W/O OPTIONAL STAND BY POWER SOURCE

VI. DRIVER
- MECHANIC (DIRECT DRIVE)  FLEXIBLE SHAFT (DRIVER)
- HYDRAULIC (F.D.P./V.D.P.)
- ELECTRIC    D.C.   - 12V     A.C.  - 115V/60Hz/1PH
                     - 24V           - 230V/50Hz/1PH
                     - 48V           - 230V/60Hz/1PH
                                     - 230V/50Hz/3PH
                                     - 230V/60Hz/3PH
                                     - 400V/50Hz/3PH

} REFRIGERATION POWER SOURCE & DRIVER

FIG. 8

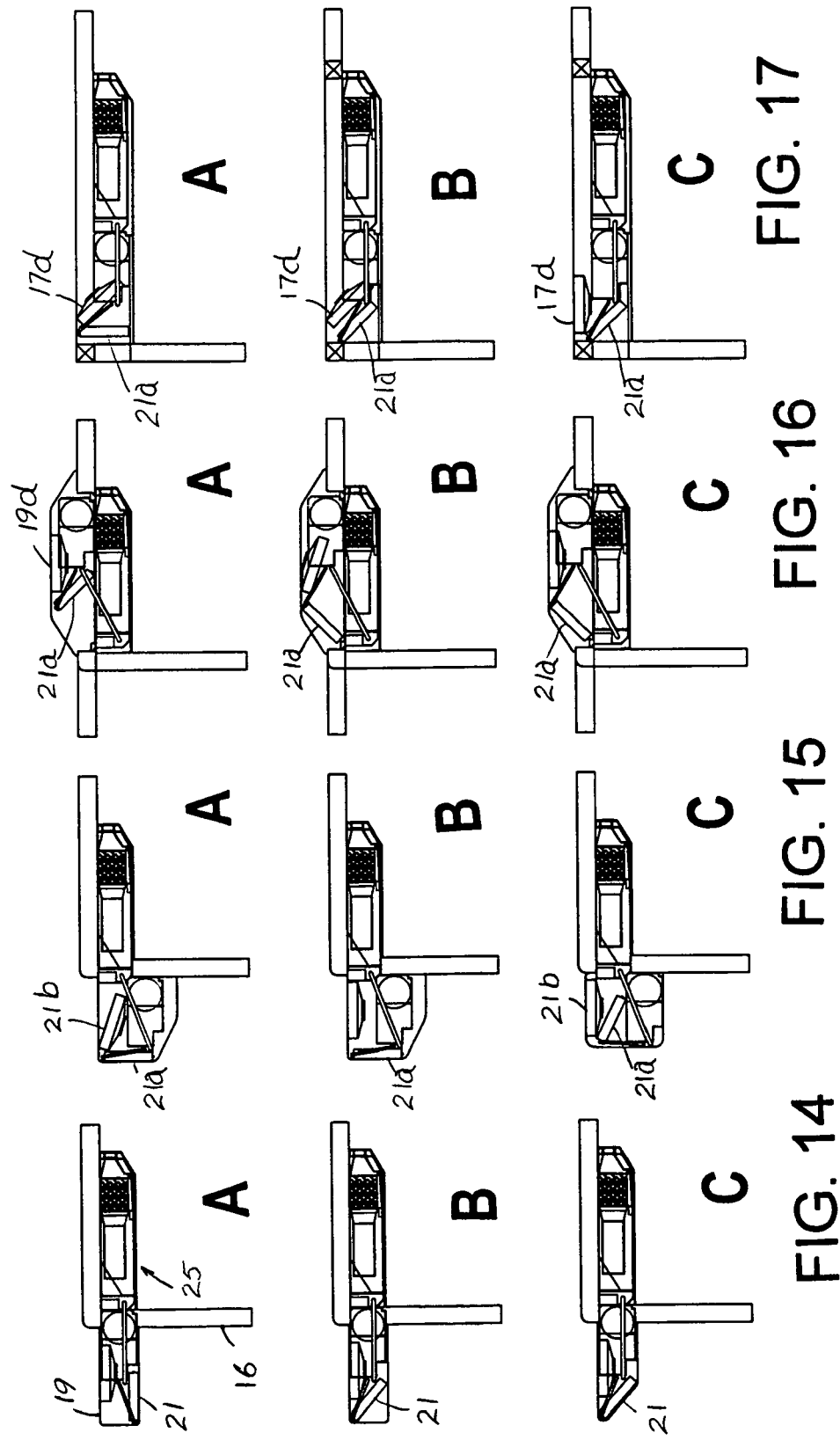

RIGID MONOBLOCK CONFIGURATION

RIGID TUBE JOINTS ALL OVER

LIFTABLE COND. MODULE MECHANISM

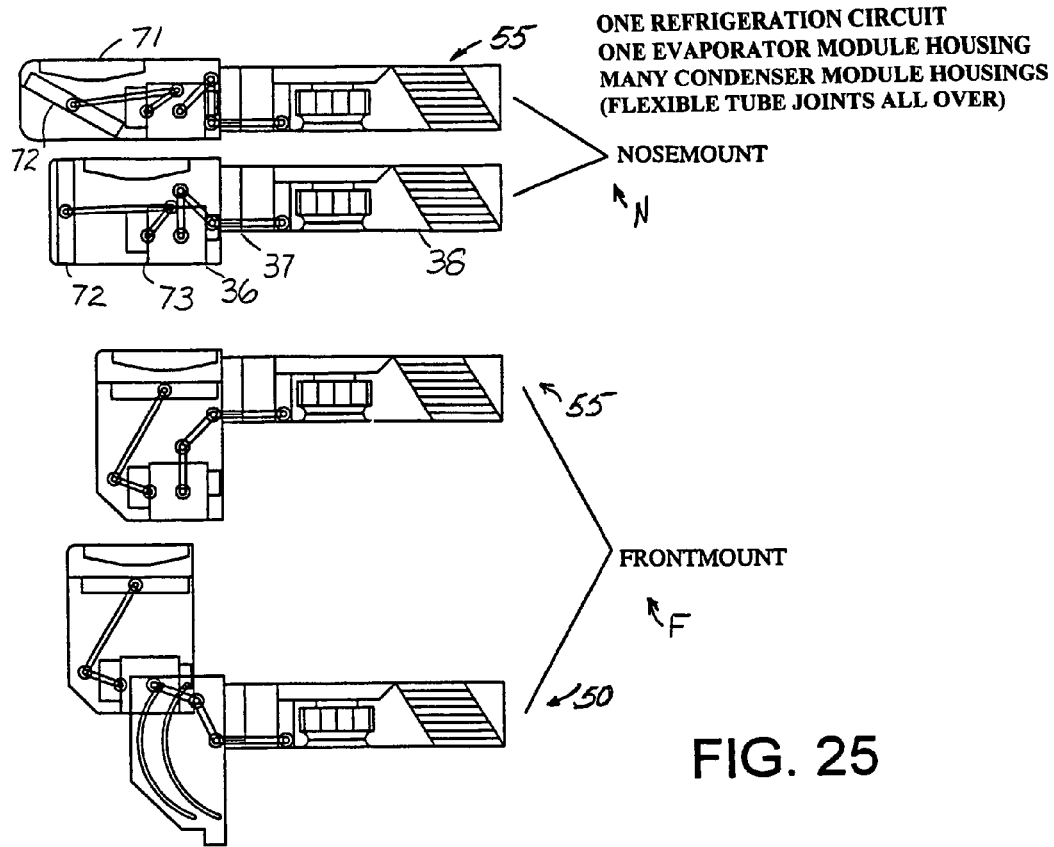
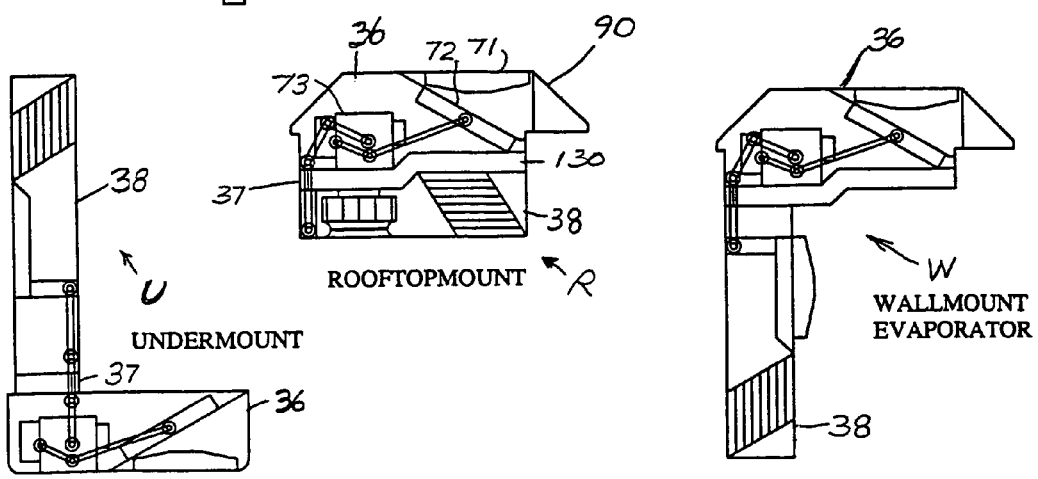
FIG. 25

SOME FLEXIBLE-MONOBLOCK CONFIGURATIONS   FIG. 26
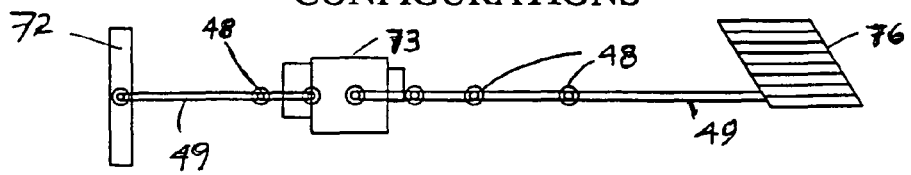
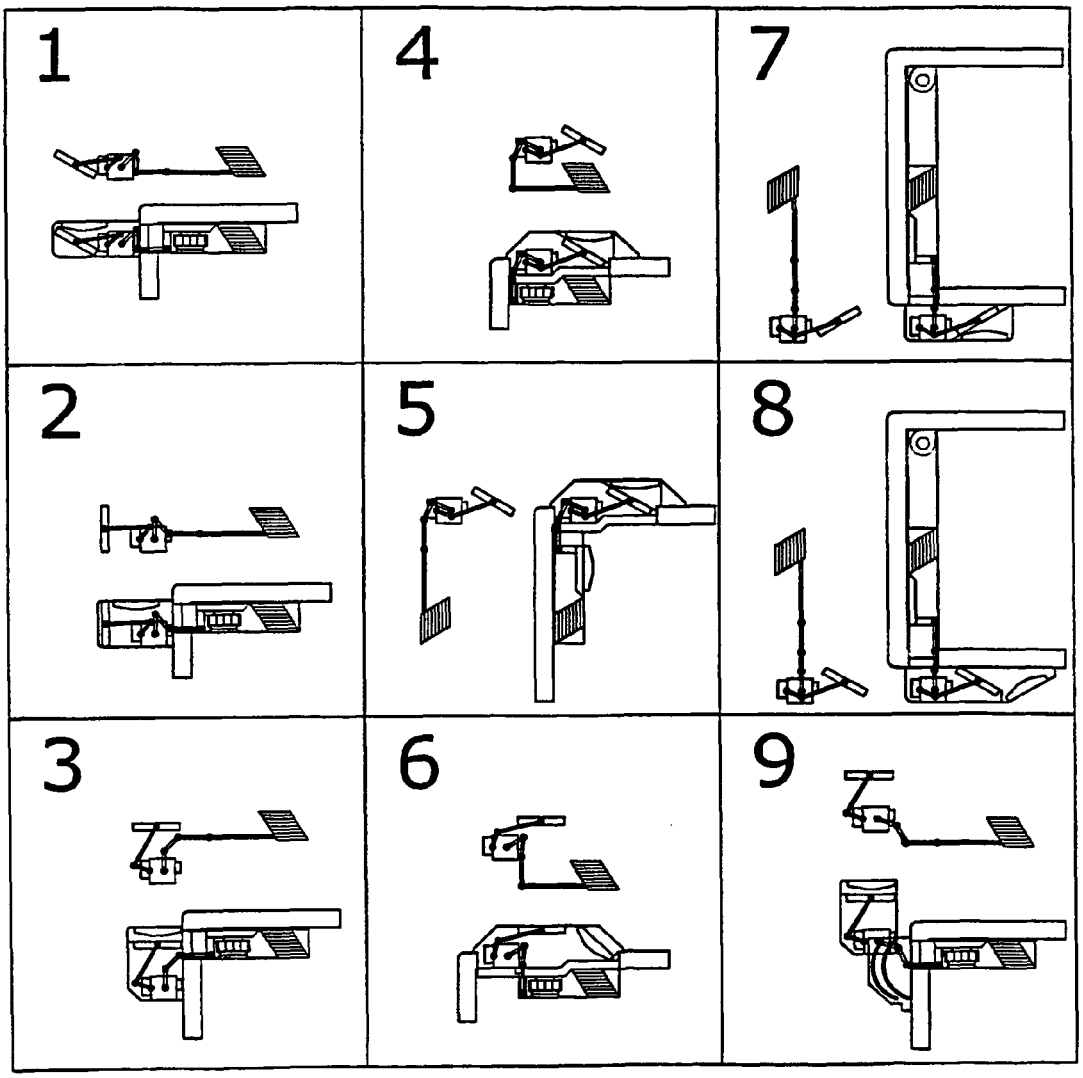

FLEXIBLE MONOBLOCK
(LAYOUT)

Universal Power Source & Drive Unit

Universal Power Source & Drive Unit

COND. MODULES LIDS

COND. MODULES LIDS

EVAPORATOR MODULE
one main chassis - many lid options

FIG. 35
EVAPORATOR FAN ACCESS
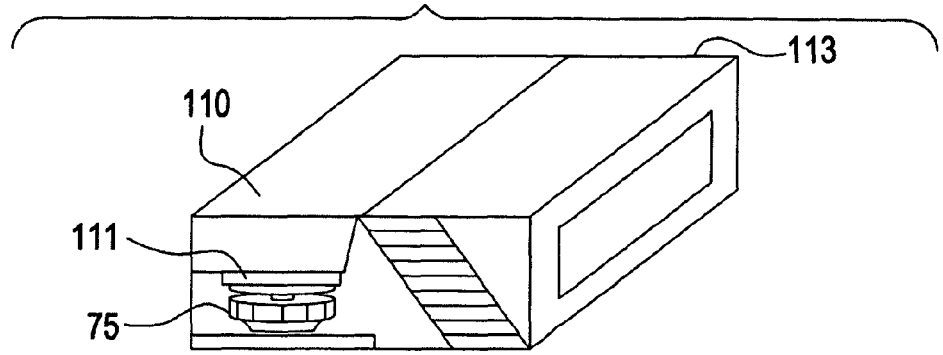
OUTSIDE ACCESS
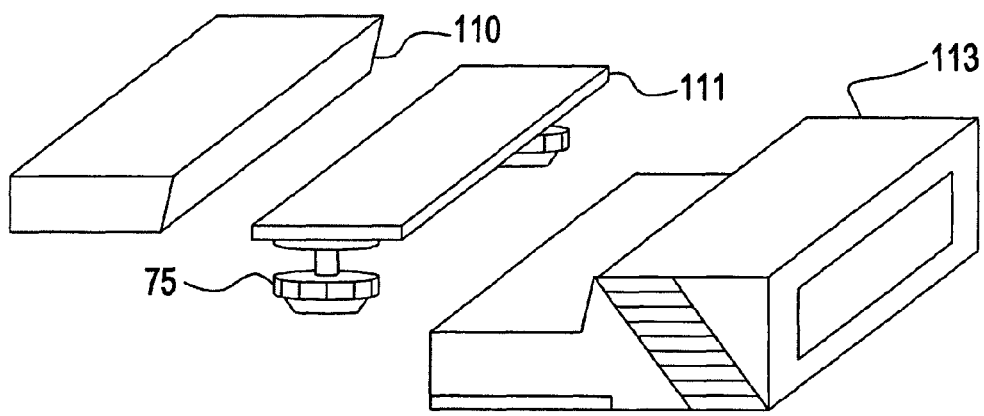
INSIDE ACCESS
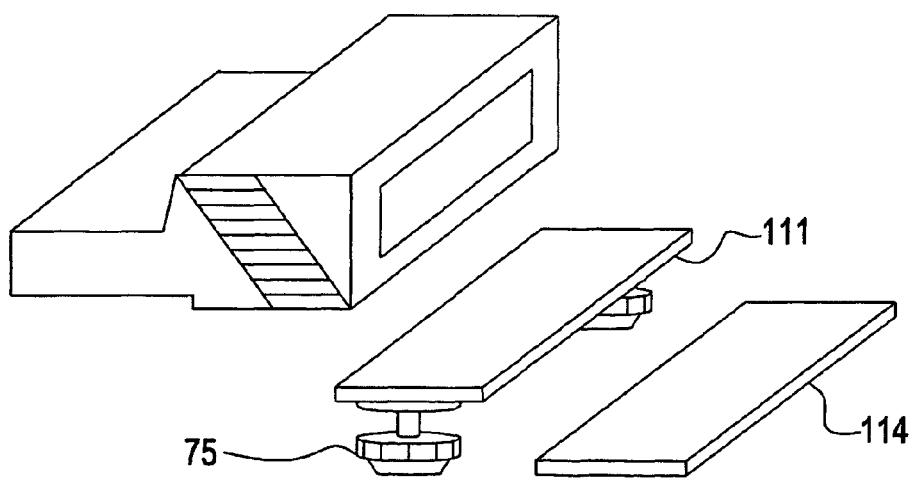

EVAPORATOR LAYOUT

EVAPORATOR LAYOUT

PLUG and PLAY
COVER CONCEPT

PLUG and PLAY
COVER CONCEPT

Air Circulation Openings

SOME PLUG and PLAY
CONFIGURATION (COVERS CONCEPT)

OUTSIDE SHELL-COVER CONCEPT

FLEXIBLEIBLE MONOBLOCK "CUSTOM MADE"

STAND - BY OPTIONS

EVAPORATOR MODULE WITH BLOWER HOUSING

Evaporator Module with Blower-Fan and Fan Housing

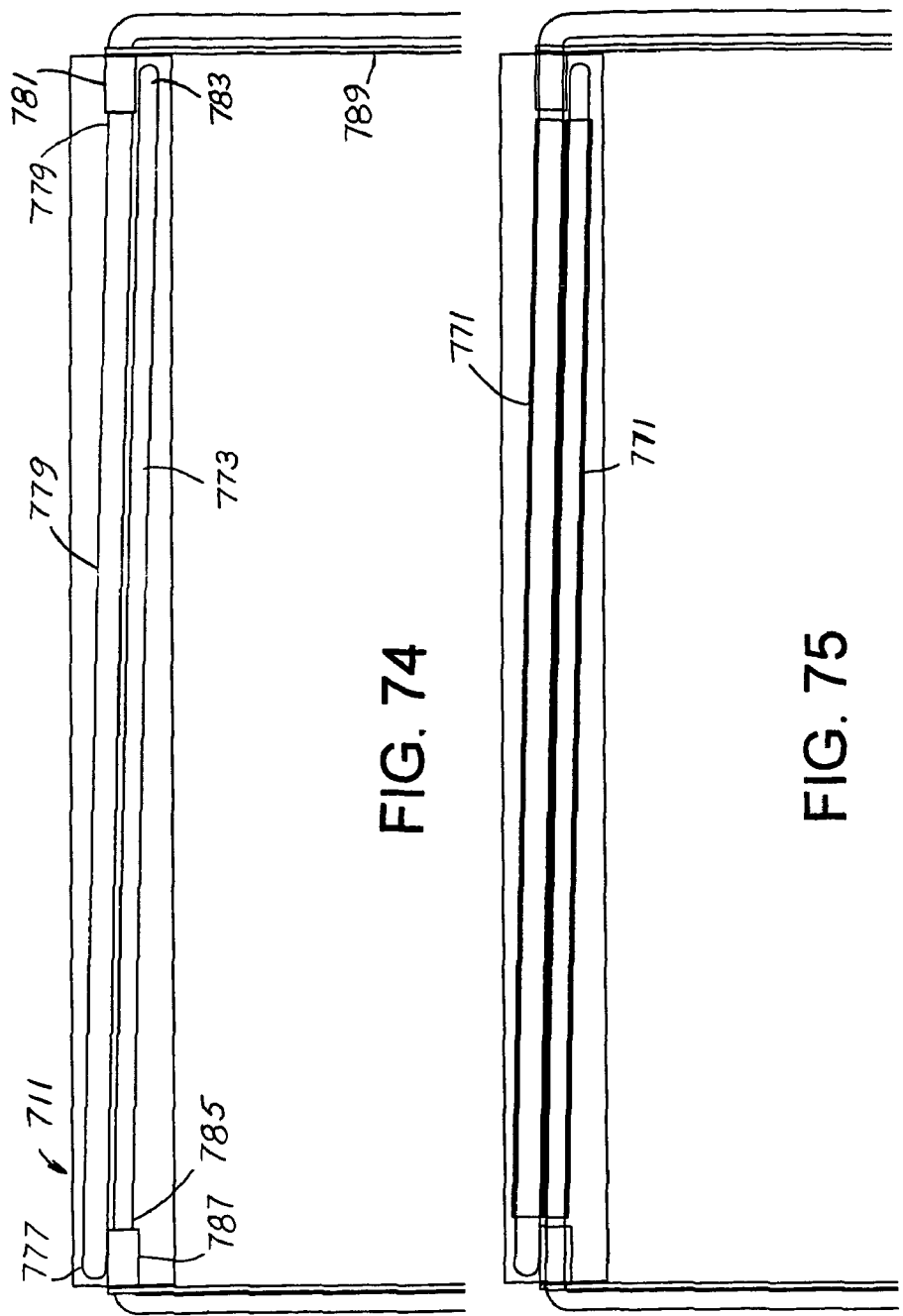

TRANSPORT REFRIGERATION SYSTEM

This application is a continuation of application Ser. No. 12/214,403 filed Jun. 18, 2008, now U.S. Pat. No. 7,614,242 which is a continuation of Application Ser. No. 11/286,150 filed Nov. 23, 2005 now abandoned claims the benefit of U.S. Provisional Application No. 60/629,887, filed Nov. 23, 2004, which are hereby incorporated by reference in their entirety.

FIELD OF THE INVENTION

This invention relates to transport refrigeration systems and methods.

BACKGROUND OF THE INVENTION

Transport refrigeration systems are used with vehicles and mobile containers for temperature control, primarily maintaining goods in preselected temperature ranges. The systems are used in cargo containers on trailers and ships. The systems are used on large commercial trailers, on small vans and delivery trucks, and on all trucks irrespective of size. The systems may be used with passenger vehicles, particularly buses and vans.

Existing transport refrigeration systems come in many forms, shapes, models and sizes, all with different parts. Refrigeration dealers and repair facilities are required to keep large inventories of units and parts, along with large service networks containing highly skilled and highly paid refrigeration mechanics. Transport refrigeration systems are expensive to acquire, operate and maintain. Refrigeration systems must be operated and maintained so that buildings, factories, warehouses, offices, apartments and homes can be continuously used without interruption or discomfort to occupants. When trucks and buses are involved, the downtime for needed repairs and replacements is a major disadvantage and economic loss.

Most trucking direct drive transport refrigeration systems are not capable of holding a constant deep frozen refrigeration when transporting goods in heavily congested traffic areas or in busy multiple drop delivery routes. Frequent stops and multiple door openings while truck engines are idling reduce available refrigeration and require high capacity quick recovery. Secondary power sources or dedicated engines are needed to accommodate deep frozen requirements, even in very small trucks. The secondary power sources or dedicated engines add expense, maintenance and waste to deep freeze refrigerated transports.

In most cases, when trucks having refrigerated cargo containers need refrigeration repairs, it is first necessary to unload the container and transfer the frozen or chilled goods to a cold warehouse or to another refrigerated container.

Needs exist for improved transport refrigeration systems. Needs also exist for improved delivery systems, methods and apparatus for refrigeration, freezing and air conditioning without requiring massive inventories, expert workers and delays in delivering repair, replacement and service parts.

SUMMARY OF THE INVENTION

The invention provides a new transport temperature controlled refrigeration system. The new system includes new transport refrigeration housing platforms which are compact, self-contained, removable, modular and flexible. The new transport refrigeration has variable capacity and full temperature range and is universally driven.

The new transport refrigeration housing platform is useful with any transport refrigeration technology.

The new transport refrigeration systems have flexible interconnections and twistable tubing between modules. Fixing frames connect the systems to containers, which have outside and inside covers. Evaporator and condenser fans are mounted on module lids or on the container-mounted covers.

The units provide variable capacity and full temperature ranges and are universally driven.

The new transport refrigeration control subassemblies are preassembled by their functions. Preassembled modules have the preassembled control subassemblies, compressors, condensers and evaporators. Universally driven, variable displacement, hermetically sealed compressors have universal driver joints. The compressor modules include compressors, driver joints and vapor, liquid and compressor temperature control subassemblies.

The invention provides a new transport refrigeration business method with a plug and play system of standard complete unit exchanges by mechanics not skilled in refrigeration systems.

Installers do not have large inventories of small parts or components, but have small inventories of large application complete refrigeration units ready for installation and exchange.

The invention provides new transport refrigeration methods, new transport refrigeration apparatus for fine temperature control and new transport refrigeration business methods.

The new invention overcomes existing difficulties and supplies solutions for long-felt needs.

At the heart of the invention are self-contained refrigeration units, which include evaporator modules with coils and fans, condenser modules with coils and fans, compressors and motors to drive the compressors, and all other refrigeration components, all in compact modular packages.

These modules, which are assembled in different types of flexible monoblock units, are replaceable as units from limited inventories, without requiring downtime of servicing, repairing or remanufacturing. Vehicles with dysfunctional refrigeration systems arriving at a distributor installer have replacement modules installed and are back on the road within minutes.

In one embodiment where the refrigeration unit is mounted above a truck cab, the outer module may be raised without moving the inner modules. That permits swinging the vehicle's cab without interrupting the refrigeration cycle.

The new plug and play monoblock units contain all of the refrigeration components and elements and the refrigerant. Only the large components are shown for clarity in understanding the invention.

The preferred configurations are the rigid monoblock units and flexible monoblock units.

An entire monoblock refrigeration unit is removable and replaceable without the need for alternative refrigeration and skilled labor, and without lengthy down times with attendant economic losses.

A refrigeration service may own, install, remove and replace all of the refrigeration monoblock units and lease the refrigeration to truck owners, either on a monthly, quarterly, yearly, mile or load basis.

In one form of the invention, a distributor installer contracts with vehicle and fleet owners to provide required refrigeration and refrigerating units. The dealer owns the modular units and removes defective units and replaces entire refrigeration units from the dealer's limited inventory. The dealer ships the removed units to centralized remanufacturing or repairing facilities. The entire dealer operations can be conducted without skilled refrigeration mechanics. The requirements for worker skills are limited to unbolting the modular units from supports on vehicles after first removing the outer covers, which belong to the vehicles and remain with the vehicles. The self-contained complete replacement units are inserted and bolted in place by the same workers, and the vehicle is on its way in less than half an hour. No cargo unloading and temporary refrigeration is required. No specialized refrigeration mechanics or diesel mechanics are required.

Truck owners do not have to buy refrigeration products or to make final buying decisions, eliminating the risk of obsolescence. Also, the truck owners or customers pay for refrigeration in periodic installments. The customers save valuable working capital, which can be used in other revenue-generating areas. The customers can keep credit lines intact, and can treat payments as business expenses, fully deductible for tax purposes.

Preferably the inner and outer covers of the refrigeration units are made of high impact thermoformable ABS UV-resistant and protected plastic.

The flexible monoblock housings are preferably made of engineered resin technology with high-tech engineered polymers. The rugged units are as strong as steel and extremely light.

Smaller truck units have variable displacement swash plate piston compressors. Digital horizontal variable displacement scroll compressors are used for large enclosure.

The new comprehensive transport refrigeration system provides refrigeration systems that are modular and compact, self-contained, removable and flexible. The compact nature of the new refrigeration systems increases payload and is lighter in weight than existing systems. The systems are self-contained. No refrigerant lines, fittings or other refrigeration components are external to the unit in the one-piece monoblock units.

The entire refrigeration system is removable and replaceable in a plug and play concept. Service logistics are simplified by changing complete units. There is no need to stock large amounts of spare parts, just a few complete units. There is no need for specialized personnel or costly, large service networks. It is very easy to build a service network.

The systems are modular and have the same footprints. A plurality of numerous units and configuration arrangements are available with a small number of modules. The modular system is excellent for single or multiple partition containers.

The new comprehensive transport refrigeration system is flexible in providing for a possibility of numerous unit mounting locations. The flexible nature of the new refrigeration system provides the possibility of servicing multiple different configurations of trucks with a single flexible design unit. Inventory streamlining shows that with minimal expense and minimal inventory different types of trucks may be serviced with mechanics that are not skilled in refrigeration systems.

Refrigeration modulations provide variable output of the refrigeration systems with constant cooling capacities having no relation with truck engine speeds. Refrigeration capacities are constant at all truck engine speeds and at idle. The systems follow and match refrigeration loads and provide full performance, even at idle. The new systems provide faster temperature pull-down and recovery times and are excellent for busy multiple drop applications in which the container is repeatedly opened. The new systems provide high efficiencies, resulting in energy savings, because the systems draw only the power that is currently needed. The new systems have about thirty percent less energy consumption and about fifty percent less fuel consumption than dedicated diesel units or in applications with other dedicated power sources. The systems use just about six percent of vehicle fuel consumption.

Optimum temperature management is provided, which eliminates or greatly reduces cycling operations. Precise temperature control and minimal load temperature fluctuations are provided by the new system, which has the capacity of holding a specific temperature to about plus or minus a half degree Fahrenheit. Accuracy on temperature management prolongs defrost cycle intervals and completes them in less time. The same units are suitable for fresh, frozen and deep frozen applications. The same truck or trailer refrigeration system may be used for different temperature requirements.

Temperature management and refrigeration modulation is achieved by the present invention.

An electronic control unit (ECU) monitors cargo space temperature. The ECU initiates the refrigeration cycle when warranted by present conditions. The ECU modulates the compressor's capacity in direct proportion to the cooling requirements.

In a swash plate type variable displacement compressor, the ECU controls the swash plate actuation and compressor displacement by sending an electrical signal to a proportional solenoid valve.

Changes in refrigeration load are anticipated and responded to in the quickest manner to ensure the maintenance of desired cargo area temperature.

When cargo doors are opened, door sensors stop the evaporator fans to prevent drawing in ambient air. The cargo door sensors start an immediate pull down cycle if the cargo area temperature warrants such response.

Refrigerant suction pressure sensors and discharge pressure sensors at various locations, analyze current load requirements and result in adjustments to the refrigeration equipment, compressor capacity, driver modulation, evaporator fan speed and condenser fan speed to maximize the effectiveness of the refrigeration cycle. The evaporator coil is monitored and automatically initiates a defrost cycle when ice build-up is detected. In addition, scheduled defrost cycles are initiated in anticipation of icing conditions. The ECU also maintains a continuous log of all measured variables and equipment run times.

The new comprehensive transport refrigeration systems are primarily vehicle powered. That provides reductions in operational costs, less maintenance and less weight, and is environmentally friendly with less noise and less emissions.

Optional self-powered systems operate independently of the vehicle power source with dedicated power sources, e.g. diesel engines outside of the refrigeration chassis.

Standby simplicity is provided with different prime mover and power source options. They can be portable; standby units have the opportunity of occasionally being rented as well.

If a truck engine is stopped with a refrigerated cargo in the container, a standby power source may be provided.

In the flexible shaft-driven version, a flexible shaft is attached to a quick-connect coupling at the vehicle engine and is connected to a universal drive quick-connect coupling on an electric motor.

Operations in the small truck refrigeration system exchange shops are simple and quick and do not require highly trained dealer networks. The shops employ quickly trained mechanics whose skills are limited to unbolting, removing, inserting and bolting in complete replacement systems. No special investments in training, facilities and tools are required. Inventories are small and are limited to complete refrigeration units. The only downtime that is required is the time necessary to remove a cover, disconnect a drive from a quick connect, remove nuts and withdraw a complete unit, slide in another complete unit, reattach the nuts, couple the driver to the quick connect and replace the cover. A mobile service truck with a quarter-ton lift arm and simple wrenches may take the required replacement unit to a truck and replace the refrigeration unit while a driver is eating lunch, for example.

In one embodiment, the new system requires no initial investment or maintenance plan. Refrigeration may be leased on time or usage basis. Leased equipment never requires purchase of replacements. Replacements are provided as part of refrigeration leasing services.

Precise temperature controls are simplified and are limited to digital displays and selection buttons for selecting required temperature in the container. The simplified controls keep records of cargo container temperatures and offer printouts of temperature history when the cargo is delivered at its destination.

In the electrical drive versions, the electric systems are user friendly and use clean and simple drive lines and connections. Energy storage is provided when using DC electricity, batteries, having DC motors and components, and high efficiency is provided.

The new system requires less energy, less maintenance, less attention and less care. Quicker, faster installation and servicing is provided by the quick disconnect features. This quick disconnect feature also provides roll-on/roll-off capability on refrigerated boxes. Problems with the refrigeration modules can be solved off-line without truck or container down times and with workers who are not skilled refrigeration mechanics. The simplicity of the refrigeration and driver components provides long-lasting quality and reliability. The system is progressive, flexible, modular and universal, and requires less cost for operation investment and inventories. All of these characteristics together provide more freedoms for the users.

The new system provides for sale of refrigeration services with provisions for maintenance, exchange, repair and replacement or sale of refrigeration equipment. A third party may own, replace and lease refrigeration systems without the necessity of truck operators and owners tying up capital by buying and maintaining refrigeration systems. Major advantages of the new system are that refrigeration systems may be removed and replaced quickly by other than skilled refrigeration-trained mechanics in shops that have limited inventories.

Modules include evaporator coils and fans, condenser coils and fans, compressors and motors to drive the compressors and fans, all in tight modular packages. Refrigerant lines are short, and require no purging by experienced workers. Tubes connecting the modular elements are rearrangable so that the modular units may be mounted on vertical, horizontal, sloping or curved surfaces of vehicles.

The modular units and drives are self-regulating, so that desired temperatures are maintained in the refrigerated, freezer or air conditioned volumes. When additional capacity is required, additional modular units are mounted on the enclosure. The units may be mounted side by side on the front of a truck box or trailer or cargo container, or the units may be spaced along the top of a truck box, trailer, cargo container or bus, for example.

The modular units may be in one of several forms.

In preferred embodiments, the modules have flexible housing enclosures and tubes that are rearrangable and shiftable with rotation of the compressor, accumulator, evaporator coil and condenser coil.

In one embodiment where the refrigeration unit is mounted partially behind the cab, the outer module may be raised without moving the inner module before both modules are removed. That permits removing the refrigeration unit from the truck body without relatively displacing the cab or the truck body. That also permits swinging the vehicle's cab without disconnecting a refrigeration unit that projects above a roof of a tilting cab.

The modular refrigeration circuit doubles as a heat pump with multiple ranges. Proportional compressor capacity modulators, refrigerant flow regulator, modular expansion valves, proportional modular suction regulators and refrigerant reservoirs provide the flexibility. A universal programmable and intelligent electronic control unit includes set point adjusters, comparators and sensors. The control units use wireless or wired data transfer to provide real time and historic temperature and operation data. Password control allows remote setting or changing of set points.

Twistable tube lines are provided to interconnect Configuration A or Configuration B modules.

In mobile applications, refrigeration is provided for vehicles with modules having flexible fixing frames. The vehicles have a refrigeration opening with an inside cover having locks. Preferably an outside cover is provided, which remains with the vehicle. The modules are mounted between the covers.

Ducting in the modules provides for wall, rooftop or undermount.

The system provides closed circuit refrigeration or discharged air in either a single temperature or multiple selectable temperatures.

The new systems provide air conditionings for drivers' cabins, buses and other applications of specialty vehicles, trains and boats.

Stationary applications include refrigeration and air conditioning.

These and further and other objects and features of the invention are apparent in the disclosure, which includes the above and ongoing written specification, with the claims and the drawings.

BRIEF DESCRIPTION OF THE DRAWINGS

FIG. 1 is an outline of the refrigeration system.

FIG. 2 schematically shows some of the improved features of the invention.

FIG. 3 schematically shows uses and improved features of the invention.

FIG. 4 schematically shows the new universally driven refrigeration systems.

FIG. 5 shows variations in the new transport refrigeration units.

FIG. 6 is an outline of the new transport refrigeration system.

FIG. 8 is a chart of transportation refrigeration variables in fixed systems.

FIGS. 14A, B and C shows varied condenser coil positions in a new transport refrigeration system.

FIG. 15 shows varied positions of condenser coils and fans.

FIG. 16 shows relative positions of condenser coils and fans in a roof-mounted system.

FIG. 17 shows flexible monoblock configuration variations for differing condenser fan and coil positions in an internally mounted system.

FIG. 25 shows differing flexible monoblock configurations.

FIG. 26 shows flexible monoblock elements with nine different configurations.

FIG. 35 shows varied evaporator fan access features.

FIGS. 74 and 75 show twistable tube connections to the condenser module.

DETAILED DESCRIPTION OF THE PREFERRED EMBODIMENTS

Figure 7:
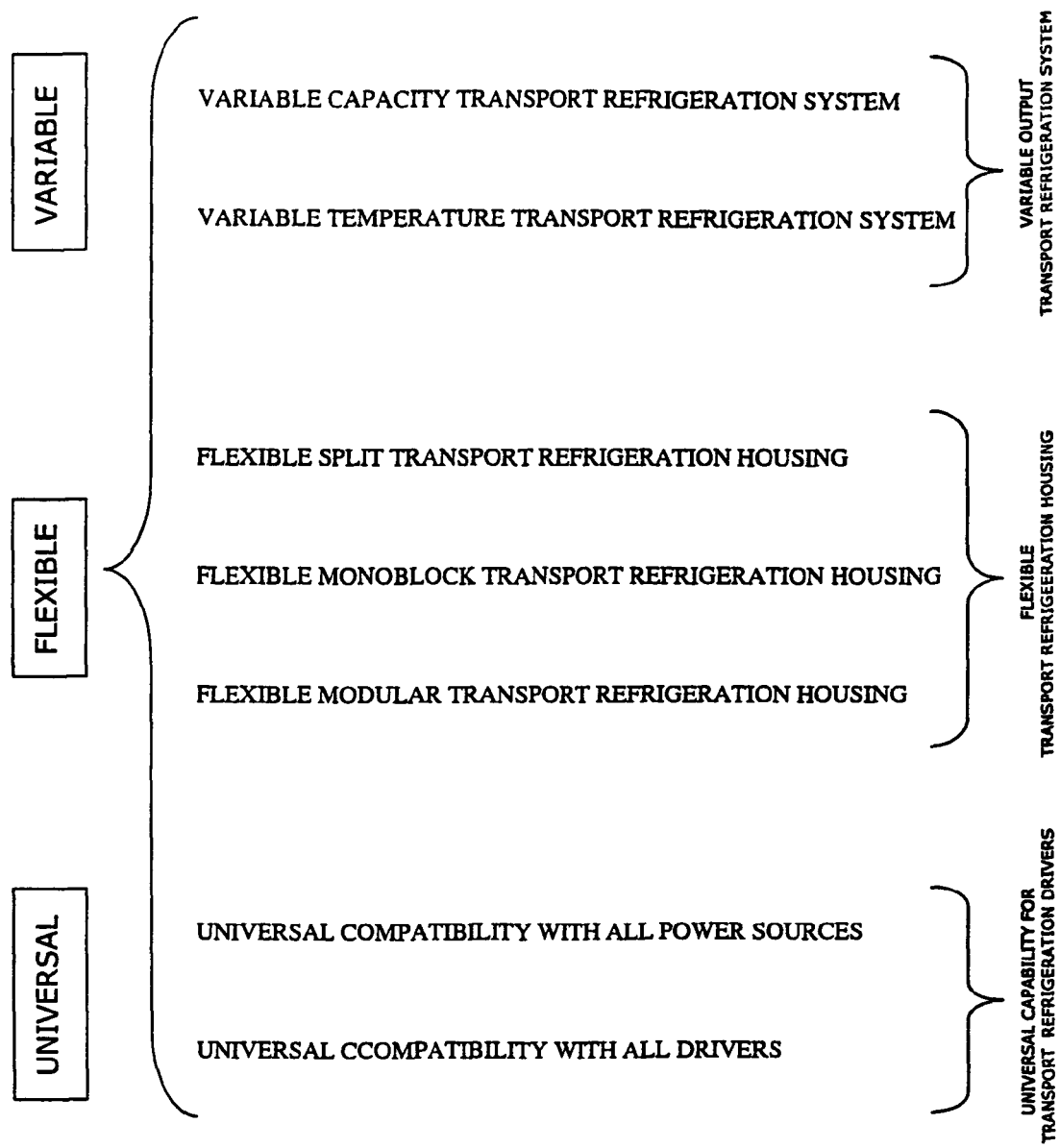
FIG. 7 shows advantages of the new transport refrigeration system.
Figure 9:
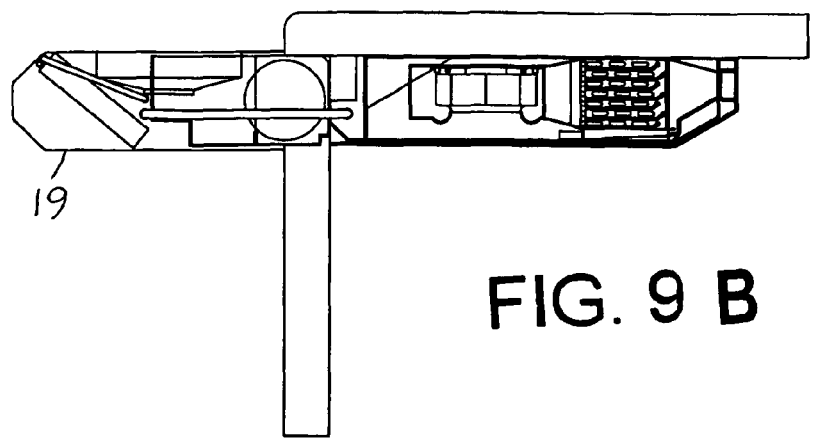
FIGS. 9A, B and C show the new rigid monoblock transport refrigeration system used in plug and play units mounted within varied external covers.
Figure 9:
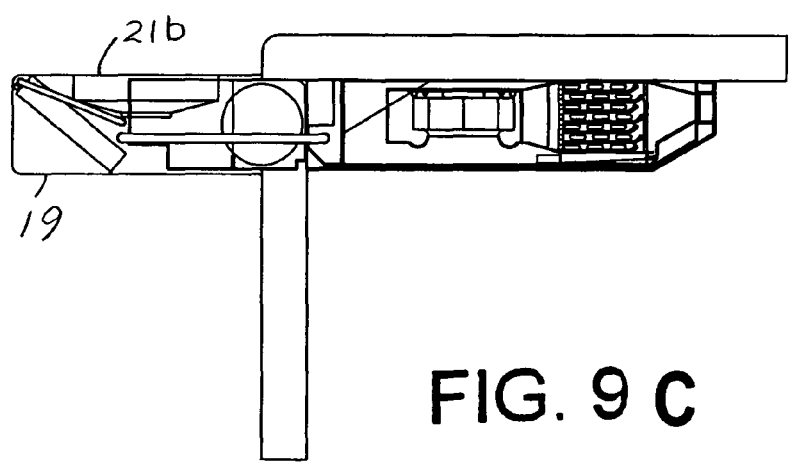
Figure 9:
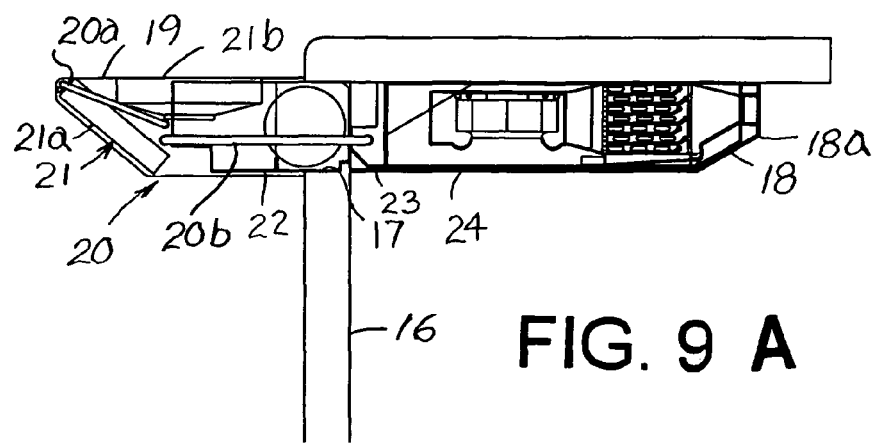

Referring to FIG. 1, the chart schematically represents the new comprehensive transport refrigeration system. The new refrigeration system is compact, self-contained, removable, modular and flexible. The new refrigeration system has short refrigerant lines. The tubes connecting the refrigeration elements are rearrangable so that the flexible modular units may be mounted on vertical, horizontal, sloping or curved surfaces of vehicles. The new refrigeration system has a variable capacity with a full temperature range. The refrigeration system is universally driven. The modular units and drives are self-regulating, so that desired temperatures are maintained in the refrigerated volumes, consuming the minimum energy possible. The entire refrigeration system may be easily removed and replaced instead of repaired in the transport. Savings result in reduction of driver and truck down time and in contents safety without transferring the load. Removal and replacement is accomplished without skilled refrigeration mechanics.

FIG. 2 shows advantages of the new invention, which is compact, self-contained, removable and modular with each module using the same footprint.

As shown in FIG. 3, the new refrigeration system 1 is flexible. It can be mounted at any position on the cargo box or container, and a limited number of units with the same footprint can be used to provide variable capacity and a full range of temperatures.

FIG. 4 shows that the new comprehensive transport refrigeration system 1 has refrigeration units that can be electrically driven 3 with either DC or AC current. The system can be mechanically driven 5 with either direct drive or flexible shafts. In a direct drive mode the compressor is driven directly by the vehicle's engine in a flexible shaft mode, and the compressor is mounted within the monoblock refrigeration unit and driven through the compressor universal driver joint by the flexible shaft.

The refrigeration system may be driven with a hydraulic system 7, which preferably includes a hydraulic motor quick-coupled to a compressor, a proportional flow regulator controlling the motor, and a PTO-driven variable displacement pump supplying the regulator. Each of the new modular refrigeration units may be self-powered 9 with a dedicated power source, with or without an auxiliary standby power source. Preferably a quick disconnect coupling is provided between the driver and the compressor universal driver joint to isolate the refrigeration system from its driver.

FIG. 5 shows that the new transport refrigeration modular units are suitable for all truck sizes and may be made with different modules 11, 13 and 15.

FIG. 6 is a chart showing elements of the new comprehensive transport refrigeration system in which variable output transport refrigeration systems have flexible transport refrigeration housings and are universally compatible with all transport refrigeration drivers.

As shown in FIG. 7, the variability and variable outputs of the new transport refrigeration system provide variable capacity and variable temperature management. FIG. 7 also shows that the flexible transport refrigeration housings may include flexible split transport refrigeration housings, flexible monoblock refrigeration housings and flexible modular transport refrigeration housings.

The universal capability of the new transport refrigeration system is able to use all drives and is fully compatible with all power sources.

FIG. 8 is a chart of the variables that are provided for by the new refrigeration system. Refrigeration capacity is suitable for the container volume of mini and small trucks, medium and large trucks, and trailers. Temperatures of the containers may be controlled at about 35° F. for fresh products, about 0° F. for frozen products, or about −20° F. for deep frozen products.

Optional heat may be provided by the system, for example when shipping fresh produce in freezing climates.

The new system has varied housing configuration and unit mounting locations using refrigeration modules in split and monoblock assemblies in front mount, rooftop mount or under mount configurations. Refrigeration units may be arranged for single compartment or multiple compartment containers.

The new system is usable as a vehicle-powered system or as a self-powered system, with or without optional standby power sources. The new system has options of drives which include mechanical direct drives or flexible shaft drives, hydraulic fixed displacement pump drives, variable displacement pump drives, or electric drives which vary from approximately 12 to 24 or 48 volts DC, and from approximately 115 to 213 volts single phase AC, and approximately 230 to 400 volts three-phase AC. For example, standby power sources may include fixed AC sources for AC motor drives, or AC transformers and rectifiers providing power to drive DC motors, and AC motors for providing power to drive flexible shafts or fixed displacement hydraulic pumps.

In FIGS. 9-17 a container is generally referred to by the numeral 16 and a front opening is generally referred to by 17. Inner covers 18 and outer covers 19 are part of the container body and have varied configurations, as shown in FIGS. 9A, B and C.

Rigid monoblock refrigeration units 20 have refrigerant lines 20a and 20b connecting condenser modules 21, compressor modules 22, joint fixing modules 23, and evaporator modules 24. The same units 20 fit in different external covers 19. Condenser coil 21a is at an angle and exhaust fans 21b are mounted on the cover.

Internal cover-mounted exhaust fans 18a draw recirculated container air through intake 18b and across the evaporator coil 24a and propel the chilled air across tops of cargo in container 16.

Figure 10:
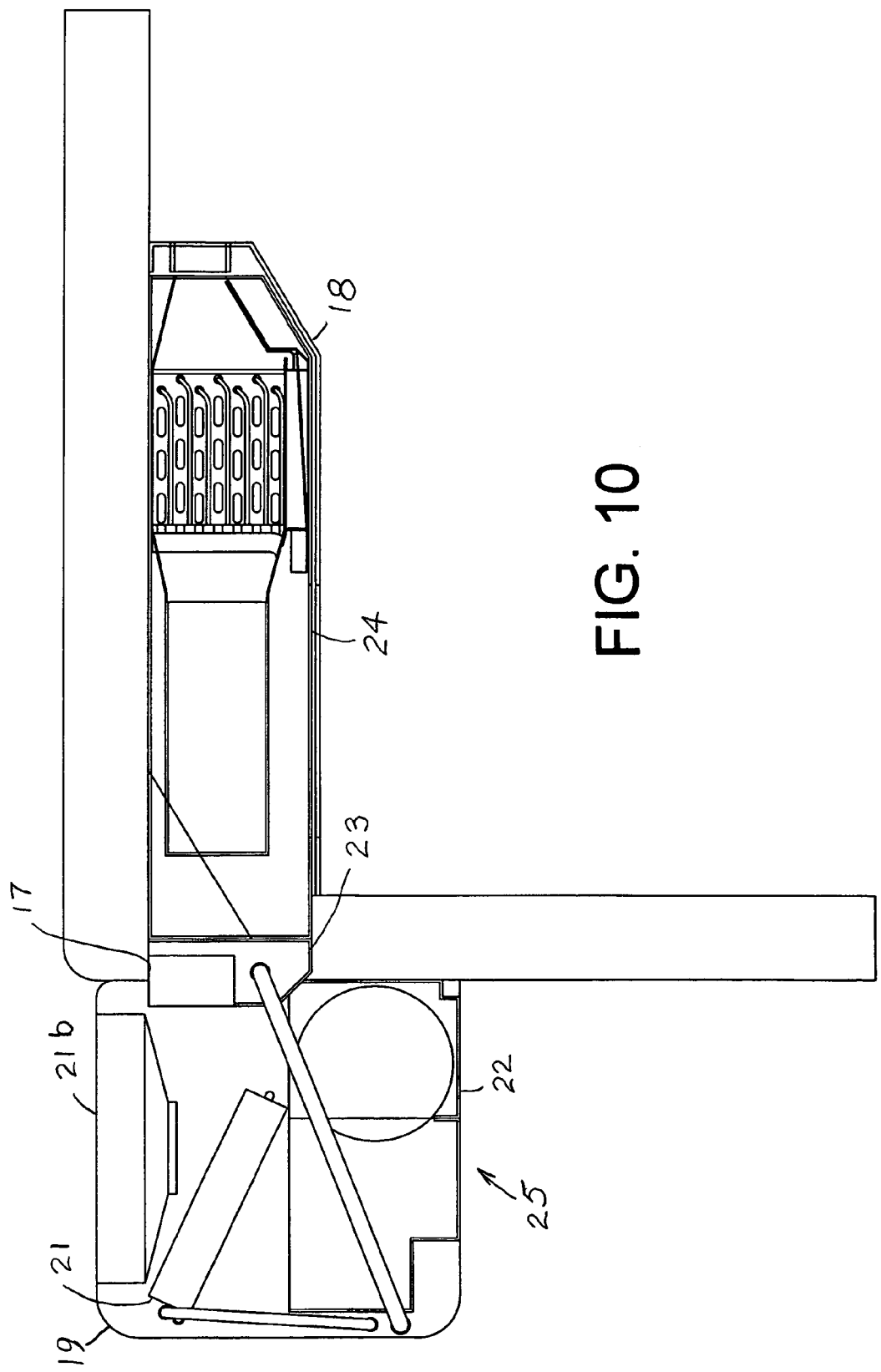
FIG. 10 shows an alternate rigid or flexible monoblock configuration of the new transport refrigeration system.

As shown in FIG. 10, a different rigid monoblock unit 25 has similar modules, but has the compressor module 22 below the condenser module. The same units 22 or 25 may be constructed from flexible monoblock refrigeration units shown in FIGS. 11-17.

Figure 11:
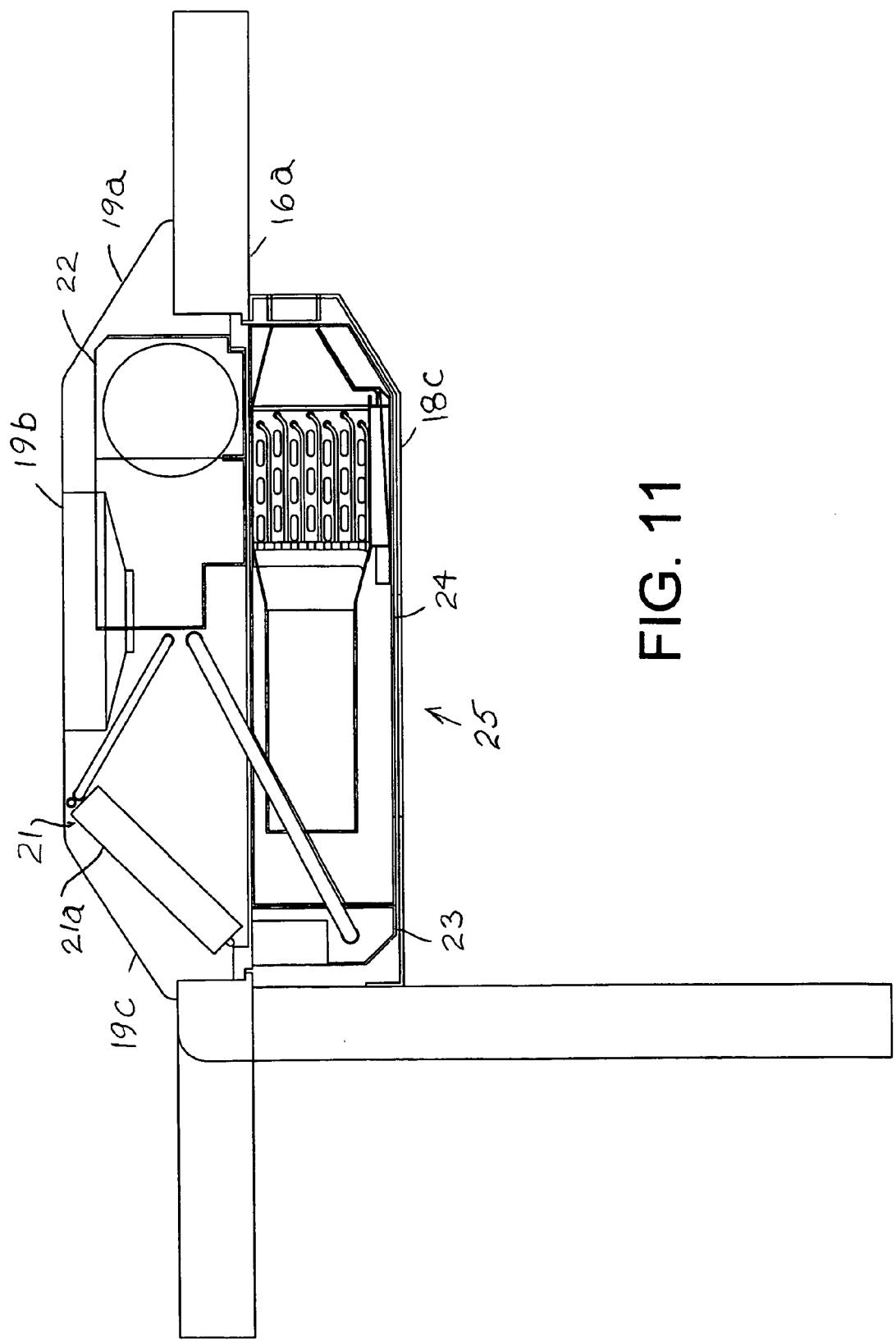
FIG. 11 shows a top of a container mount for the flexible monoblock refrigeration system.
Figure 12:
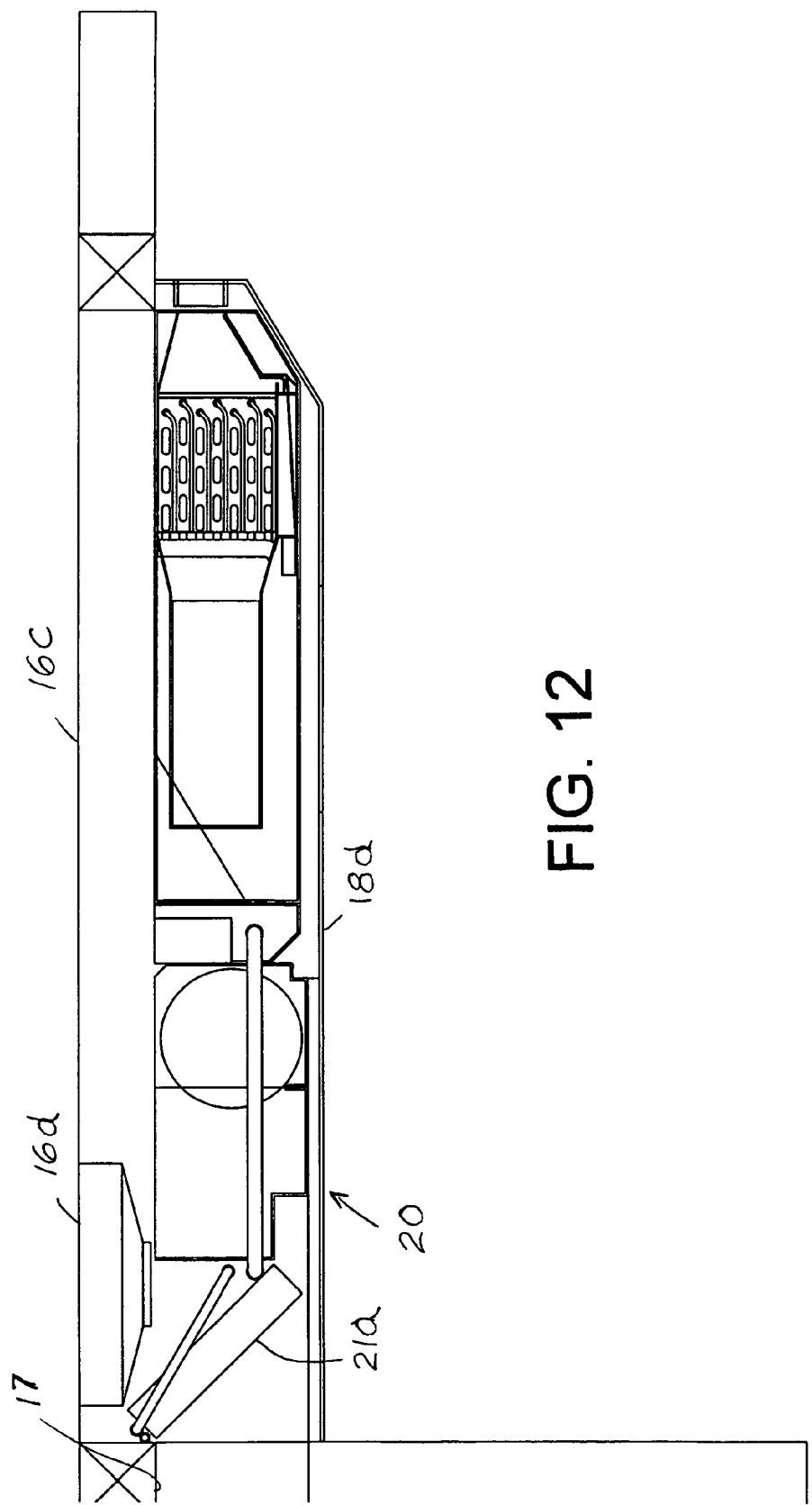
FIG. 12 shows an internal container mount configuration.
Figure 13:
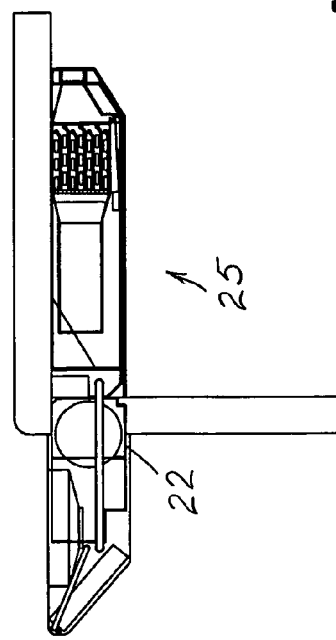
FIG. 13 shows four possible applications of the new modules in the flexible monoblock transport refrigeration system.
Figure 13:
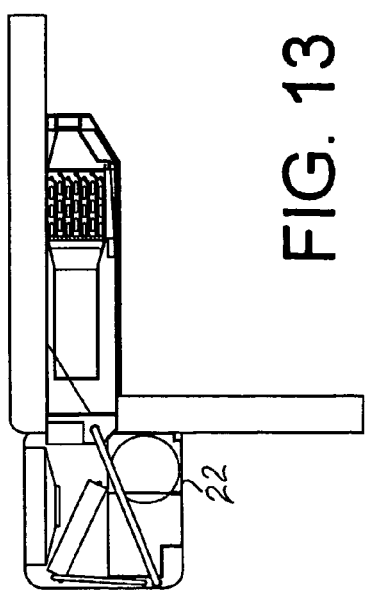
Figure 13:
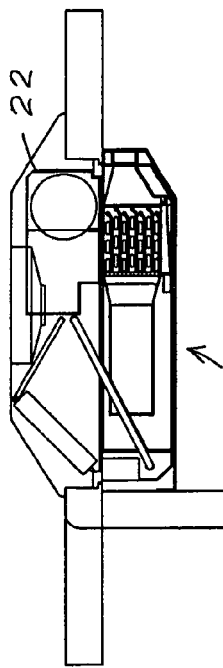
Figure 13:
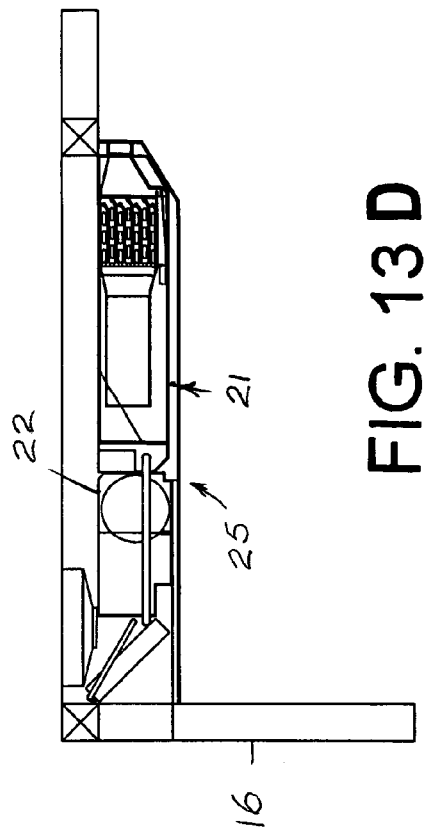

FIGS. 11 and 12 show roof-mounted flexible monoblock units 25. The condenser module 21 an compressor module 22 are mounted on top of the roof 16a in FIG. 11. An external cover 19a has exhaust fans 19b which draw air from intake 19c through the condenser coil 21a. The joint fixing module 23 is mounted inside the roof with the evaporator module 24 inside cover 18c.

In FIG. 12 lifting roof-mounted insulated cover 16c provides access to the elongated internal cover 18d, which holds a rigid or flexible monoblock refrigeration unit 20 or 25. Exhaust fan 16d is mounted in the roof cover 16c to draw air through the condenser coil 21a.

FIGS. 13A, B, C and D show several possible arrangements of a single flexible monoblock refrigeration unit 25 with the modules turned to different relative positions for wall and front mounting of the compressor module 22 and roof and roof access interior mount of the refrigeration unit 21.

FIGS. 14A-C through 17A-C show different configurations of the same units.

FIGS. 14A-C show identical configurations of the rigid or flexible monoblock refrigeration units 20 or 25 to precisely fit in different external covers 19 on container bodies 16.

FIGS. 15A-15C show different positions of the external cover-mounted condenser exhaust fans 21b and the condenser coils 21a in a flexible self-contained monoblock refrigeration unit 25. In FIG. 15A the fan 21b is mounted on a removable lid of condenser module 21 or on the angled top of the cover 19. The condenser coil 21a is mounted vertically in the front air inlet in the cover. In FIG. 15B, the exhaust fan

21*b* is in a horizontal position in the top of cover 19. In FIG. 15C, the evaporator coil is positioned at an angle between the cover intake and the fan.

FIGS. 16A-C show roof mounts with varied positions of the cover-mounted exhaust fan 19*d* and the evaporator coil 21*a*.

FIGS. 17A-C show several internal refrigeration unit mounts with different positions of the roof cover-mounted exhaust fans 17*d* and the evaporator coil 21*a* in relation to the screened intake opening 17 and the roof exhaust.

Figure 18:
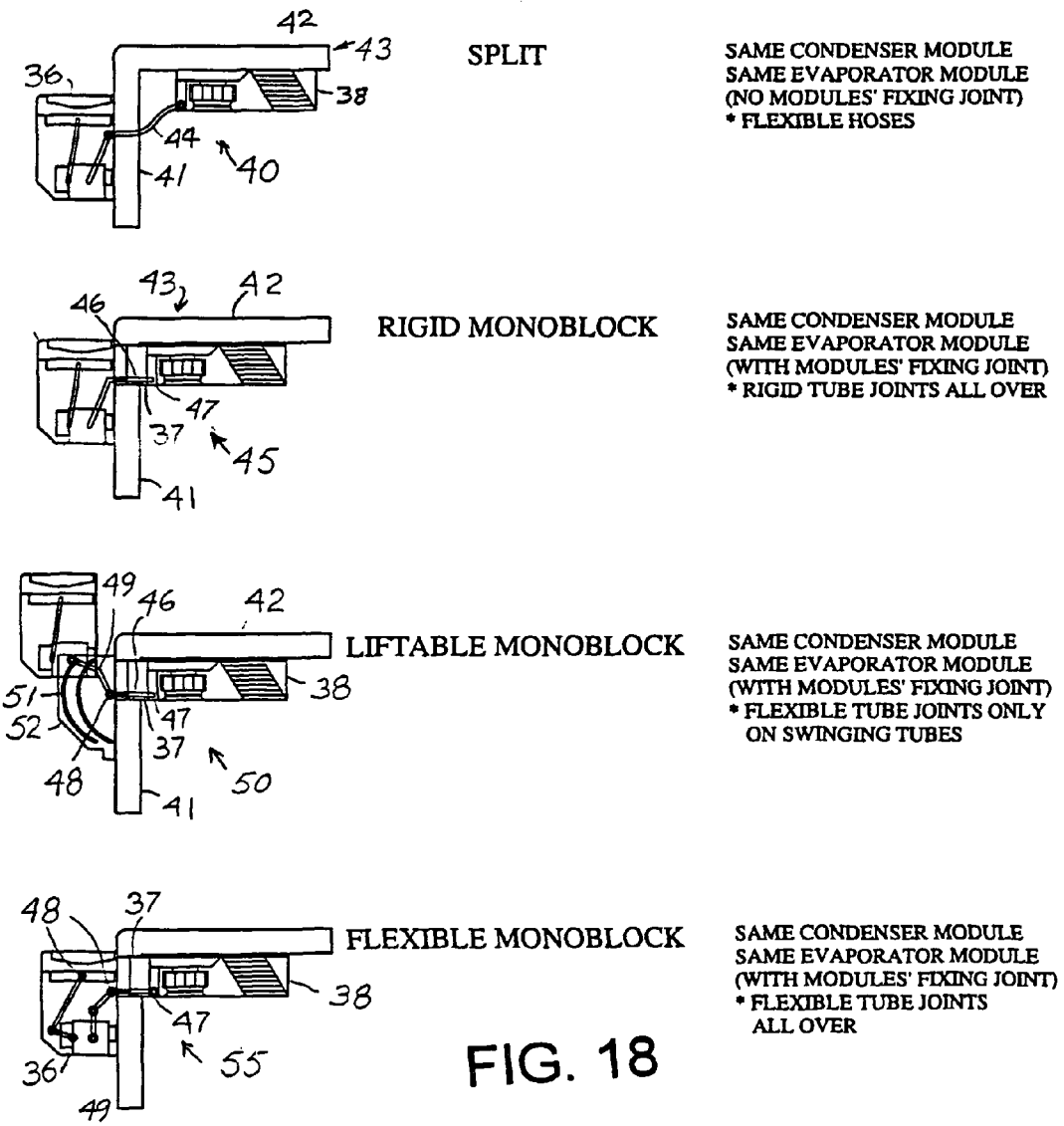
FIG. 18 shows modules concept and configurations of the new comprehensive transport refrigeration systems.

FIG. 18 shows varied configurations of the condenser modules 36, the evaporator modules 38 and the fixing joints 37 for the modules. The split configuration 40 has the condenser module 36 mounted outside on the front wall 41 of a container 43 and the evaporator module 38 mounted inside beneath the roof 42 of the container 43. Flexible hoses 44 connect the condenser and evaporator modules 36, 38.

The rigid monoblock configuration 45 has the condenser module 36 mounted on a fixing joint 37 in the front wall 41 of container 43 and the evaporator module 38 mounted on the fixing joint 37 and extending inward beneath the roof 42 of the container 43. The fixing joint 37 and rigid tubing 46 connects the condenser module 36 and the evaporator module 38. The evaporator module is mounted on a mounting ring 47 of the fixing joint 37 so that the entire evaporator module 38 may be withdrawn with the mounting ring 47 through the opening in the front wall 41.

The liftable monoblock configuration 50 has the evaporator 38 mounted on the mounting ring 47 of the fixing joint 37, and has a rigid tube 46 extending through an insulating wall in the fixing joint. The rigid tube is joined to flexible tube joints 48 on swinging tubes 49. The condenser module 36 is guided by the tracks 51 of the parallel guide plates 52, and the parallel guide plates 52 are mounted on the front of the fixing joint 37. The entire refrigeration assembly may be removed from the truck with the evaporator module withdrawn through the opening in the front wall 41 for replacement.

The flexible monoblock mounting 55 has the condenser module 36 mounted on the mounting ring 47 and the fixing joint 37. The refrigerant lines to evaporator module 38 are connected for the condenser module 36 through an insulating wall in the mounting ring 47 of the fixing joint 37. Flexible tube joints 48 and tubes 49 allow the condenser module 36 to be mounted in several positions.

Figure 19:
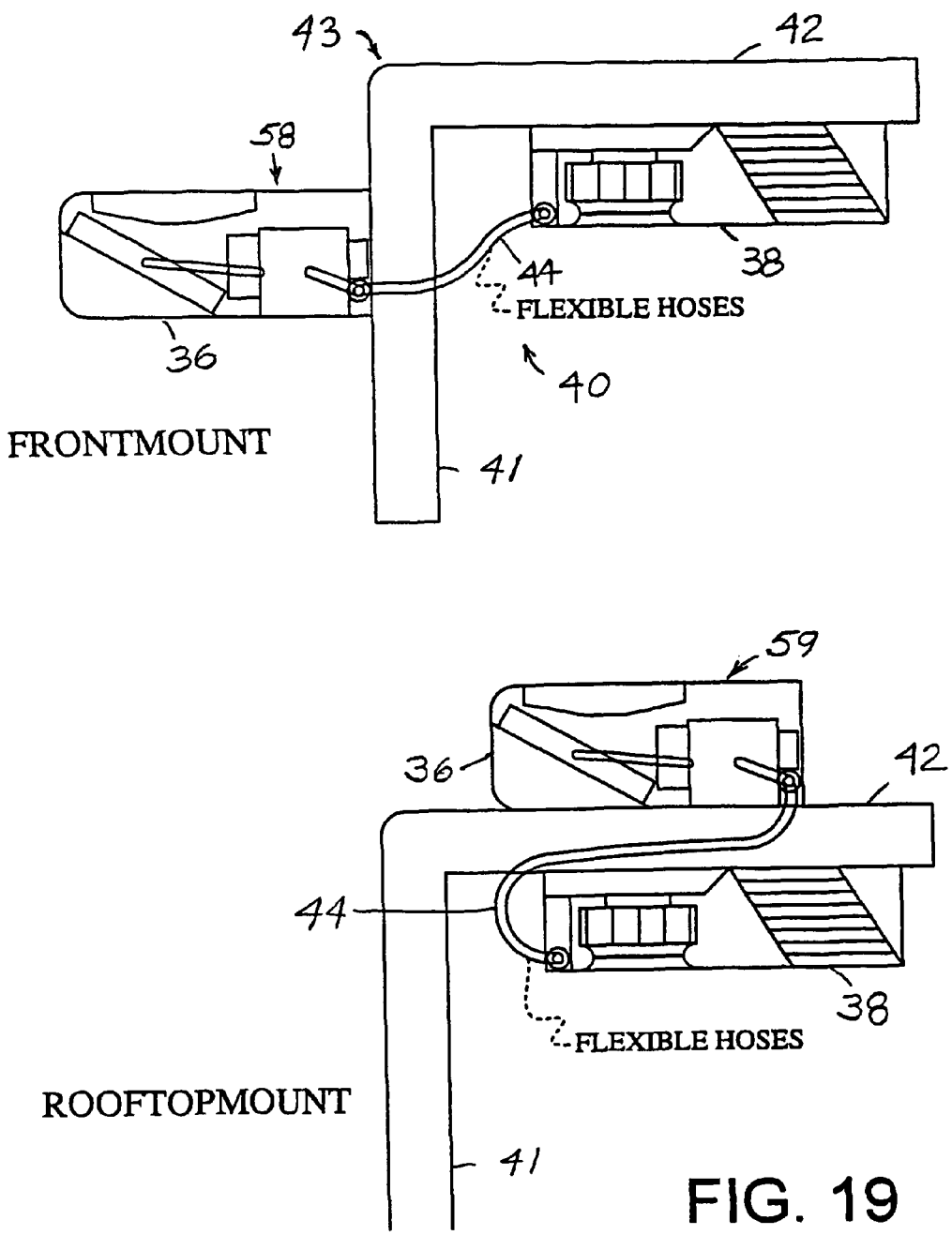
FIG. 19 shows split configurations with flexible hoses.

As shown in FIG. 19A, the split configuration 40 allows a front mount 58 or a roof mount 59 of the condenser module 36.

FIG. 19B has schematic representations of combinations and configurations of split module arrangements showing how five different condenser modules A1, A2, B1, B2, B3 can be combined with six different evaporator modules A1, A2, B1, B2, B3, B4 to provide twelve arrangements of split configurations with differing refrigeration capacities. Modules in split configurations are connected with flexible refrigerant hoses.

Figure 20:
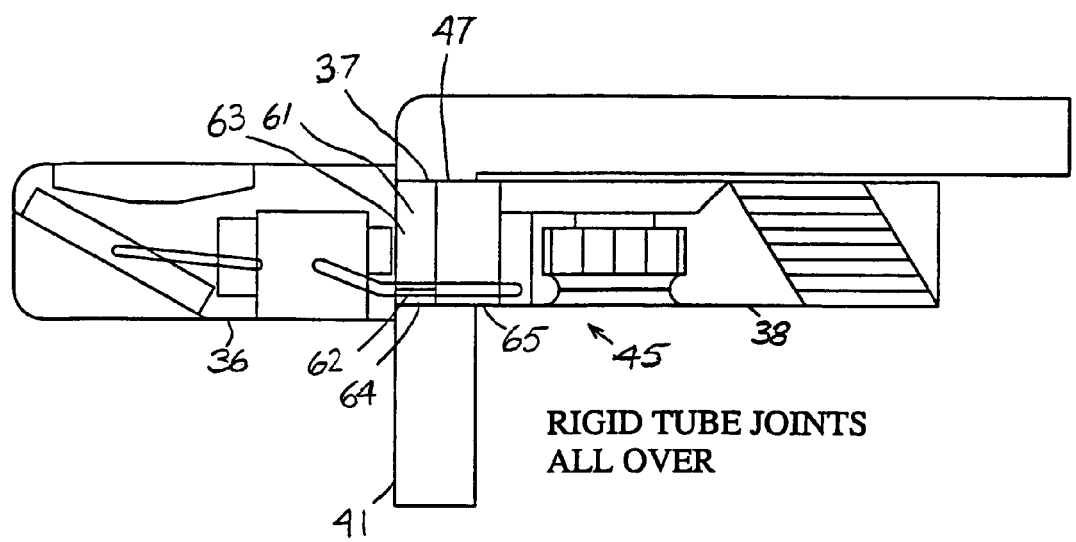
FIG. 20 shows one rigid monoblock configuration.

The rigid monoblock configuration shown in FIG. 20 shows the condenser module 36 mounted on the front of the mounting ring 47 and on the fixing joint 37. The evaporator module 38 is rigidly mounted on the inner end of the mounting frame 47 of the fixing joint 37. The extended portion of the fixing joint allows the rigid monoblock configuration 45 to be mounted on a front wall 41 of various thicknesses. The fixing joint 37 has an insulated front wall 61, which is horizontally split 62 into upper 63 and lower 64 sections with mated opposed semi-cylindrical openings forming cylindrical openings to allow the passing of the connecting tubes. The inward extension 65 of the mounting ring 47 is useful in allowing mounting in various front wall thicknesses 41.

Figure 21:
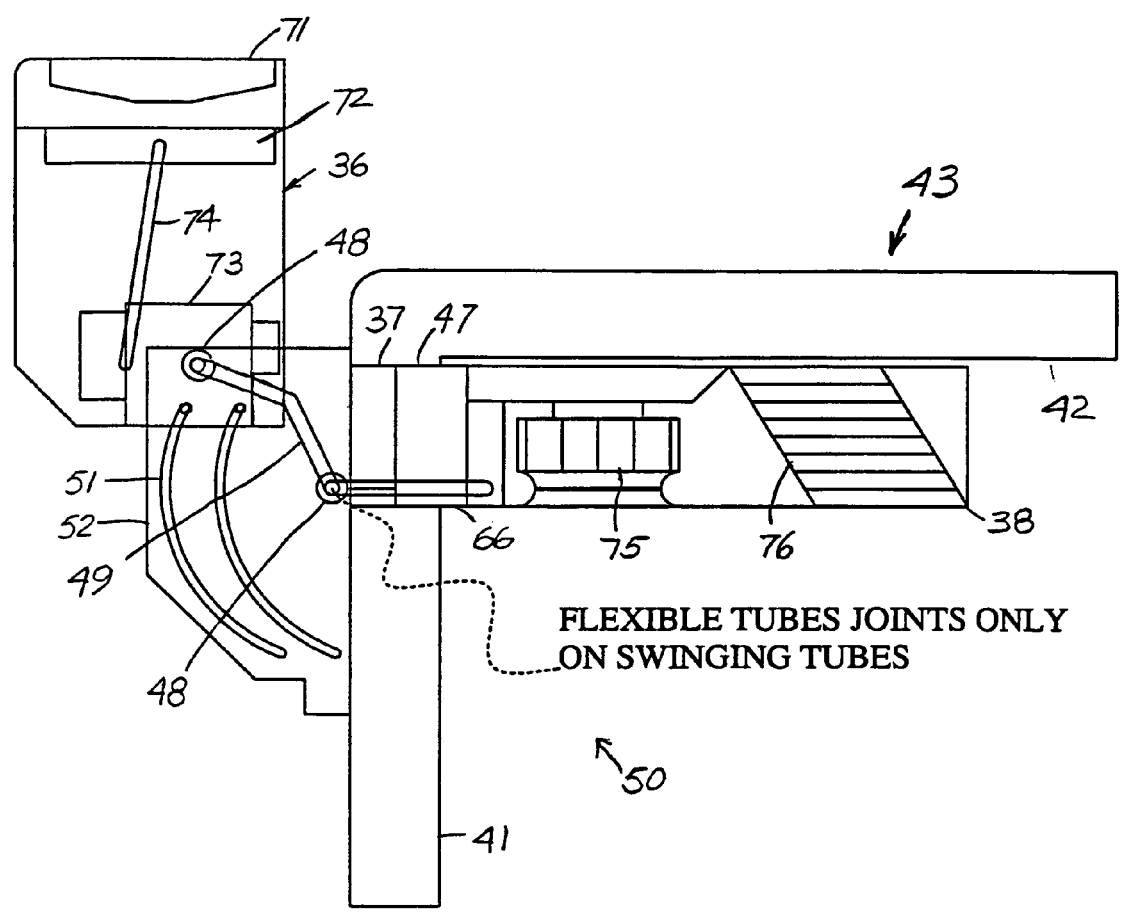
FIG. 21 shows a new liftable monoblock configuration.

FIG. 21 shows the liftable monoblock configuration 50 with the condenser module 36 raised to permit truck engine access by cab tipping. The evaporator unit 38 is attached to the inner extension 65 of the mounting ring 47. The swing tube 49 turns on flexible joints 48 to allow lifting of the condenser module 36 along the guide tracks 51 of the parallel guide plates 52.

As shown in FIGS. 18 through 21, the condenser module 36 includes a condenser fan 71, a condenser coil 72, a compressor 73, and connection tube 74 between the compressor 73 and coil 72. Another tube leads from the condenser coil to a flexible joint. The evaporator module 38 includes fans 75 and an evaporator coil 76. The fans draw air within the container upward and drive the air through the evaporator coil 76 and outward into the body of the container 43 along the roof 42.

Figure 22:
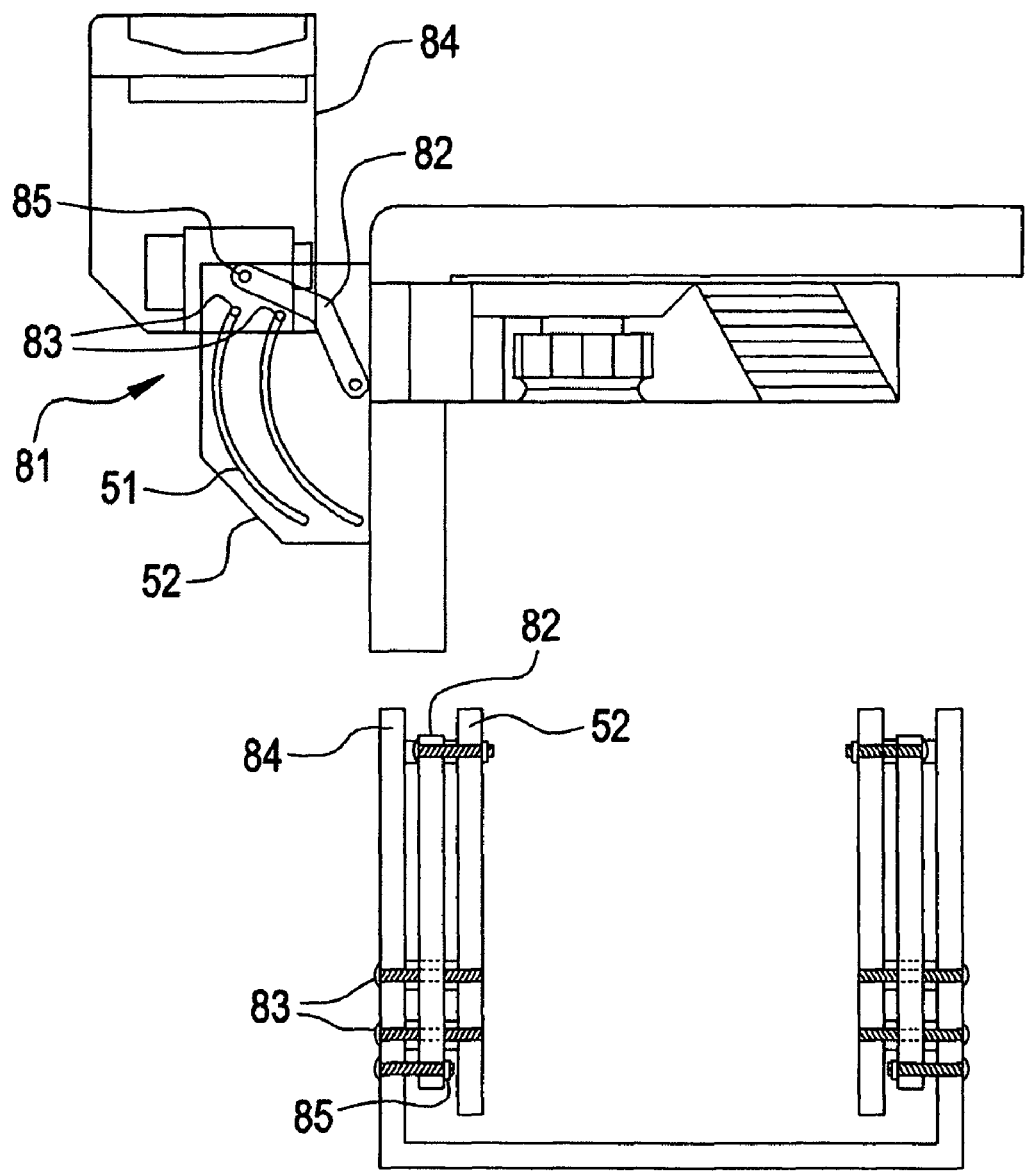
FIG. 22 shows a liftable condenser module mechanism.

FIG. 22 shows the liftable monoblock configuration mechanism 81. Swinging arms 82 and guides 83 move along the tracks 51 when the condenser module housing 84 moves along the parallel guide plates 52. The condenser module housing 84 has pins 83 which move in the guide tracks 51, and the swinging arm 82 is connected with bolts 84 and nuts 85 to the guide plates 52. The liftable condenser housing 84 may be unlatched and manually lifted between detent points that hold the condenser module 36 in the raised and lowered positions. Air cylinders or springs may assist the lifting. The lifting may be electrically operated, such as with a jack screw or hydraulically operated with rams and cylinders.

Figure 23:
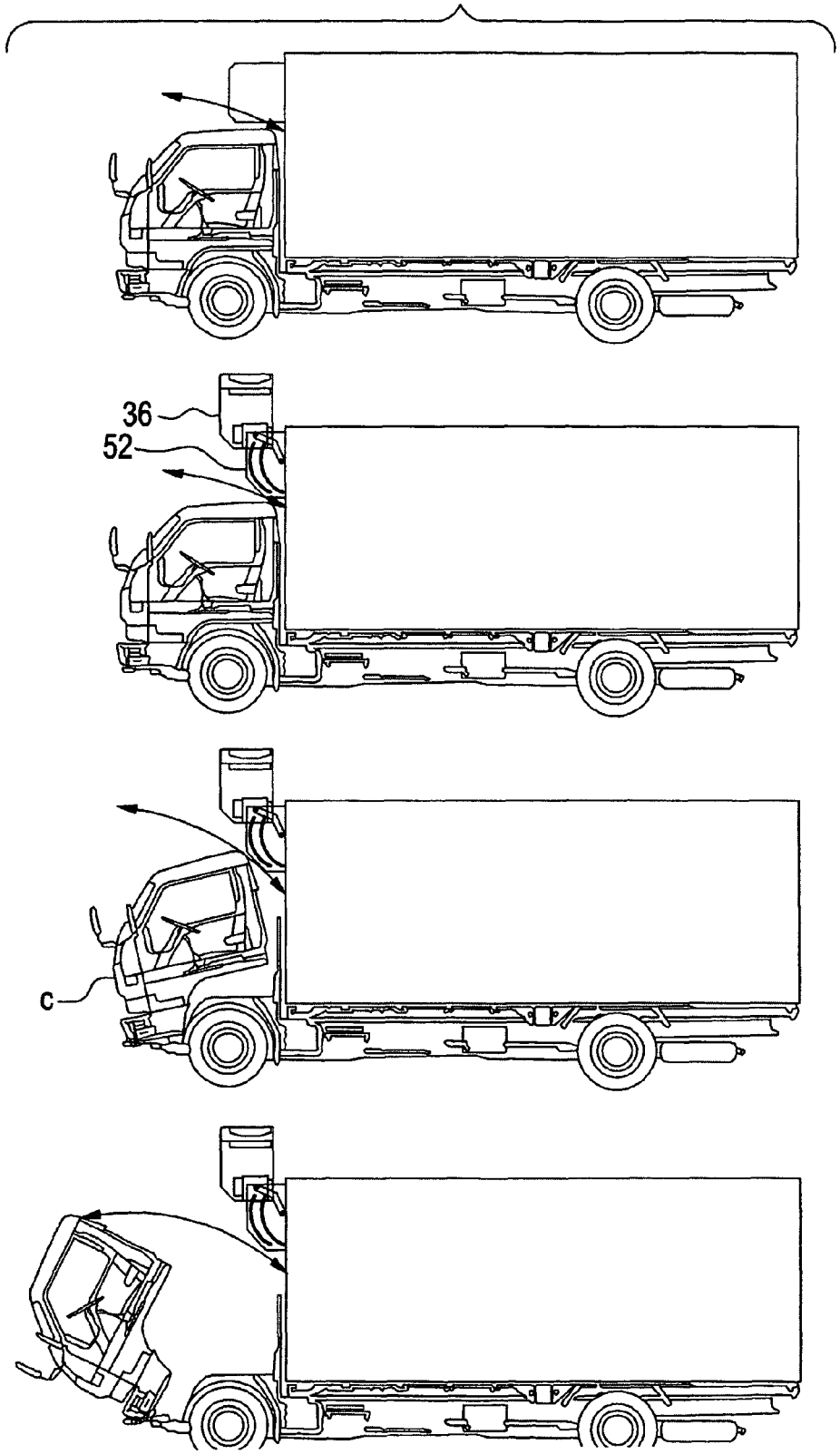
FIG. 23 is a diagram of tilt cab trucks showing the need for liftable condenser modules.

FIG. 23 shows the need for the raising the condenser module 36 to tip a cab C for engine access.

Figure 24:
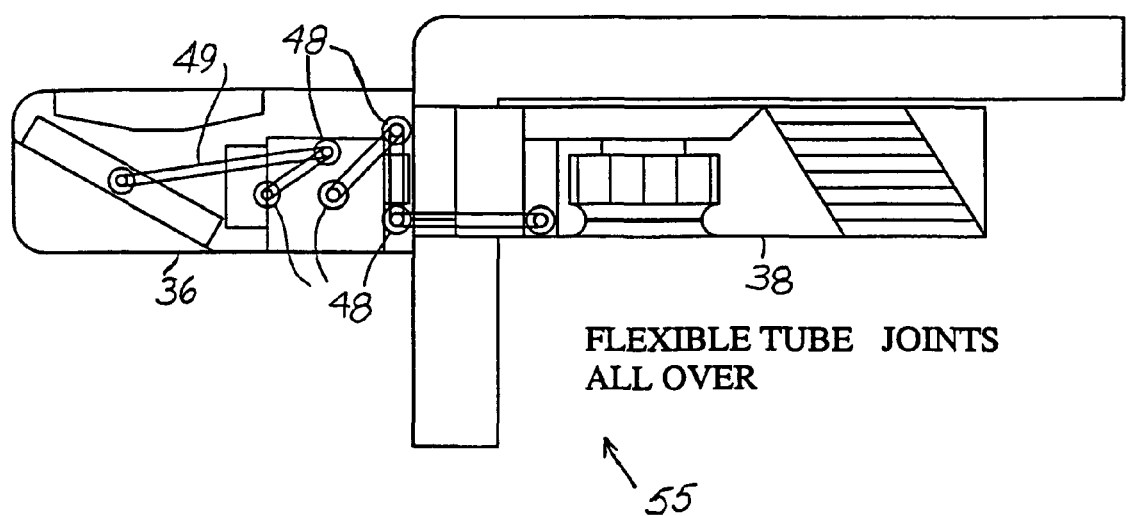
FIG. 24 shows a flexible monoblock configuration.

FIG. 24 shows the flexible monoblock configuration 55 in which the condenser module 36 has flexible joints 48 for allowing mounting of the condenser module 36 in varied positions.

Shown in FIG. 25 are varied relative mounting positions of the condenser module and evaporator module 38 in the flexible monoblock assembly configurations. The first configuration shows the same configuration as the flexible monoblock configuration 55 for nose mounts N shown in FIG. 24. The second nose mount N configuration in FIG. 25 shows elements of the condenser module 36 rearranged, with the condenser coil 72 in the front.

The front mount configurations F are the same as the liftable monoblock 50 and flexible monoblock 55 configurations. An undermount configuration U shows the condenser unit 36 mounted under the container and the evaporator unit 38 mounted along the front wall of the container. A rooftop mount R shows the evaporator unit 38 mounted on a varied form of the mounting ring 47 with a varied form of the insulating wall 130 of the joint 37 and the condenser unit 36 mounted on top of the joint 37 that attaches to the roof wall of the container. The cover 90 is shown on top of the condenser unit 36. In all of these monoblock configurations, the condenser fan 71 is an exhaust fan, drawing in air through a forward opening over the coil 72 and exhausting air by fan 71.

A wall-mounted evaporator 38 with a roof-mounted condenser 36 is shown in the configuration W.

FIG. 26 shows flexible monoblock configurations in which the refrigeration elements of the condenser coil 72, the compressor 73 and the evaporator coil 76 are connected by rigid tubing sections 49 and flexible couplings 48. The first configuration shows a configuration 55 similar to that shown in FIG. 24. The second configuration is similar to the second N configuration shown in FIG. 25. The third configuration shows a wall mount configuration 55 shown in the bottom of FIG. 18. The fourth configuration shows a roof mount configuration R shown in the center of the bottom of FIG. 25. The fifth configuration shows a roof and front wall mount, such as shown in the lower right of FIG. 25. The sixth configuration shows a roof mount in which the evaporator is mounted slightly behind the compressor 73. The seventh configuration shows the undermount configuration shown at the lower left of FIG. 25. The eighth configuration shows a modified undermount configuration with a changed position of the condenser coil 72 and condenser exhaust fan 71. The ninth configuration shows the liftable monoblock configuration 50 and the relationship of the flexible connectors 48 and rigid tubes 49.

Figure 27:
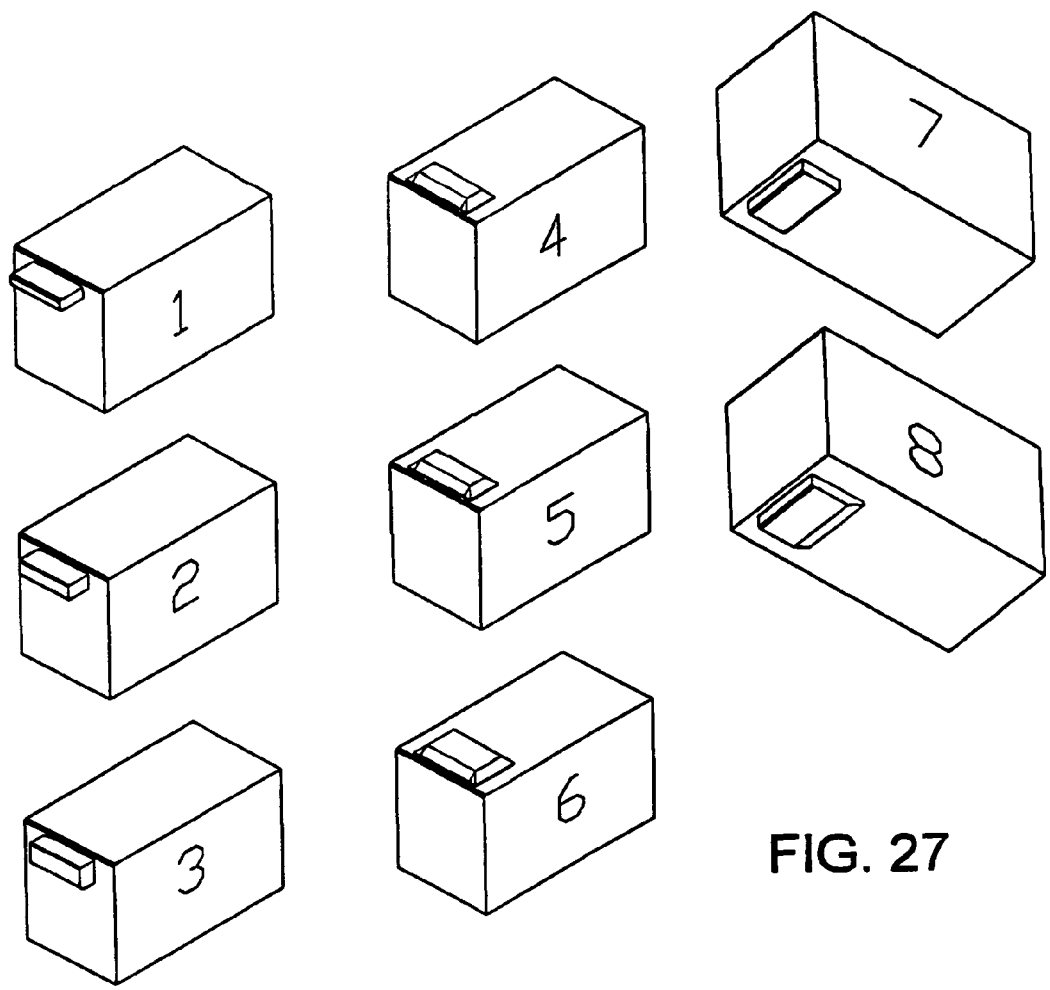
FIG. 27 shows flexible monoblock layouts.

FIG. 27 shows varied flexible monoblock layouts that are related to the configurations of like numbers in FIG. 26.

Figure 28:
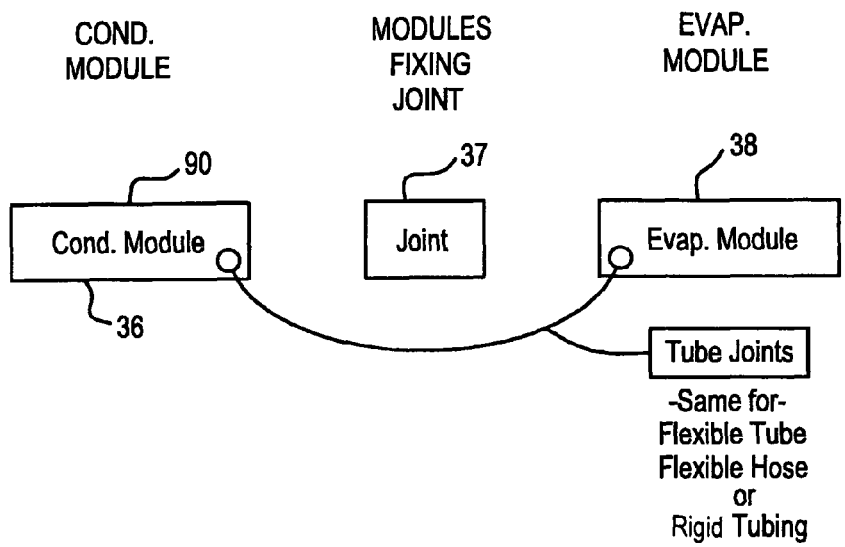
FIG. 28 shows tray-mounted modules and joints.

FIG. 28 schematically shows the condenser module and evaporator module assemblies 36 and 38 in both plan views and side elevations, with the fixing joint module 37 between the condenser module and the evaporator module. The condenser module housing 84 has a universal refrigeration base tray 91 on which are mounted all refrigeration miscellaneous parts, filter driers, accumulators, pressure and flow regulators, etc. and a compressor and driver isolated plate 92.

The fan assembly lids 93 mount one, two or several exhaust fans 71. Condenser coil 72 is mounted in the condenser housing 84. The evaporator module housing 94 has an evaporator chassis lid 95 on which are mounted for one, two or several intake fans 75 to circulate container air through the evaporator coil 76. Mounting holes 96 are provided on the rear edge of the condenser module housing 84 and the front edge of the evaporator housing module 94 to connect the modules to the fixing joint 37.

Figure 29:
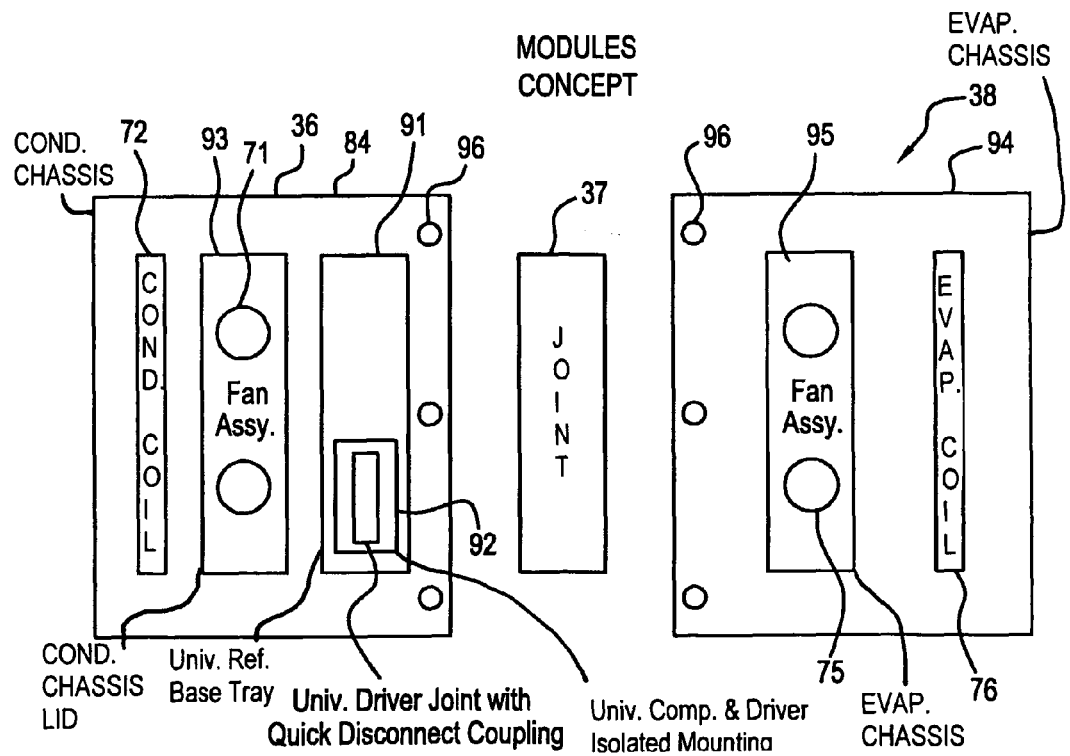
FIG. 29 shows components in some of the modules.

As shown in FIG. 29, the compressor and drive isolated plate 92 mounts a fixed displacement or variable displacement compressor 73 which has a compressor universal driver joint 97 with a quick disconnect coupling 220. The condenser module 36, the modules fixing joint 37 and the evaporator module 38 comprise the refrigeration unit 1. The compressor universal driver joint 97 with the quick disconnect coupling 220 may be connected to a flexible shaft 98, an electric motor 99 or a hydraulic motor 100 with hydraulic lines 101.

Figure 30:
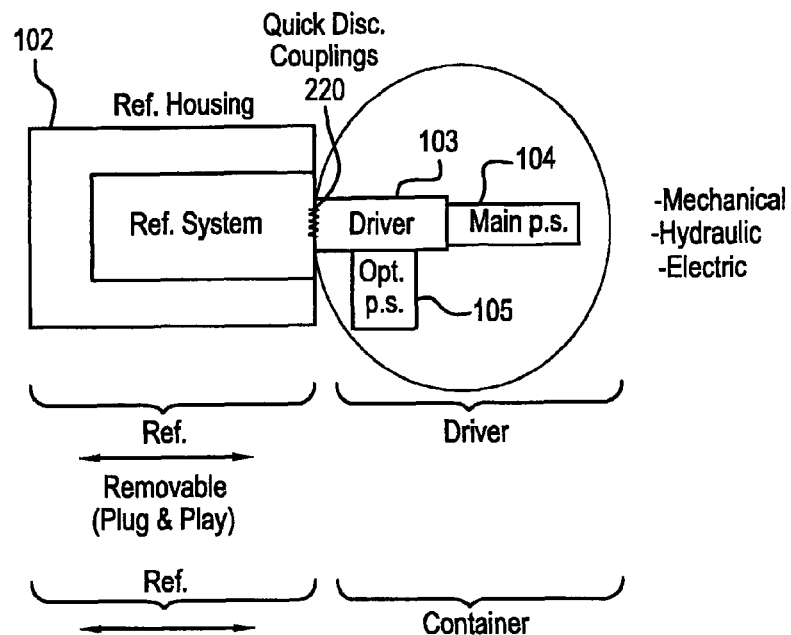
FIG. 30 is a schematic representation of a flexible power source and drive unit.

As shown in FIG. 30, the refrigeration system 1 is mounted in a flexible refrigeration housing 102 and has a quick disconnect coupling 220 to a driver 103. The driver 103 may have a main power supply 104 or an optional power supply 105, either of which may be mechanical, hydraulic or electric. For example, the main power supply 104 may be a truck engine-driven main AC generator, and the optional power supply 105 may be a fixed AC power source or a stand-alone engine driving a secondary AC generator.

Figure 31:
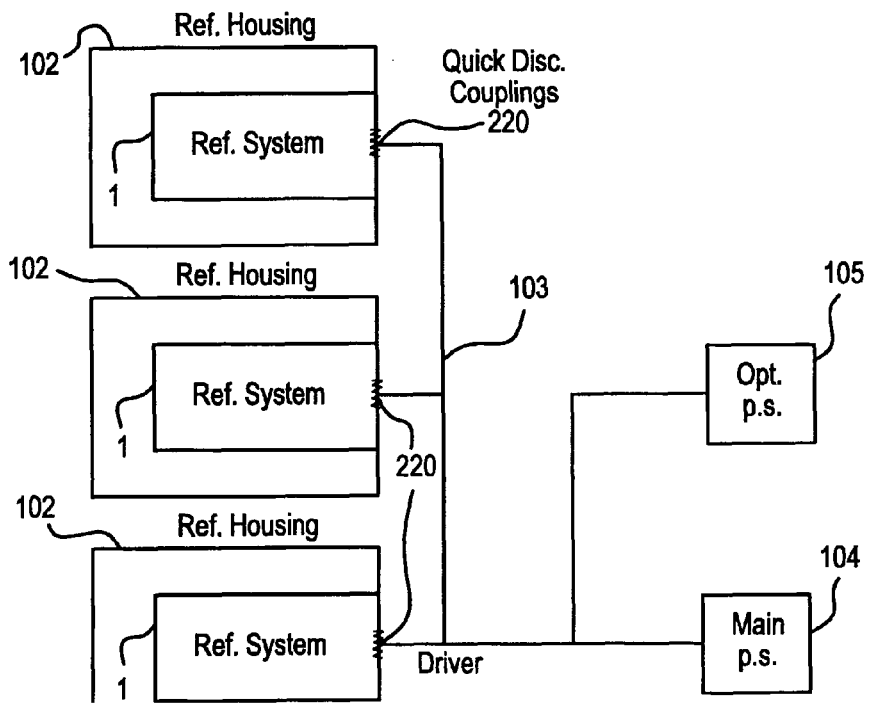
FIG. 31 shows modular units in multi partition refrigeration systems.

FIG. 31 shows a modular multi-partition system which has three refrigeration systems 1 mounted in flexible refrigeration housings 102 connected by quick disconnect couplings 220 to drivers 103, which may have a main power supply 104 and an optional power supply 105.

Figure 32:
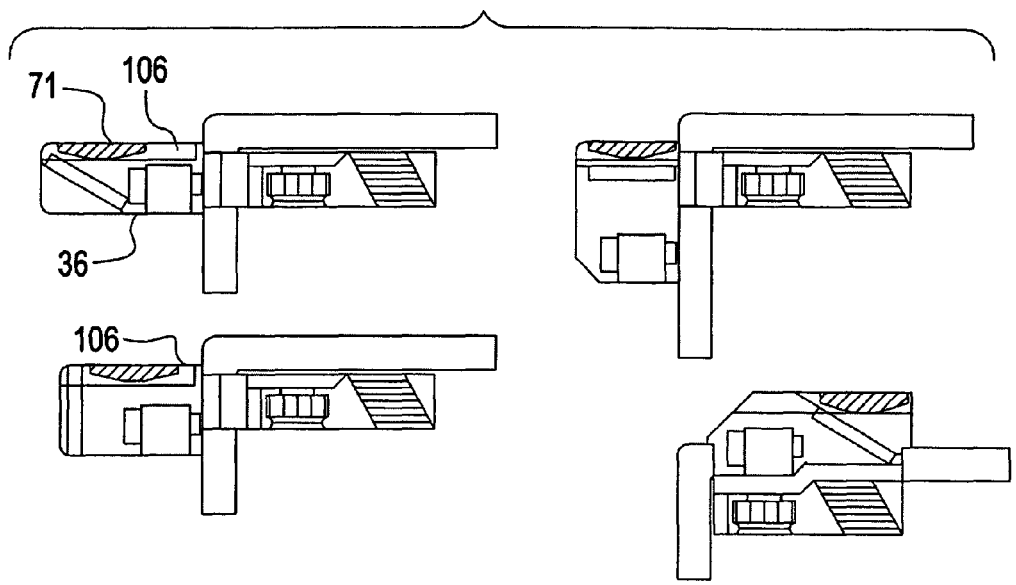
FIG. 32 shows condenser modules and lids.
Figure 33:
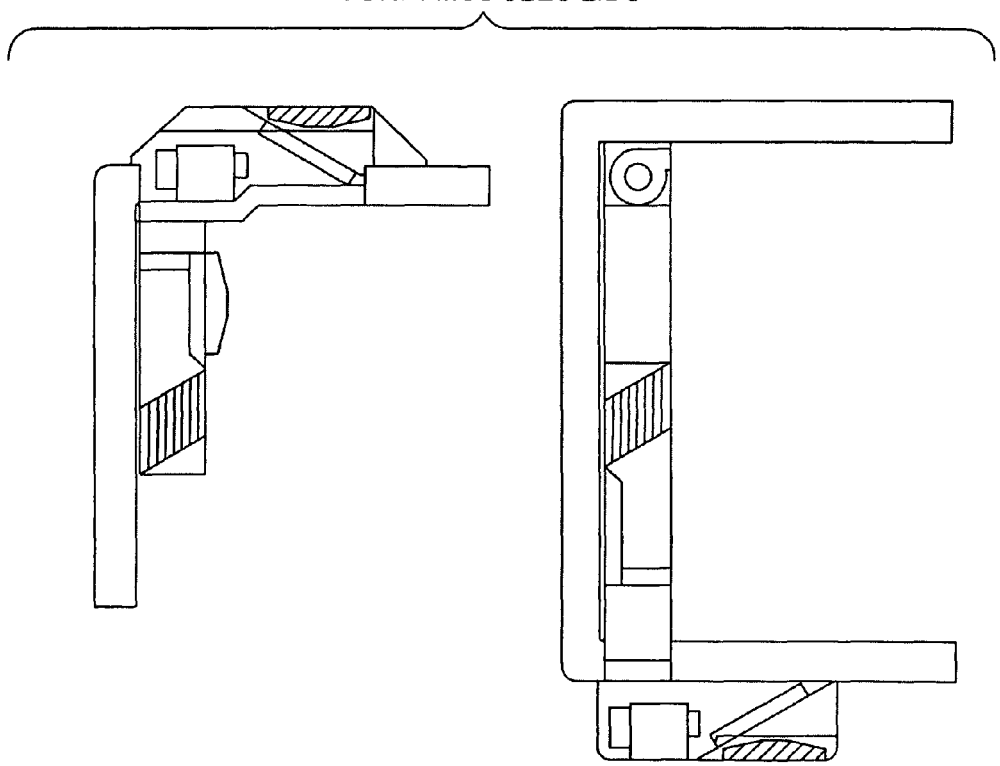
FIG. 33 shows mountings of condenser fans on lids that are varied.

As shown in FIG. 32, the conditioner modules have lids 106, and the exhaust fans 71 are attached to the lids and not to the chassis of the condenser modules 36. That is applicable in all modifications of the condenser modules, as shown in FIGS. 32 and 33.

Figure 34:
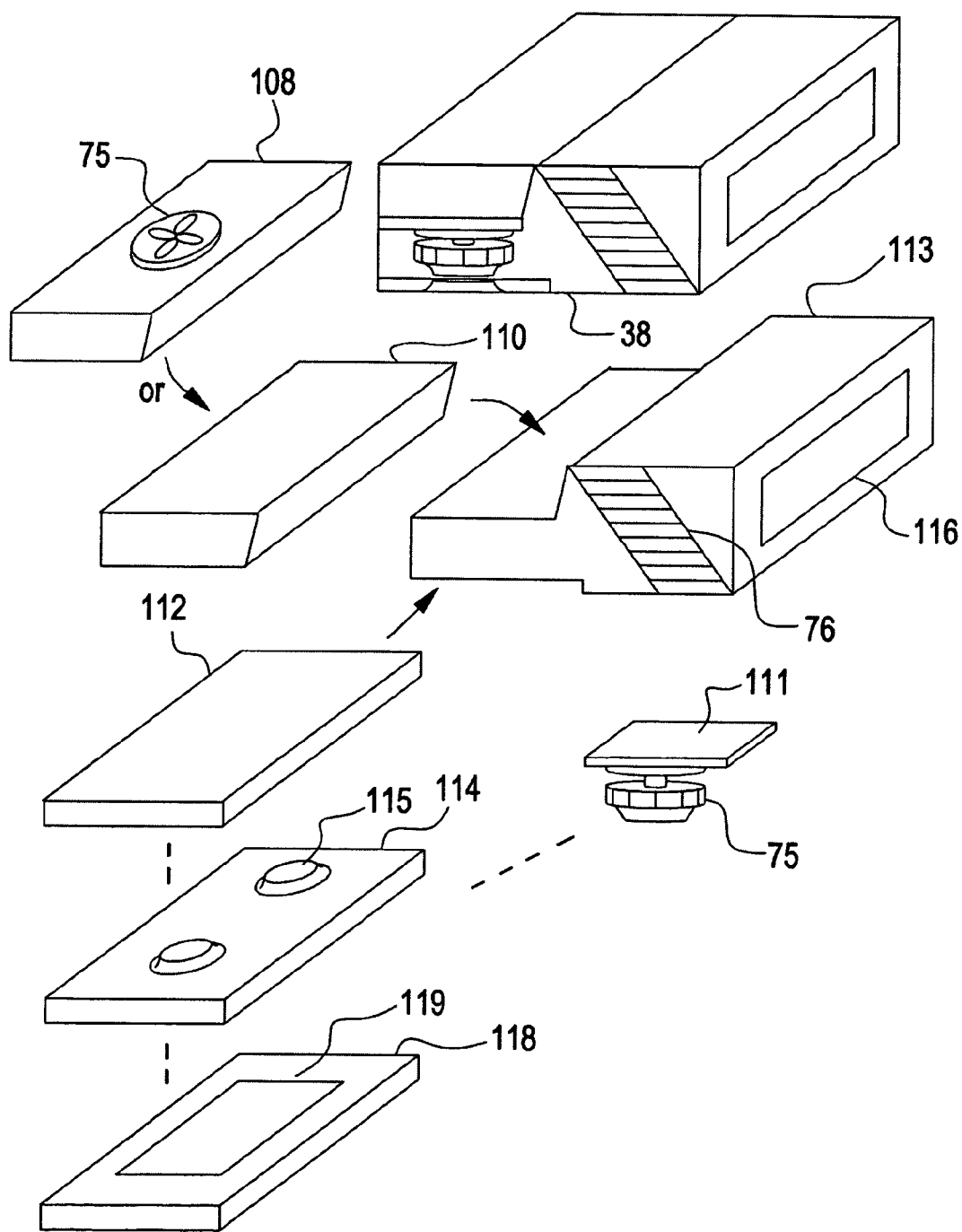
FIG. 34 shows evaporator modules with elements.

Referring to FIG. 34, the evaporator modules 38 have a main chassis with many lid options. A wall-mounted version of the evaporator 38 has an evaporator fan 75 mounted in a lid 108. In roof-mounted or joint ring-mounted evaporators 38, a solid evaporator lid 110 is liftable to provide access to a fan-mounting base 111 on which one, two or several evaporator fans 75 are mounted.

In a wall-mounted evaporator module, a blank lid 112 covers an opening of the evaporator so that the coil 76 chills air drawn through the side or bottom of the evaporator housing 113, and so that chilled air is exhausted by fan 75 in the lid 108 for the wall mount.

In the roof mount or joint ring mount, a lid 114 with round inlet openings 115 is provided to allow air to be drawn in by the intake fans 75 mounted on the fan mounting base 111 and blown through coil 76 through opening 116.

In an alternate lid 118, the lid is provided with a grill 119 to replace the one, two or more round air inlet rings 115.

FIG. 35 shows access through the lid 110 and fan mounting base 111 to the evaporator fans 75 in the evaporator housing 113. That is the preferred form when the entire evaporator housing 113 may be pulled outward with the mounting ring of the modules joint 37 for replacement.

When inside access is provided within a container, the preferred access to the fans is by dropping the lower lid 114 or 118 and then unbolting the fan mounting base 111 from the evaporator chassis in the housing 113.

Figure 36:
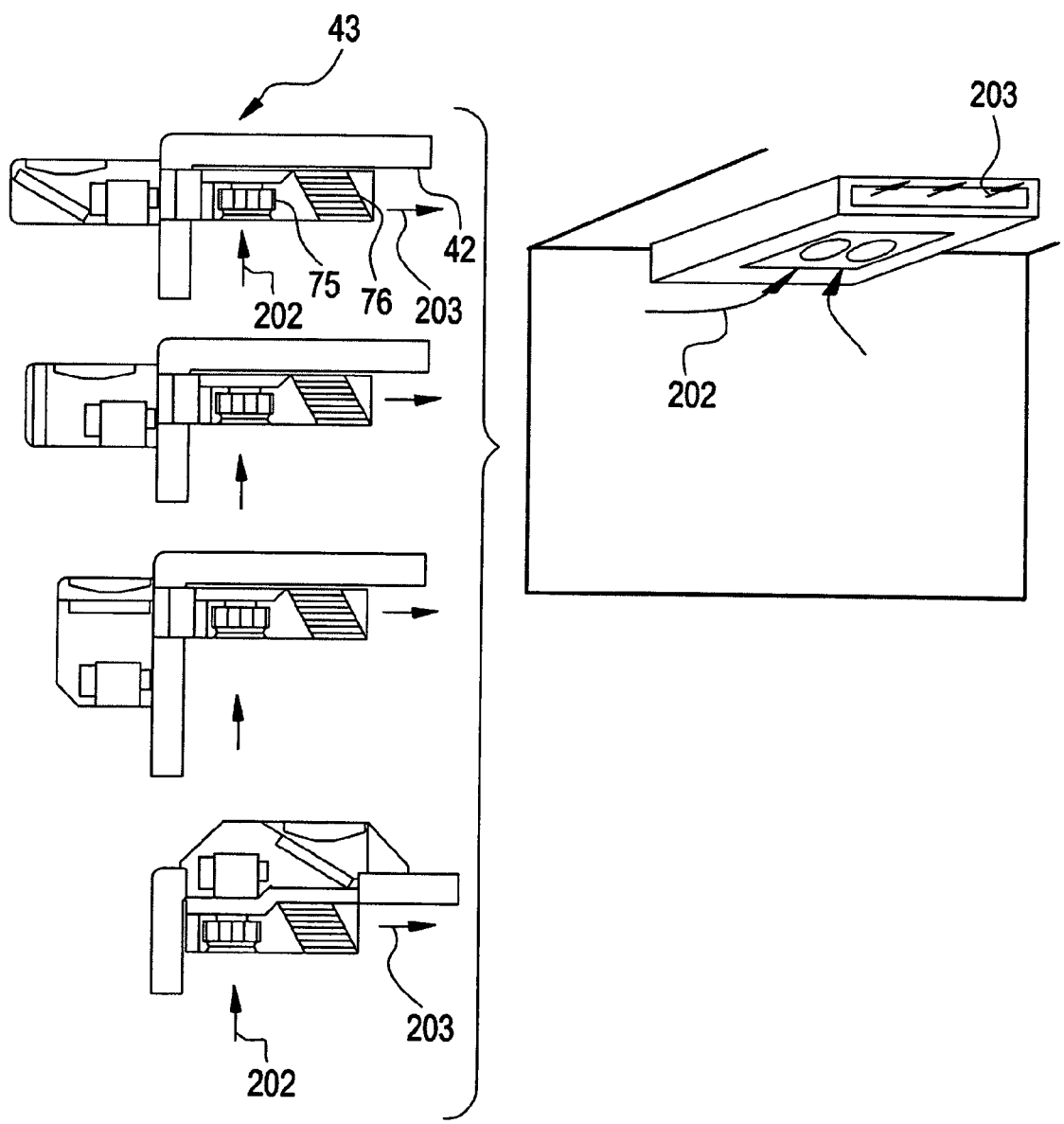
FIG. 36 shows varied evaporator layouts.

FIG. 36 shows evaporator layouts for several configurations. In the configurations shown in FIG. 36, the returned air 202 within the container 43 is drawn upward through the fans 75 and driven outward through the evaporator 76 along the roof 42 of the container, so that the cold air circulates through the contents of the container.

Figure 37:
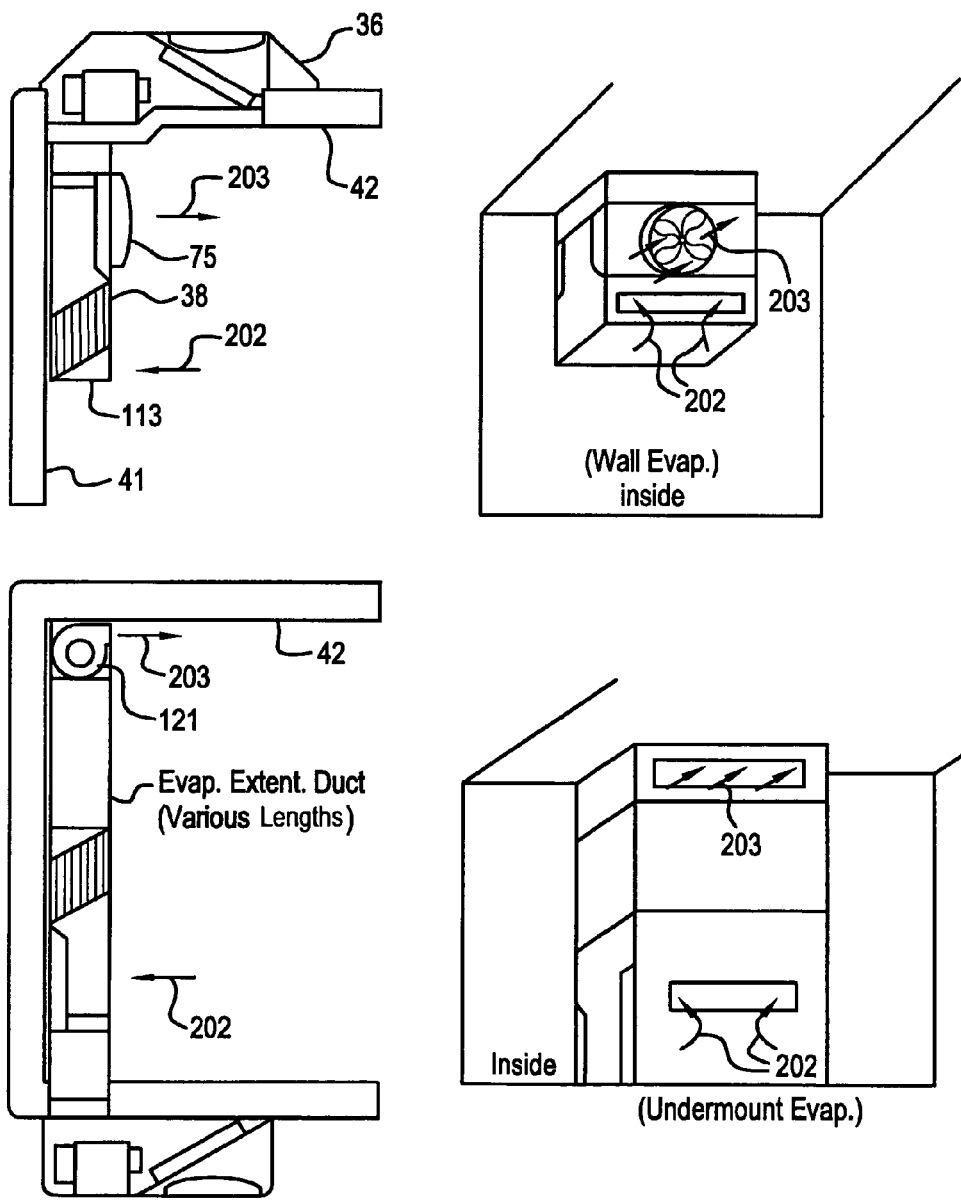
FIG. 37 shows different evaporator layouts.

As shown in FIG. 37, the wall-mounted evaporator layouts draw returned air 202 laterally into the evaporator housing 113 and exhaust chilled air 203 with the reversed evaporator fan 75, or in the undermount evaporator layouts with a blower 121 along the roof 42.

Figure 38:
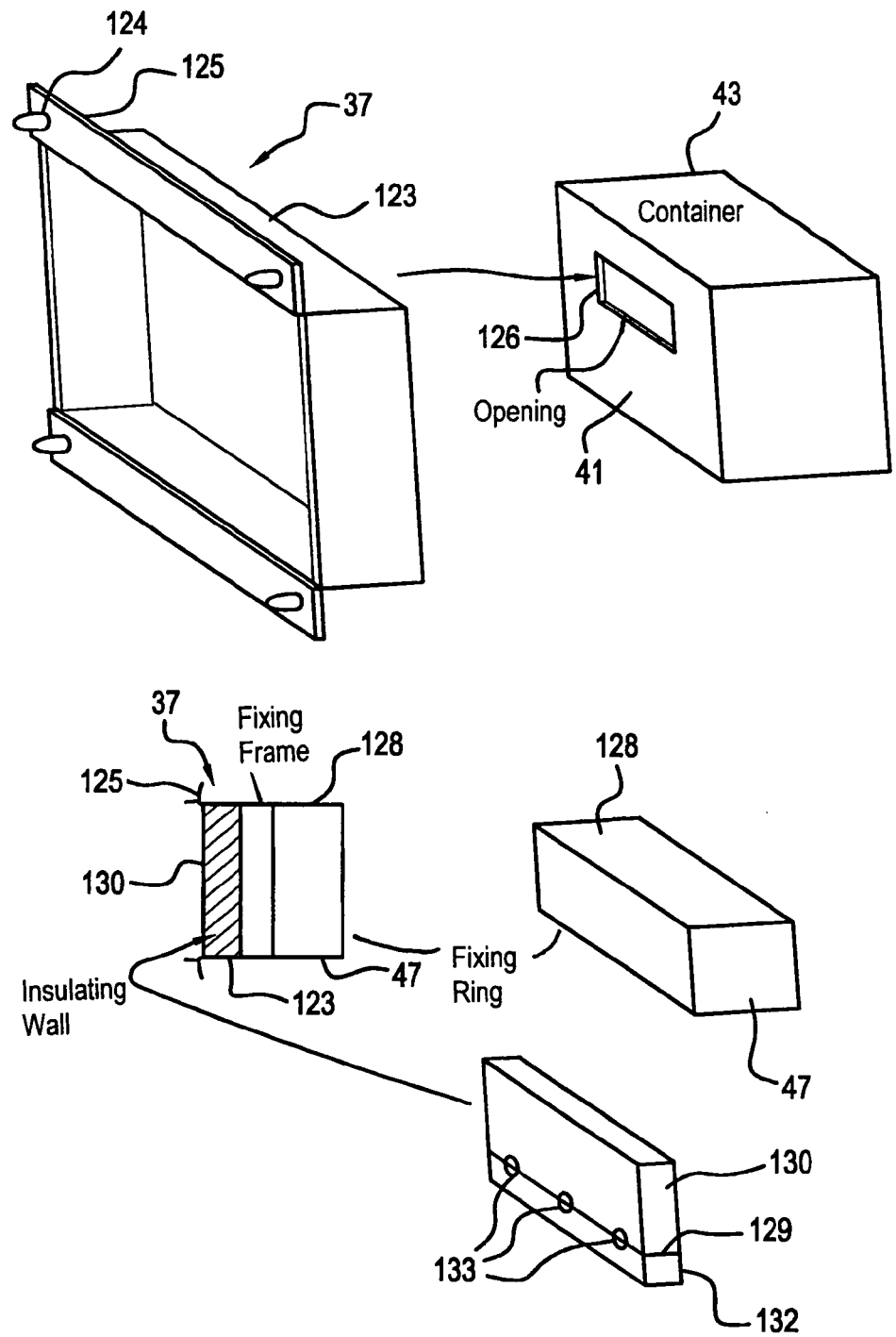
FIG. 38 shows facing joints for mounting condensers and evaporators.
Figure 39:
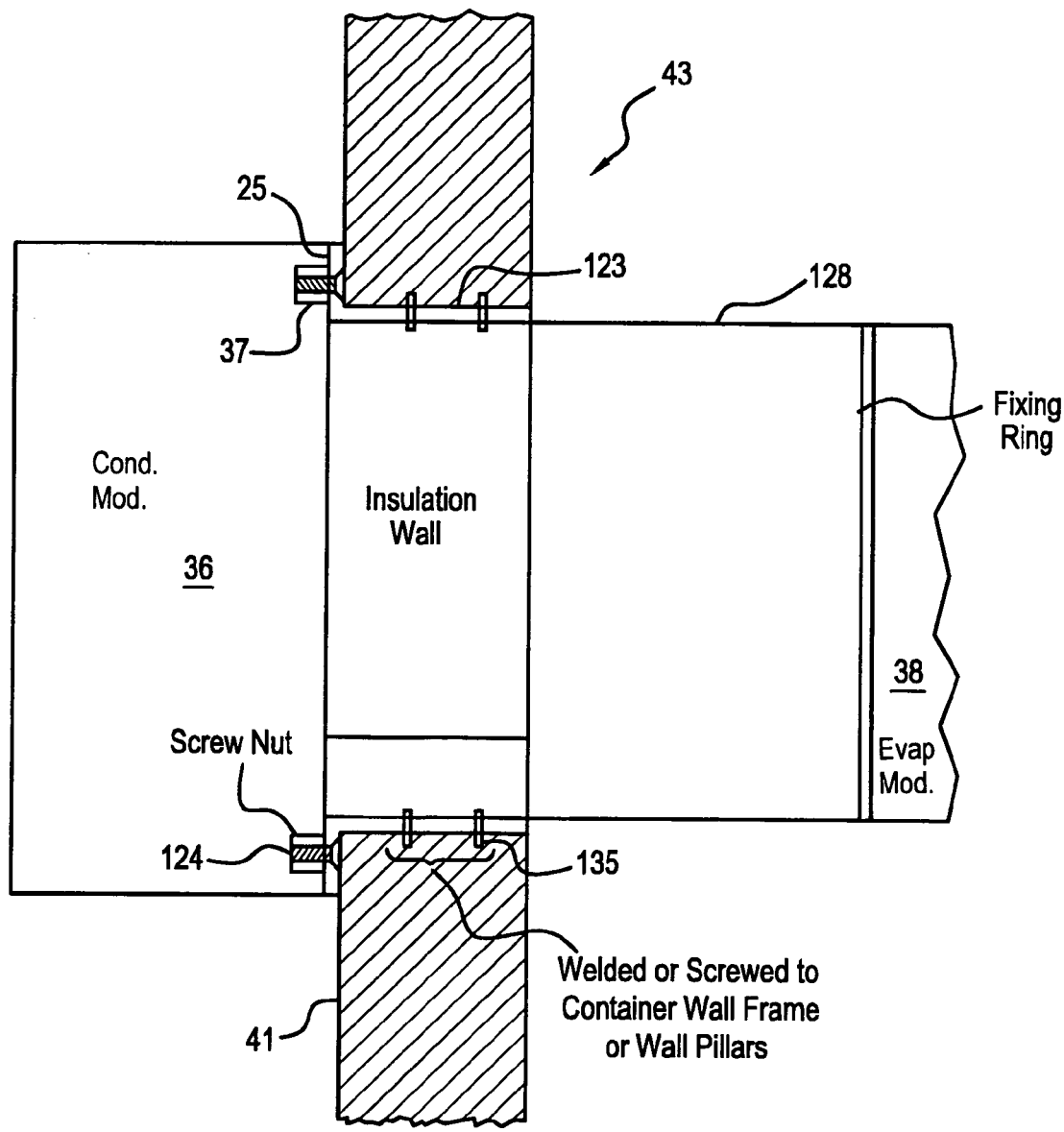
FIG. 39 is a cross-sectional view showing the fixing frame joints.

FIGS. 38 and 39 show the fixing ring 128 for joining the condenser module and evaporator module. The fixing joint 37 has a frame 123 with forward flanges 125 mounting welded bolts 124 for receiving nuts to attach the condenser module. The frame 123 is welded or bolted inside the opening 126 in the front wall 41 of container 43.

A hollow rectangular fixing ring 128 is slidable through the fixing frame 123. The condenser module is mounted on the front of the fixing ring 128, and the evaporator module is mounted on the back of the fixing ring 128. The condenser module is also mounted with bolts and nuts on the front flange 125 of the fixing frame. Disconnecting the bolts and nuts allows the fixing ring 128 and the evaporator 38 to be withdrawn through the fixing frame 123 so that the entire refrigeration assembly may be removed and replaced for returning the truck to the road without endangering its contents or taking time for repairs. An insulating wall 130 is mounted in the fixing ring 128 between the condenser module 36 and the evaporator module 38. The insulating wall 130 has a parting line 129 dividing the insulating wall into a major upper section and a lower section 132. Tube openings 133 extend through the insulating wall 130 at the parting line 129. The lower block 132 may be separated from the main portion of the insulating wall 130 to install or expose the through wall lines.

As shown in FIG. 39, the fixing frame 123 is secured to the front wall 41 of the container 43 by welding or screwing 135 the fixing frame 123 to the container wall 41. The fixing ring 128 to which the condenser module 36 and evaporator module 38 are fixed is slidable through the fixing frame 123 once the nuts 137 have been removed from the welded screw studs 124 in the front flange 125 of the fixing frame 123. Removing the nuts 137 allows the condenser module 36, the fixing ring 128 and the evaporator module 38 to be withdrawn through the fixing frame 123.

Figure 40:
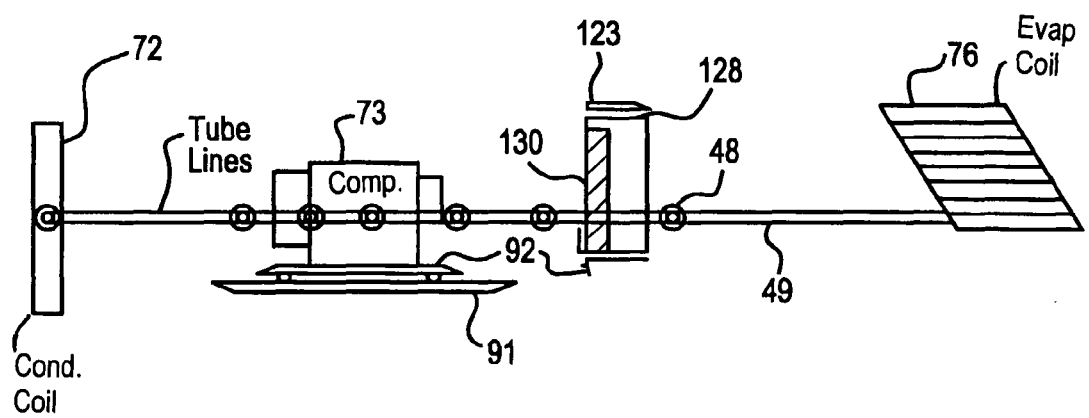
FIG. 40 shows a flexible monoblock refrigeration circuit with a fixing frame.

FIG. 40 is a schematic representation of the elements of a flexible monoblock refrigeration circuit. The compressor 73 is mounted on a compressor and drive isolated plate 92 on a universal refrigeration base tray 91. The compressor is connected to the condenser coil 72 and the evaporator coil 76 with tube lines 49 and flexible joints 48. The tube lines pass through the insulating wall 130 in fixing ring 128, which slides through fixing frame 123.

Figure 41:
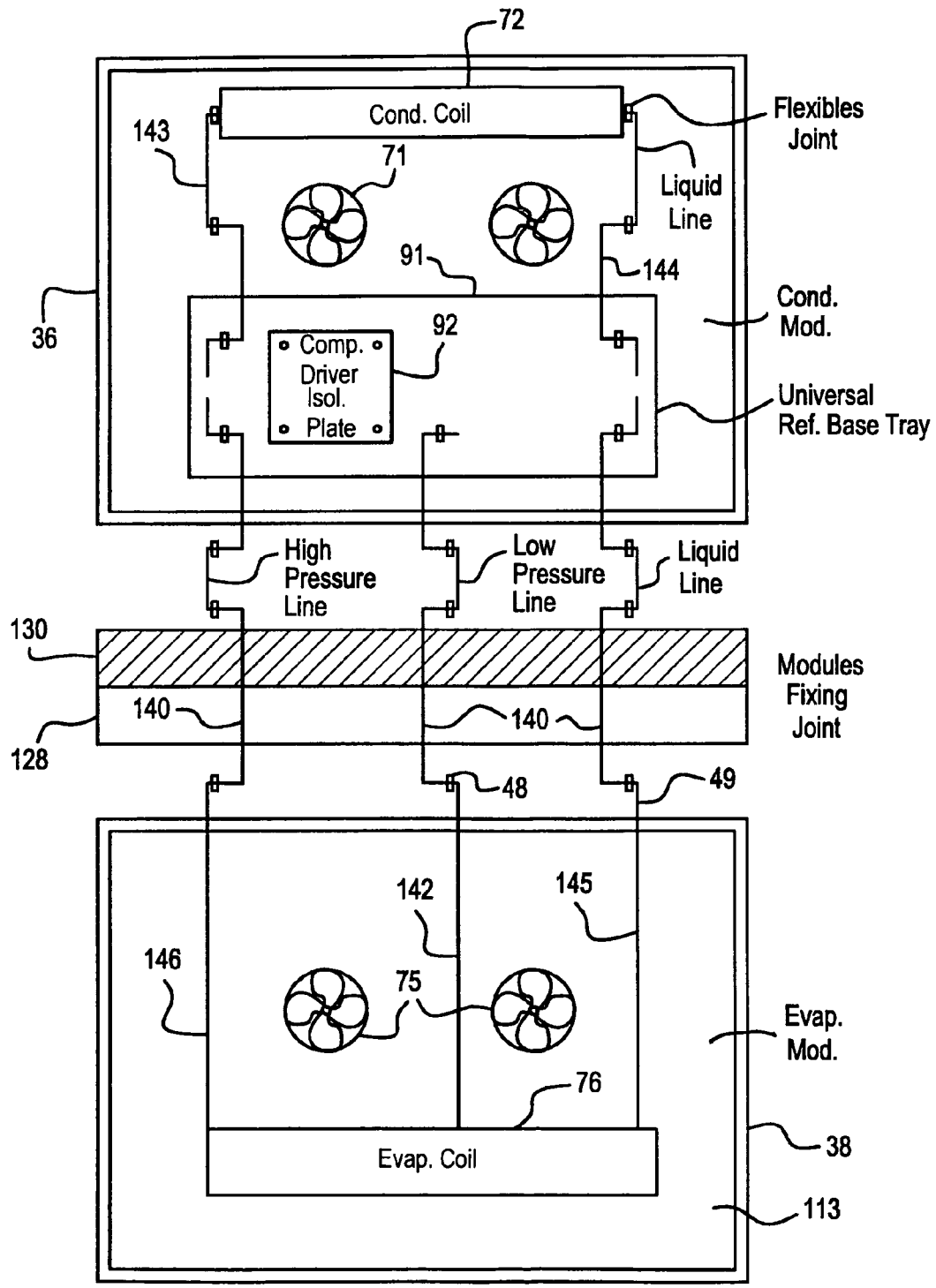
FIG. 41 shows a schematic top view of a flexible monoblock refrigeration circuit.
Figure 42:
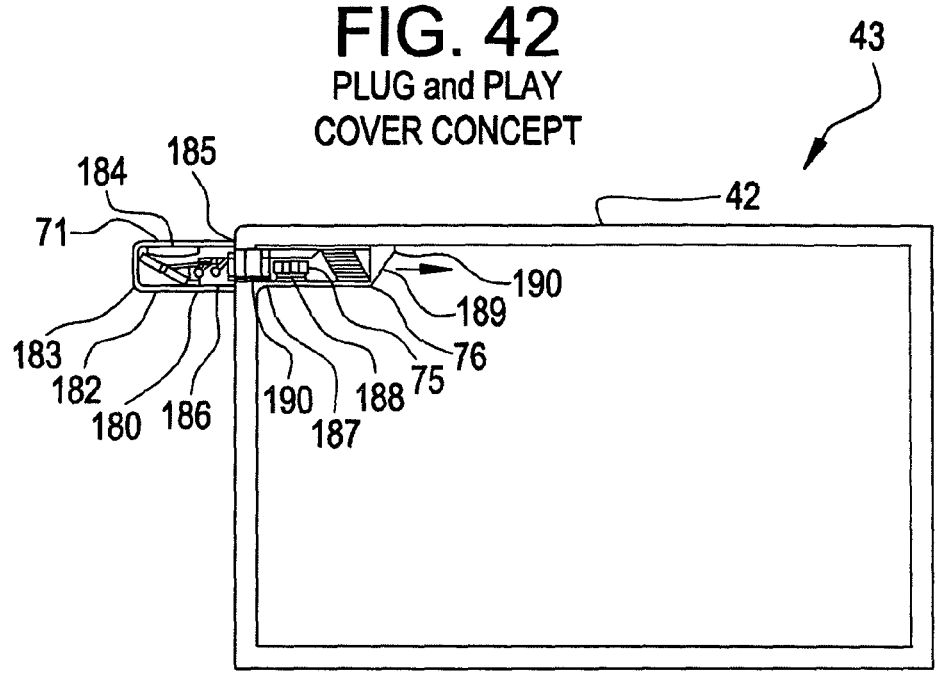
FIG. 42 shows an outside cover and an inside guard cover for a transport refrigeration system.
Figure 43:
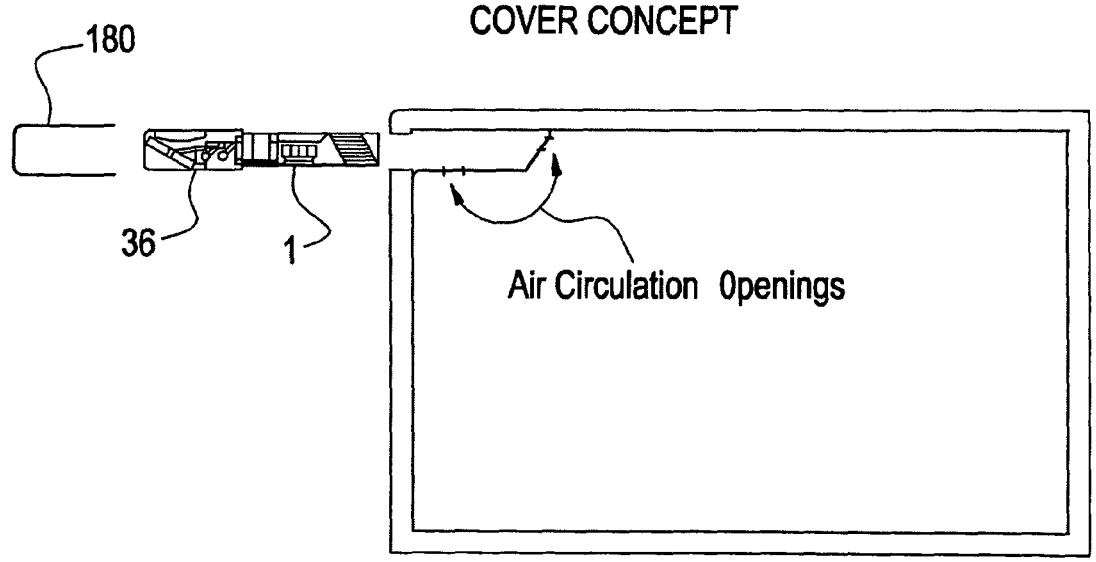
FIG. 43 shows the refrigeration system of FIG. 47 removed through the front wall of the container after removing the outside shell cover and leaving the inside guard cover within the box.

FIG. 41 shows a flexible monoblock refrigeration circuit. An evaporator coil 76, evaporator fans 75 and a housing 113 are parts of the evaporator module 38. The condenser module 36 has condenser fans 71, a condenser coil 72 and a compressor mounted on a compressor and driver isolated plate 92 on a universal refrigeration-based tray 91. Rigid tube sections 140 pass through the insulation wall 130 and have flexible joints 48 at opposite ends. A series of flexible joints 48 and connecting tubes 49 provide a low pressure return line 142 from the evaporator coil, and a high pressure line 143 from the compressor to the condenser coil 72, and liquid lines 144 and 145 from the condenser coil to the evaporator coil. A defrost high pressure line 146 connects the compressor with the evaporator coil 76.

In preferred embodiments such as shown in FIGS. 43-46, covers 180 are provided for the refrigeration system. An outside cover 182 has opening grills in the forward and lower sides 183 for admitting air, and an opening grill 184 in the top for outward flowing of hot exhaust air from exhaust fan 71. Flanges 185 on the outer cover provide a mounting attachment to the condenser housing 186. An inside guard cover 187 has grill openings 188 and 189 for providing air flow through the intake fans 75 and evaporator coil 76. The inside cover 187 has flanges 190 for securing the inside cover to the roof 42 and front wall 41 of the container 43. The inside cover construction prevents its removal from outside of the container 43. That prohibits access to the contents of the container while the refrigeration unit is removed. When the entire refrigeration system is removed, the outside shell cover 182 is first removed, and the nuts securing the condenser section 36 on the joint section 37 are removed, which allows the entire refrigeration assembly 1 to be withdrawn through the opening in the front wall of the container. The outside shell cover 182 is preferably coordinated with the color of the container 43 and remains a part of the container, while the refrigeration systems 1 may be exchanged to put the truck and refrigeration back in service immediately.

Figure 44:
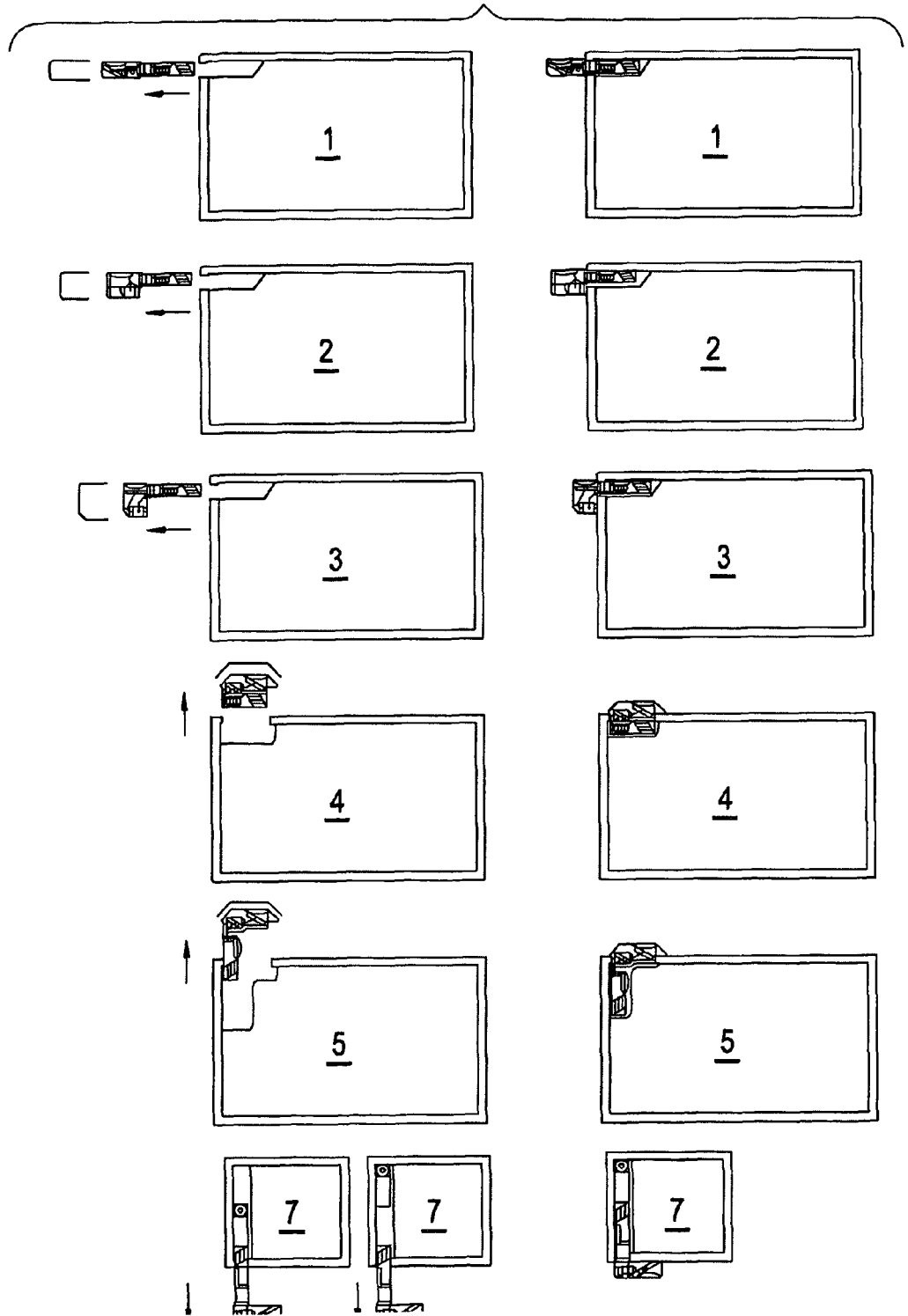
FIG. 44 shows some variations of removable units and covers.

FIG. 44 illustrates some plug and play configurations with condenser covers and refrigeration units, which may be removed forwardly or raised or lowered while leaving the inner evaporator cover in place to prevent access to the container cargo.

Figure 45:
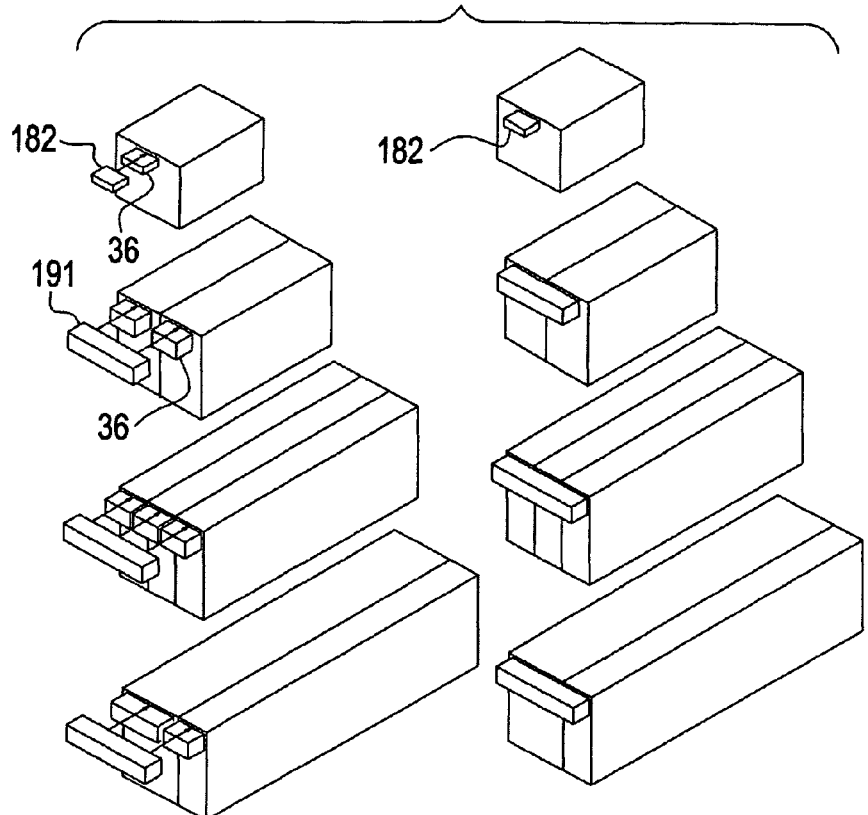
FIG. 45 illustrates several outside shell covers.

FIG. 45 shows single unit front covers 182 for placement on a single refrigeration system 1 on the front wall 41 of a container 43, and wide covers 191 for use on multiple refrigeration systems 1 on partitioned containers.

Figure 46:
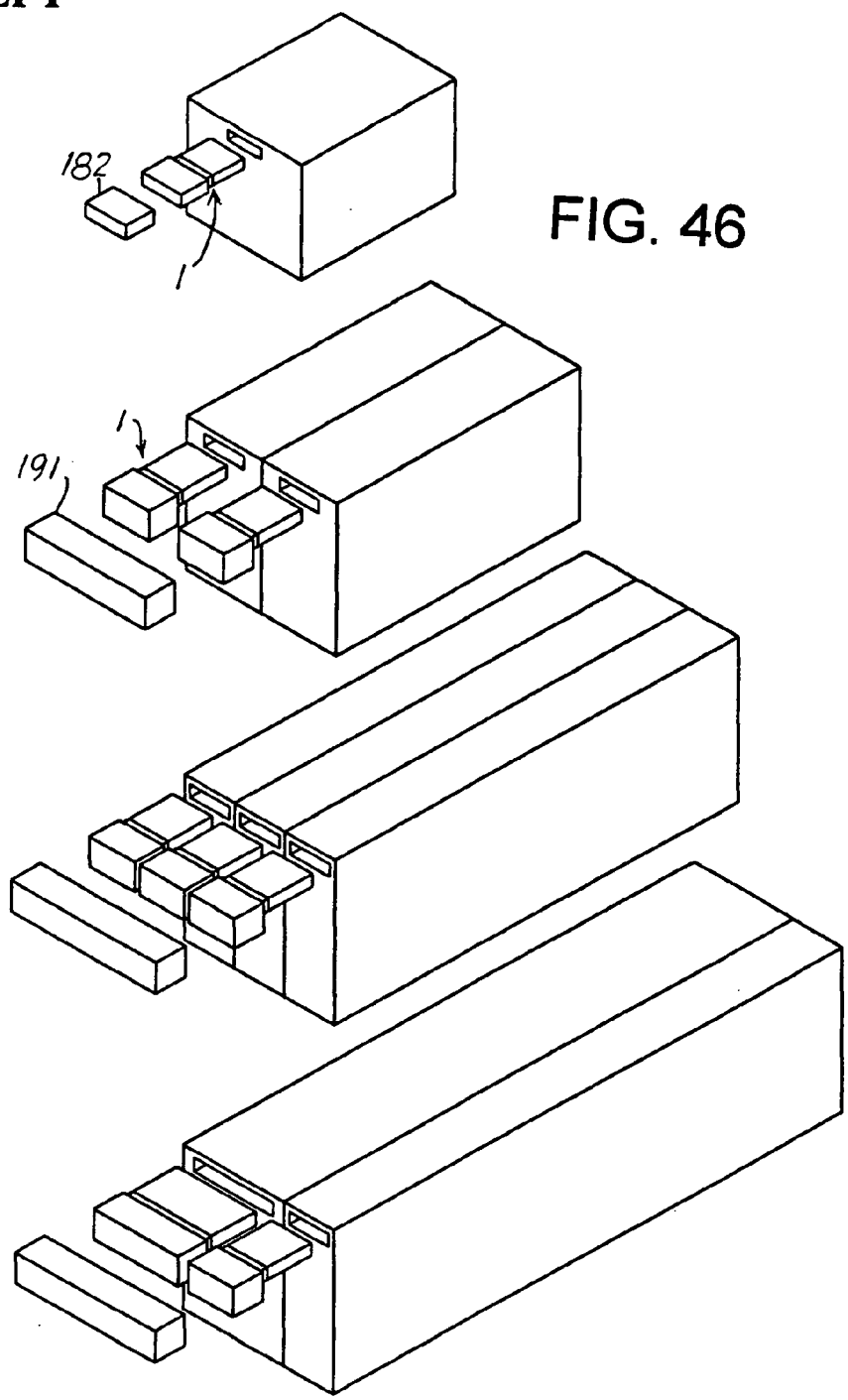
FIG. 46 shows removal of the shell covers and the refrigeration units.

FIG. 46 shows covers 182 and 191 and refrigeration systems 1 removed from the containers.

Figure 47:
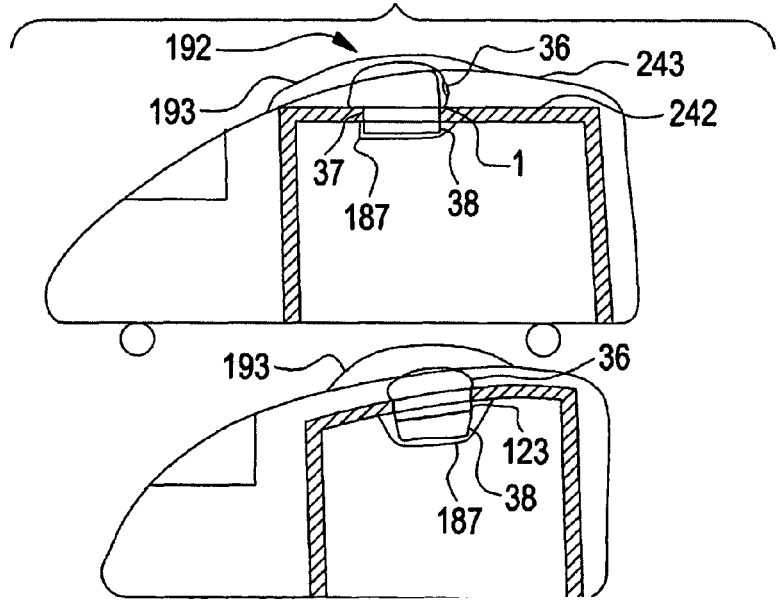
FIG. 47 shows a flexible monoblock with mounted system with custom made outside shell covers.

FIG. 47 shows custom made covers for containers such as containers in delivery vans. The inside guard cover 187 is attached to container box insulation ceiling 242 inside the roof, and the outside shell cover 193 is attached outside of the roof 243 or to the condenser module housing. The fixing frame 123 is connected to the container box insulation ceiling 242. The evaporator module 38 is connected to a fixing ring within the fixing frame and to the fixing joint 37. The condenser module 36 is mounted outside of the fixing frame. Removing the outside shell cover 193 provides access to remove the nuts from the fixing frame so that the entire refrigeration unit 1 may be lifted, withdrawn and replaced, leaving the inside guard cover 187 in place.

The preferred plug and play units are self-contained and have an electric control unit (ECU) mounted on the condenser module. Temperature sensors on the evaporator return air and on the condenser air intake are wired to the ECU. A pressure differential sensor mounted on both sides of the evaporator coil senses the need for defrosting and is wired to the ECU. The ECU has a selector for selecting precise temperature in the container or for selecting a range of fresh, frozen or deep frozen temperatures for the container.

In preferred systems, an operator's control with a display and selectors is mounted in a cab and cargo door, and open/close sensors and remote temperature sensors are mounted in the container. The operator's controls and the additional sensors are connected to the ECU.

When replacing refrigeration units with the operator's controls and additional sensors, after removing the condenser module cover, connectors with wires to the operator's controls and additional container sensors are disconnected from the ECU prior to removing the refrigeration unit.

After a replacement refrigeration unit is installed, the connectors are connected to the ECU of the replacement unit before remounting the condenser cover.

Blowers and fans for circulating air through evaporator and condenser coils are preferably high volume fans or blowers coupled to low draw electric motors. The motors have wires with interconnectors in the condenser modules, and a power supply cable runs from the truck's power supply to the interconnectors. When replacing a refrigeration unit, after removing the condenser module cover the electric power interconnectors are disconnected before the unit is removed. After installing a new unit, the interconnectors are coupled before the condenser cover is replaced.

In preferred systems, the control and sensor lines are mounted in one connector, and the electric motor lines are mounted in another connector. All may be mounted in one connector.

Preferably a line parallel to the control line from the cab supplies low voltage power to the ECU.

Alternatively the ECU is powered with a self-contained battery or from a small step-down transformer and converter mounted with the ECU in the condenser module.

When the refrigeration unit is operated by auxiliary power, for example while a truck is stopped for a short time, sensors and fans are operated with the truck's stored electric power.

For longer stops, the auxiliary power unit also has electrical power supplies that may be connected to the electrical power line from the truck to the refrigeration unit. A switch transfers the source of electrical power from the truck's system to the auxiliary power supply.

Figure 48:
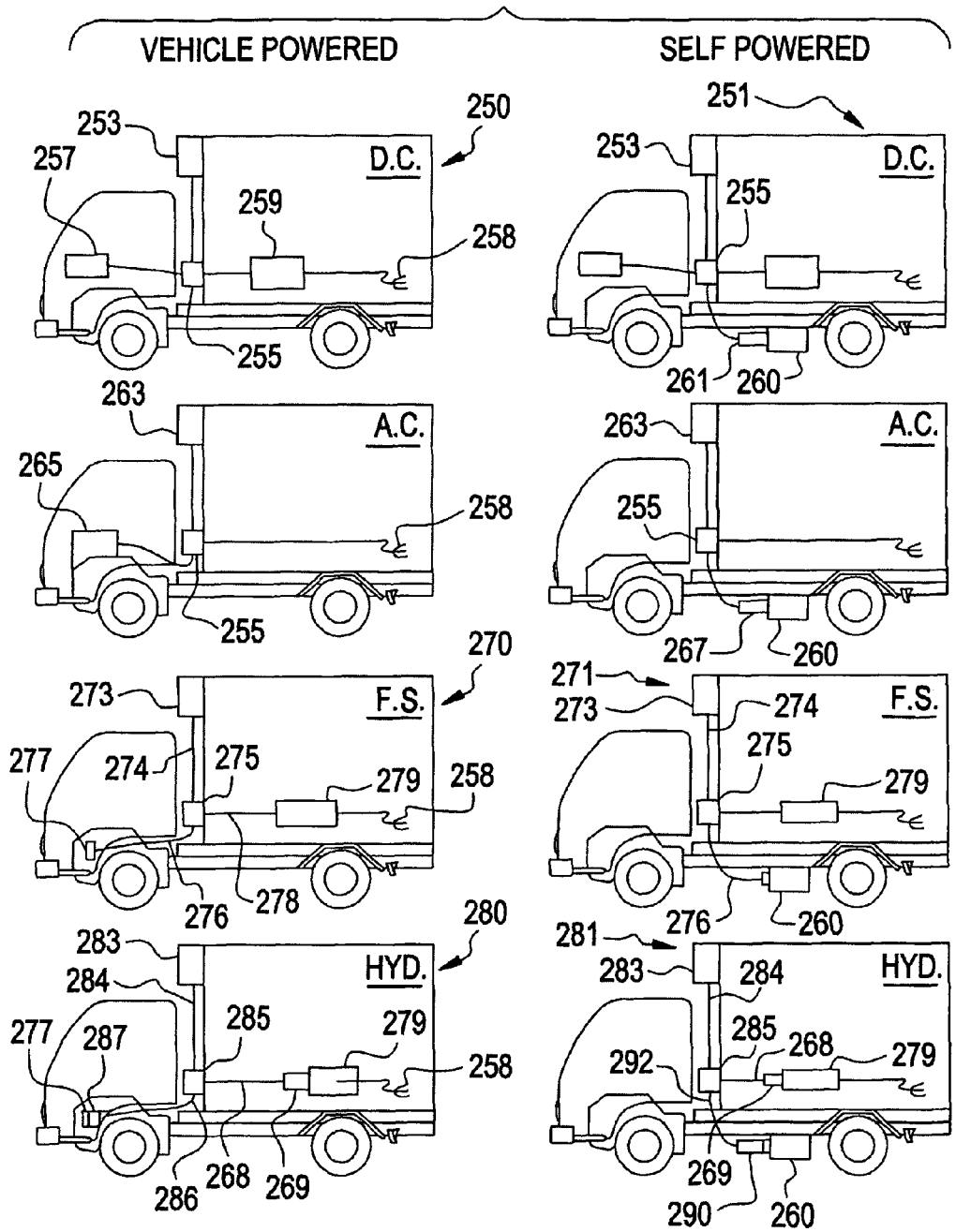
FIG. 48 shows a standby compressor driver configurations and options.

FIG. 48 schematically shows standby options for vehicle-powered and self-powered refrigeration systems in the first and second columns respectively.

In the first row of trucks 250, 251 the refrigeration systems are electrically powered. A switch box 255 connects the refrigeration unit 253 to an engine battery 257 or to an AC/DC converter 259 connected to an electrical outlet plug 258. A dedicated engine 260 is mounted beneath the truck 251 to drive an alternator 261 connected to switch box 255.

In the second row the refrigeration systems 263 are AC powered. Switch box 255 connects the refrigeration system to an AC generator 265 on the truck or to an electrical outlet plug 258. A dedicated engine 260 drives an AC generator 267, which is connected to switch 255.

In the third row of trucks 270, 271, a flexible shaft 274 drives the refrigeration system 273. The shaft is connected to a splitter 275. Splitter 275 is driven by a flexible shaft 276 from the PTO 277 or by a flexible shaft 278 from an electric motor 279 powered from an electrical outlet plug 258.

In the bottom row of trucks 280, 281, hydraulic motors drive a refrigeration system 283. Hydraulic lines 284 are connected to T-box 285. Hydraulic lines 286 are connected to a pump 287 on the PTO 277. Hydraulic lines 268 from T-box 285 are connected to a pump 269, which is powered by an electric motor 279 powered from plug 258.

In the self-powered truck 281, dedicated engine 260 drives pump 290, which supplies hydraulic fluid through lines 292. Lines 292, 268 and 284 have directional check valves.

The systems of the present invention can be retrofitted to current refrigeration systems on trucks. Preferably the hydraulic drives replace dedicated engines in existing systems and provide savings in expense, weight and operating costs.

Figure 49:
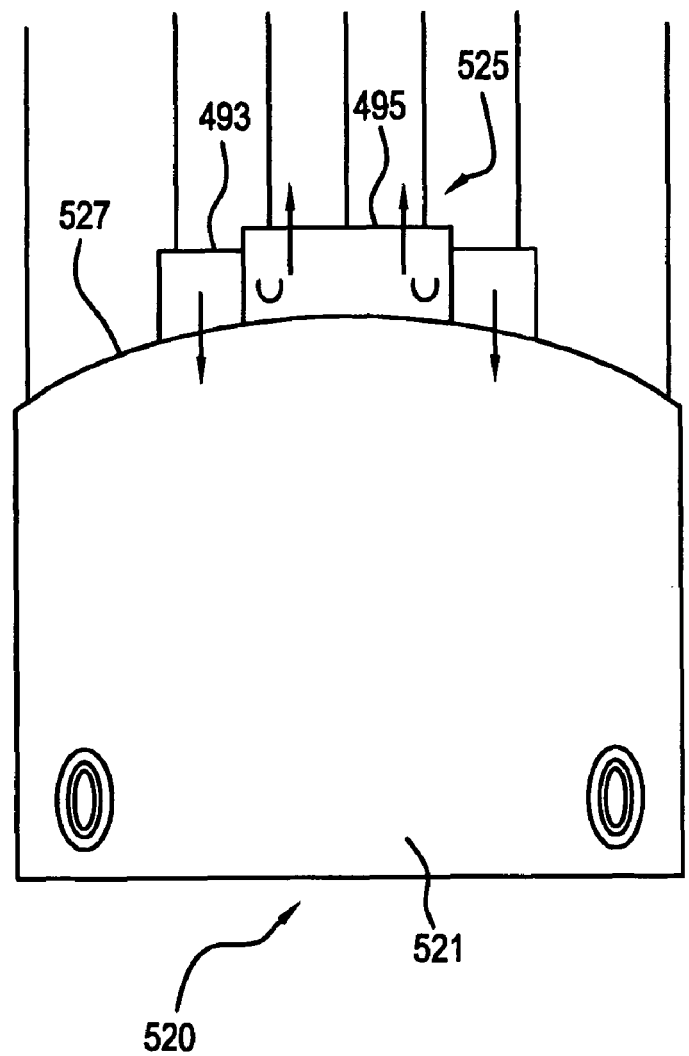
FIG. 49 shows a front view of a footprint for refrigeration units.

FIG. 49 shows a rear wall 521 of a bus 520, with an air conditioning unit 525 mounted on the curved roof 527. As shown in the drawings, the air conditioning system 525 has Type B condenser modules 495 mounted between Type B evaporator modules 493.

The multiple range modular system has cooling, freezing and deep freezing capacities, and includes heating only.

A universal cab control and monitor supervises a universal programmable electronic control unit in the modulator.

The compressor or compressors are driven by quick-coupled motors, which may be quickly removed from the refrigeration unit to isolate the motor from the refrigeration system. Preferably the fans are mounted on the container cover. The module-mounted fans are driven by electric motors with quick disconnects, which may be quickly removed from the refrigeration system by removing lids of the evaporator and/or condenser modules. Thus, the refrigeration system and the modules are quickly isolated so that the existing refrigeration system may be removed from the vehicle, and a new refrigeration system may be placed on the vehicle without need for supplemental cooling of the enclosure while the refrigeration system is being repaired. Electric motors may be disconnected from the refrigeration system. The refrigeration system may be removed and replaced, and the motors may be reconnected to the compressor and fan within thirty minutes.

A flexible refrigeration unit housing attaches an evaporator module with defrost and vent doors to a twistable condenser module and twistable fan modules. Variable module fan housings provide controllable air volume and air speed modulation. The modules may be wall-mounted, rooftop-mounted or underbody-mounted. A liftable condenser module permits outward sliding and lifting of the complete refrigeration system away from a space between a cab and a box when necessary. The modules are connected to universal fixing frames on the boxes, trailers, containers, buses or cabs or other specialty vehicles to be cooled. Collars are provided to mount the refrigeration systems half in and half out of the cooled enclosure, fully out of the enclosure or positions in between. Twistable refrigerant lines and joints allow relative moving, repositioning and reorienting of the modules to match requirements for wall mounting, rooftop mounting or underbody mounting. The compressor drive mount is turnable to provide vertical compressor operation in all positions.

In preferred embodiments, inside covers with doors and air filters are provided in the enclosures, and outside covers are provided on the enclosures, and the modules fit between the covers.

Internal or external ducting is providing to maintain uniform temperatures or varied temperatures in the enclosure, or to boost ventilation. LED status displays on outside surfaces of the enclosure, for example on outside surfaces of the outer cover, display status of the refrigeration system, such as operating in range, out of range or failure. The invention provides compact, self-contained, removable modular flexible universal transport temperature control hydraulically driven refrigeration units.

Apparatus temperature management is provided by the modular hydrostatic transport refrigeration system, which is driven by a hydraulic pump and motor or motors.

An alternator drives a modular electric transport refrigeration system. A modular hydroelectric transport refrigeration system is driven by a variable displacement hydraulic pump supplying hydraulic pressure to a hydraulic motor that drives the compressor. An alternator is connected to the hydraulic pump or to the hydraulic pump to operate fans for the evaporator and the condenser modules. Modular hydrostatic refrigeration retrofit kits are provided to conform existing vehicles to the system. The new unit has a small configuration for space, weight and access economies. The invention provides a self-contained complete refrigeration circuit and components mounted in one housing, a mono-block or mono-chassis.

The new system is a removable unit. Its quick and easy fitting capacity provides a plug-and-play concept. The units are modular and are constructed in standard measurements having the same surface footprint. The units are flexible and have plural mounting combination capability with multiple capacity configuration capability. A few models cover all application ranges.

The transport refrigeration unit has mobile capability and is useful on cars, trucks, trailers, containers, buses, machinery, trains, boats and other vehicles. Temperature control is provided by unit multiple temperature management capability, with complete temperature ranges from cooling to heating. Each unit is a single self-contained device. The new refrigeration system is compact, self-contained, removable and modular.

The new invention provides a modular, hydraulically driven refrigeration system driven by an open-type variable displacement hydraulic circuit.

The invention also provides a modular electrically driven refrigeration system driven either by an AC alternator or a DC alternator.

A cargo container, for example, may have three or more separate areas requiring different amounts of refrigeration. Three separate units would be mounted on the front of the container. Each unit is powered by a hydraulic motor driving a compressor and electric motors or hydraulic motors driving evaporator and condenser fans. A single hydraulic pump supplies the three hydraulic motors. Each unit is set to a different temperature requirement of the particular partitioned section of the container.

Figure 50:
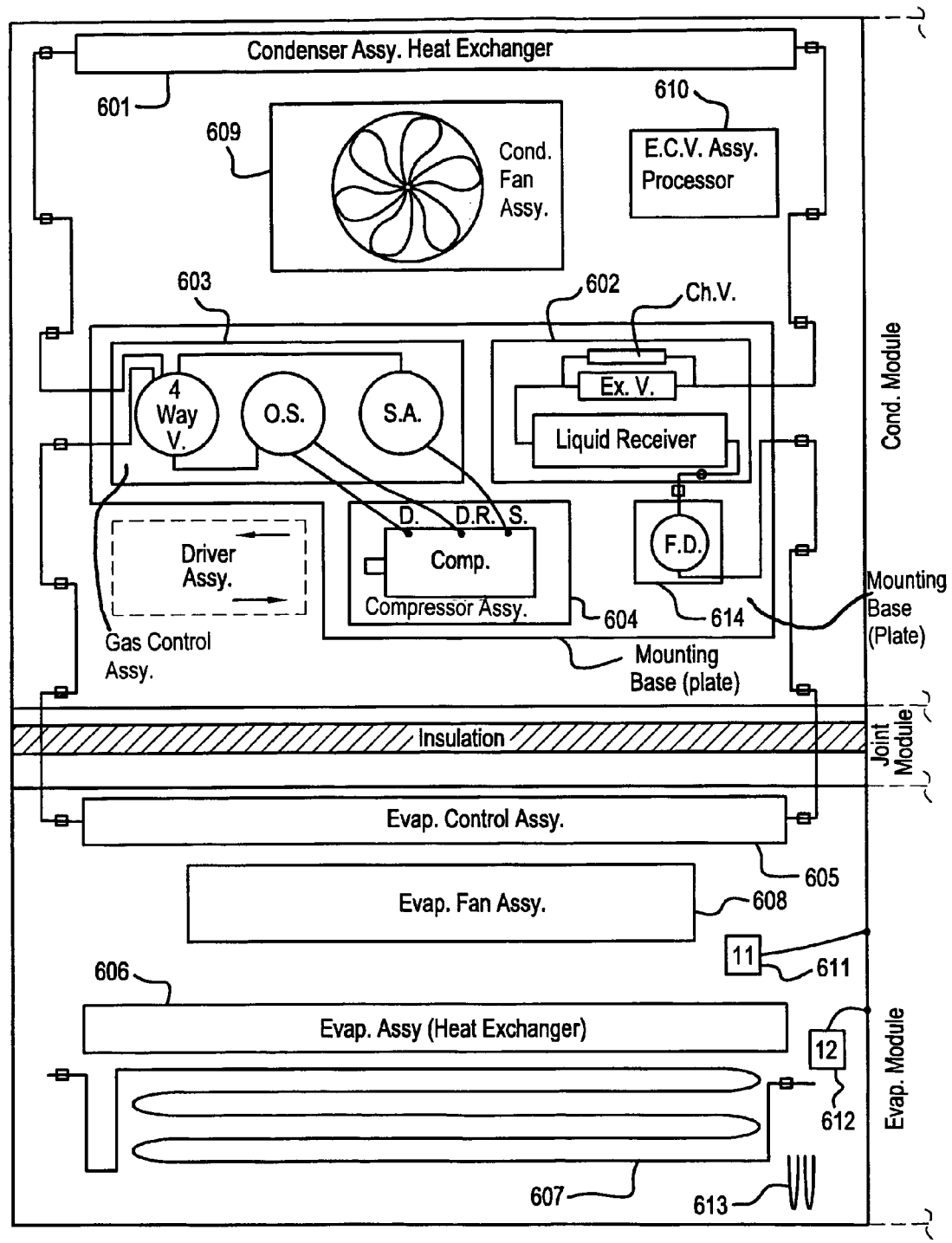
FIG. 50 is a schematic top view of an alternate transport refrigeration system.

FIG. 50 is a schematic top view of an alternate transport refrigeration system. A condenser assembly 601 is connected to a liquid line control assembly 602 and a gas line control assembly 603. The gas line control assembly 603 is then connected to a compressor assembly 604. The liquid line control assembly 602 is connected a filter dryer 614 and then to an evaporator control assembly 605 in an evaporation module. The evaporation module also includes an evaporation assembly 606, a drain pan heater coil assembly 607, an evaporator fan assembly 608, a return air temperature sensor 611, a discharge air temperature sensor 612, and drain line resistors 613. A condenser module also contains a condenser fan assembly 609 and an E.C.V. assembly 610.

Figure 51:
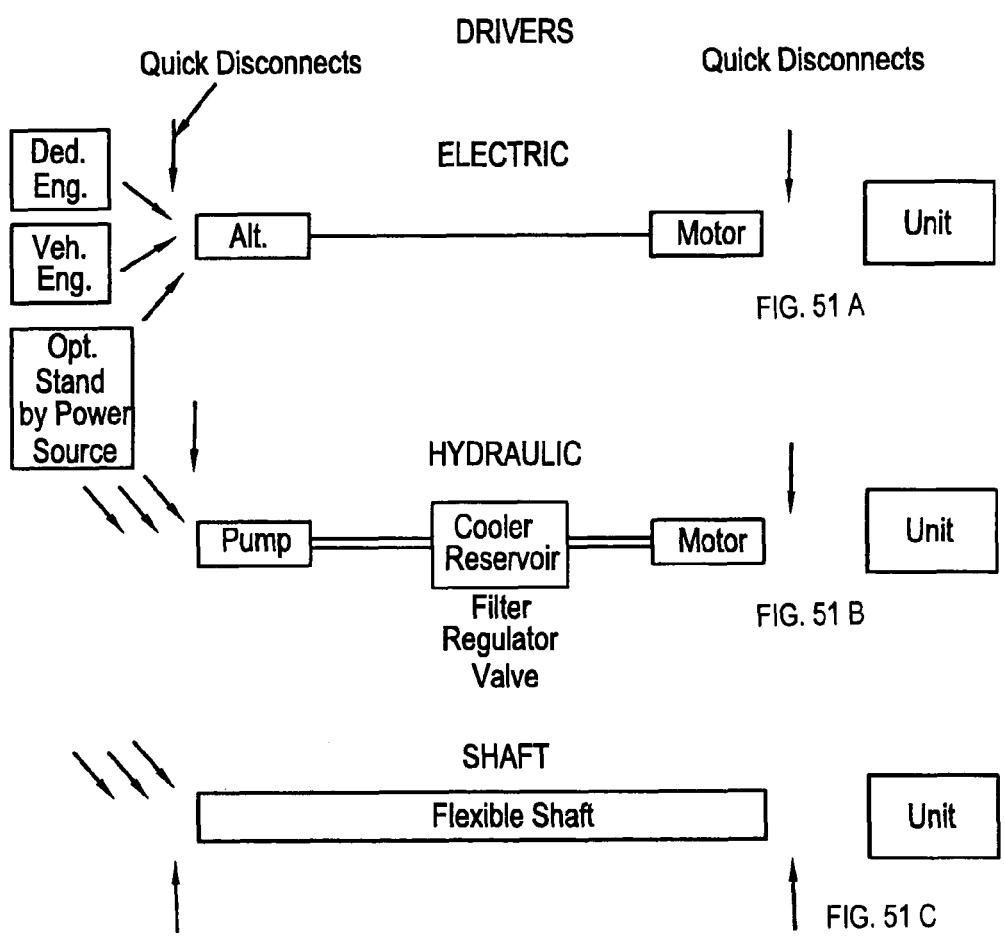
FIGS. 51A, B, and C are schematic views of electric, hydraulic and shaft drivers.

FIGS. 51A, B and C are schematic views of electric, hydraulic and shaft drivers.

Figure 52:
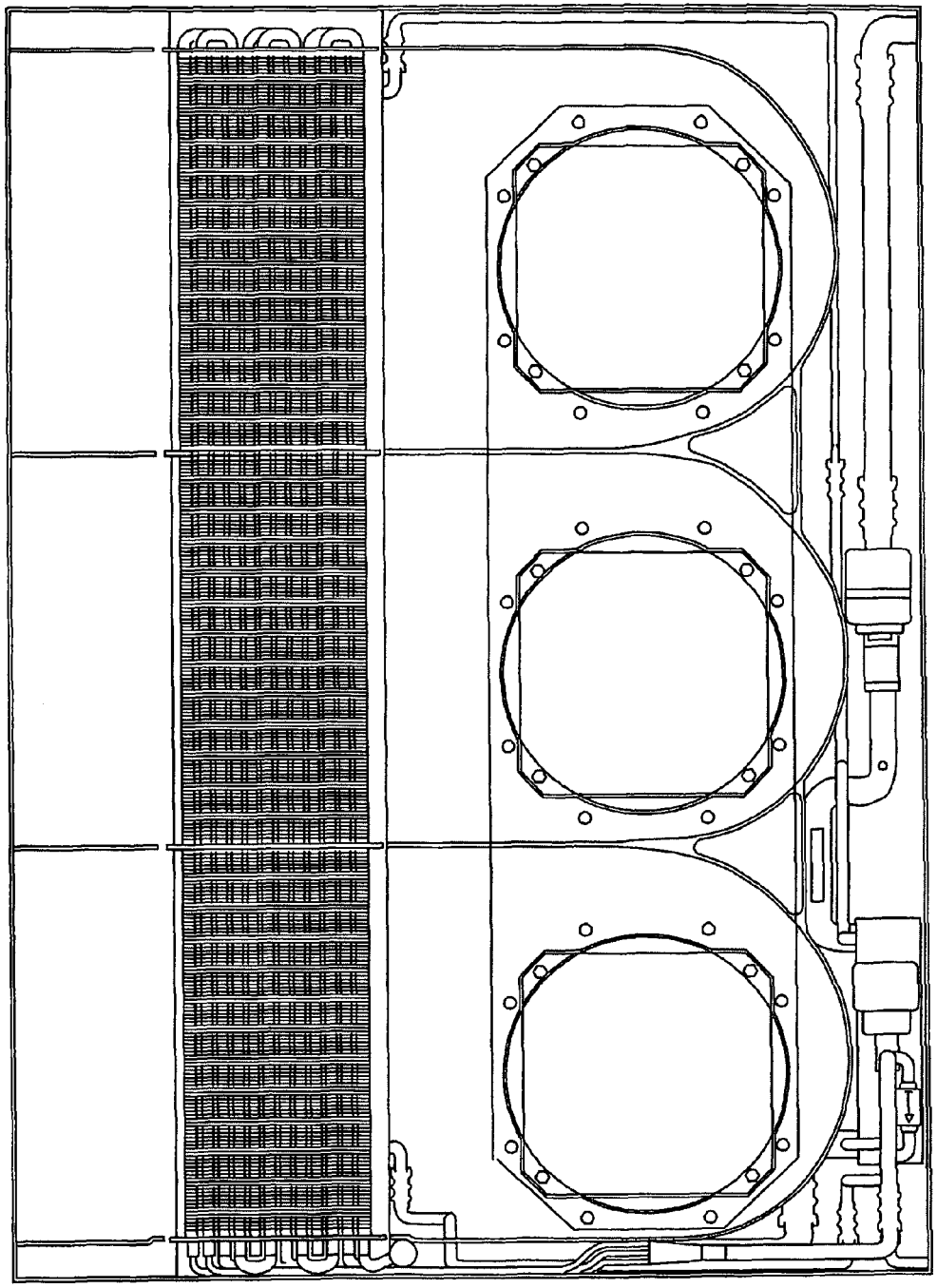
FIG. 52 is a top view of an evaporator module with blower fan mountings for removal from top or bottom blower fans that are motorized impeller types.

FIG. 52 is a top view of an evaporator module with blower fan mountings for removal from top or bottom blower fans that are motorized impeller types.

Figure 53:
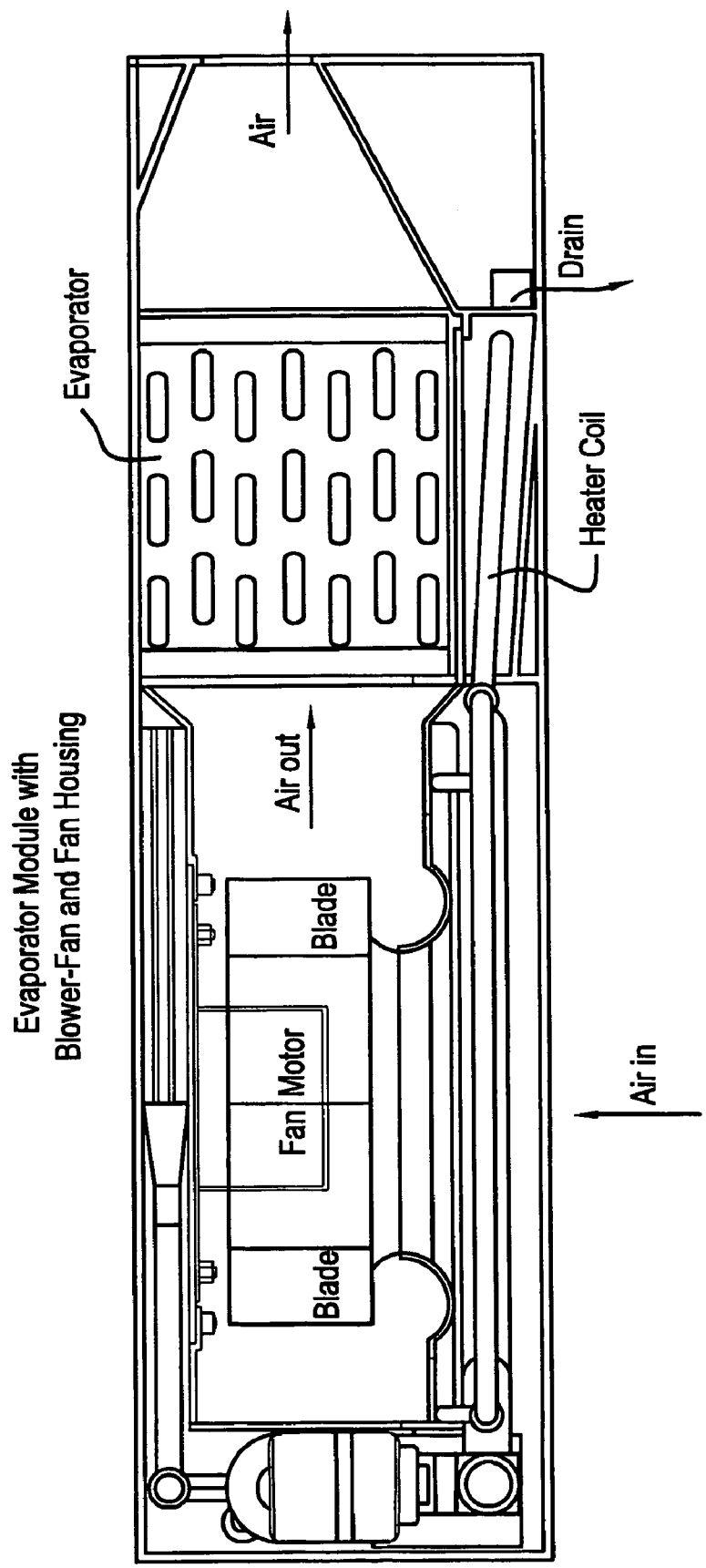
FIG. 53 is a side view of an evaporation module.

FIG. 53 is a side view of an evaporation module.

Figures 54, 55:
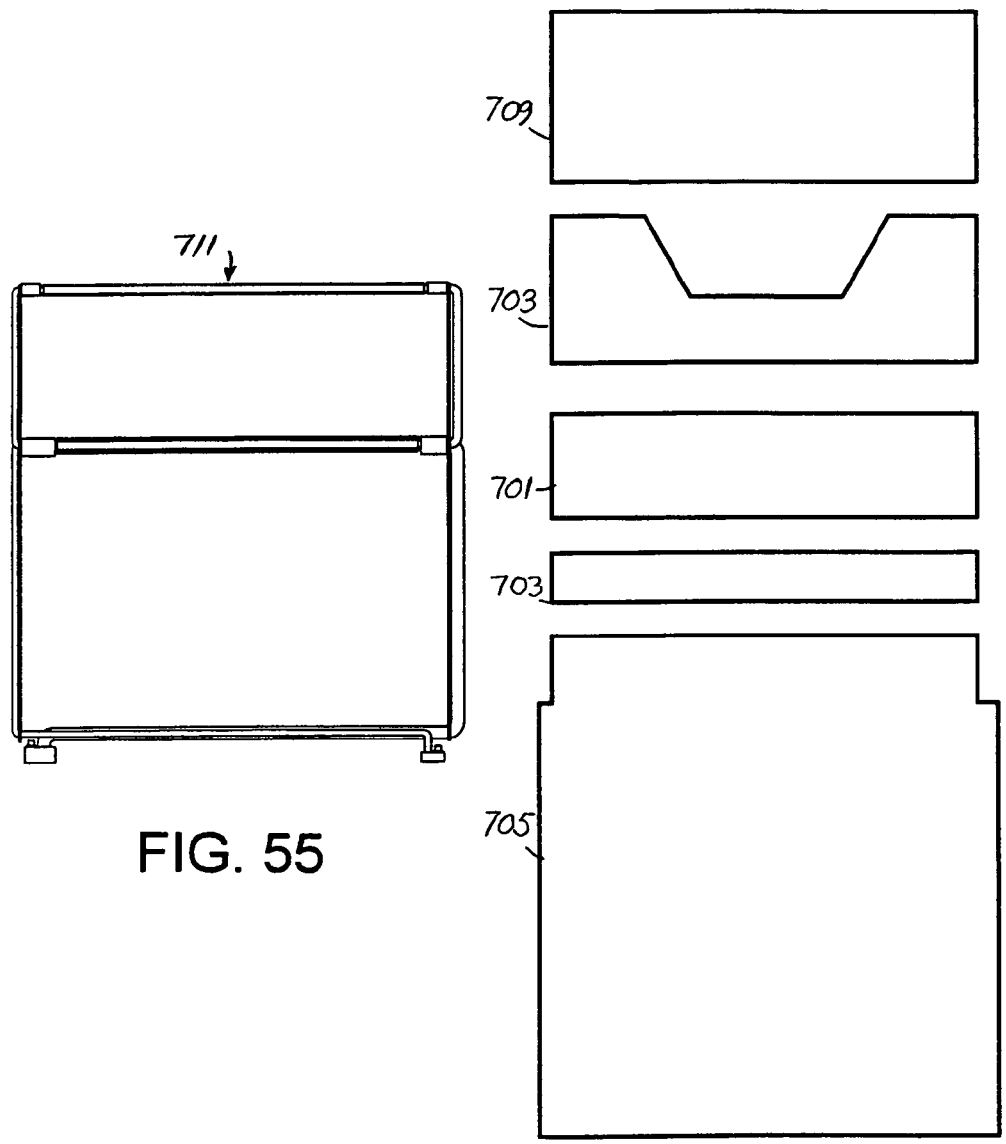
FIG. 54 schematically shows the modules before they are assembled.
FIG. 55 shows a flexible refrigeration tubing harness.

FIG. 54 schematically show modules before they are connected. Compressor module 701 is fixedly attached to subassembly module 703 and evaporator module 705 is fixedly attached to joint module 707. The condenser module 709 is not fixed to any other module in the flexible configuration.

FIG. 55 shows a fluid line harness 711 used when the condenser module 709 is flexibly attached to the compressor and subassembly modules 701 and 703, and when the compressor and subassembly modules are flexibly attached to the joint module 707.

Figure 56:
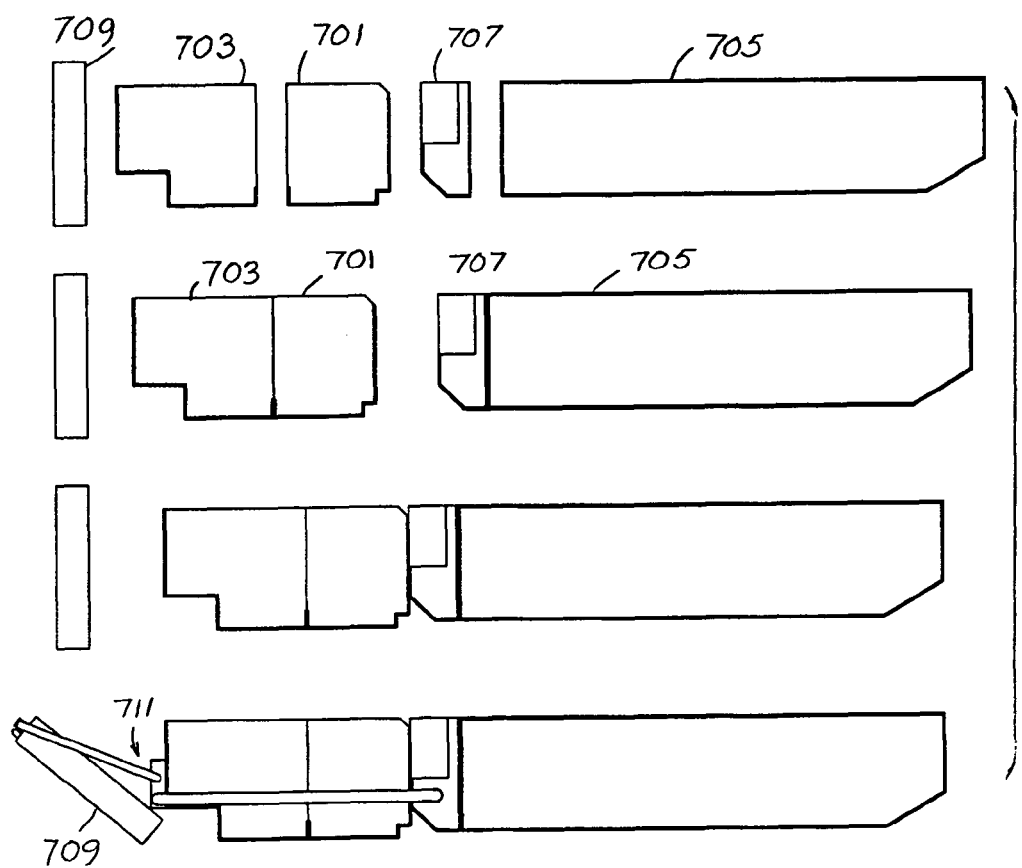
FIG. 56 shows side views of steps in module assemblies and in the application of the fluid tube flexible unit to the modules.

FIG. 56 shows side views of the modules before they are attached after the compressor and subassembly modules are attached and after the evaporator and fixing joint modules are attached, and after the compressor module 701 is juxtaposed with the joint fixing module 707. Finally FIG. 56 shows the fluid line harness 711.

Figures 57, 58:
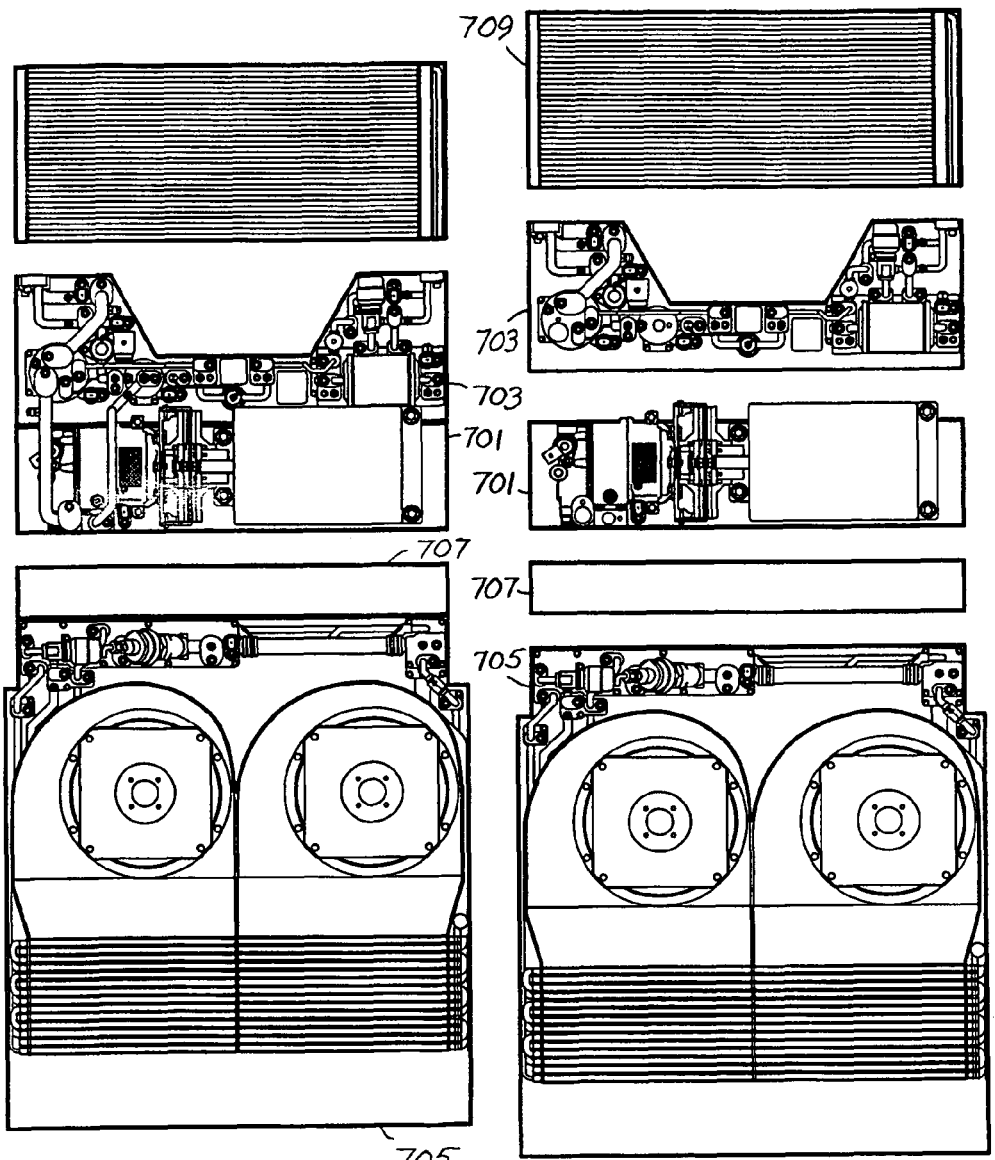
FIG. 57 shows refrigeration components mounted on the modules before they are connected.
FIG. 58 shows a preliminary connection of the modules shown in FIG. 57.

FIGS. 57 and 58 show the refrigeration components connected to the modules 701, 703, 705 and 709 before the modules are interconnected and after the modules are interconnected.

Figure 59:
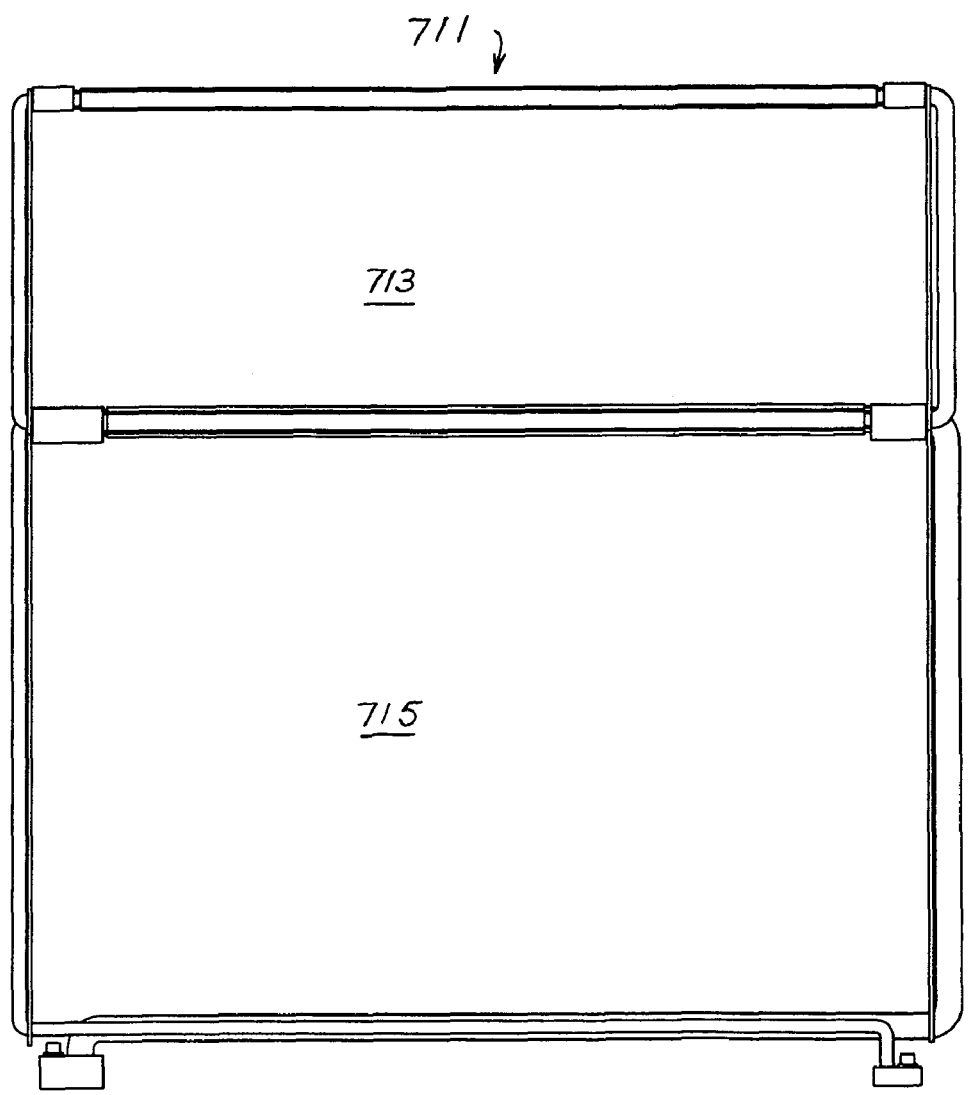
FIG. 59 is an enlarged view of the twistable tube connection shown in FIG. 55.

FIG. 59 is a top view of the refrigeration harness 711 for flexibly connecting the refrigerant fluid lines between the modules. The condenser module is placed in the space 713, and the compressor and connected subassembly modules are placed in space 715. Connector 717 connects the refrigeration inlet line to a connector on the joint module for flow to the evaporator module. Connector 719 connects the vapor return line to a connector on the joint module for returning vapor from the evaporator.

Figure 60:
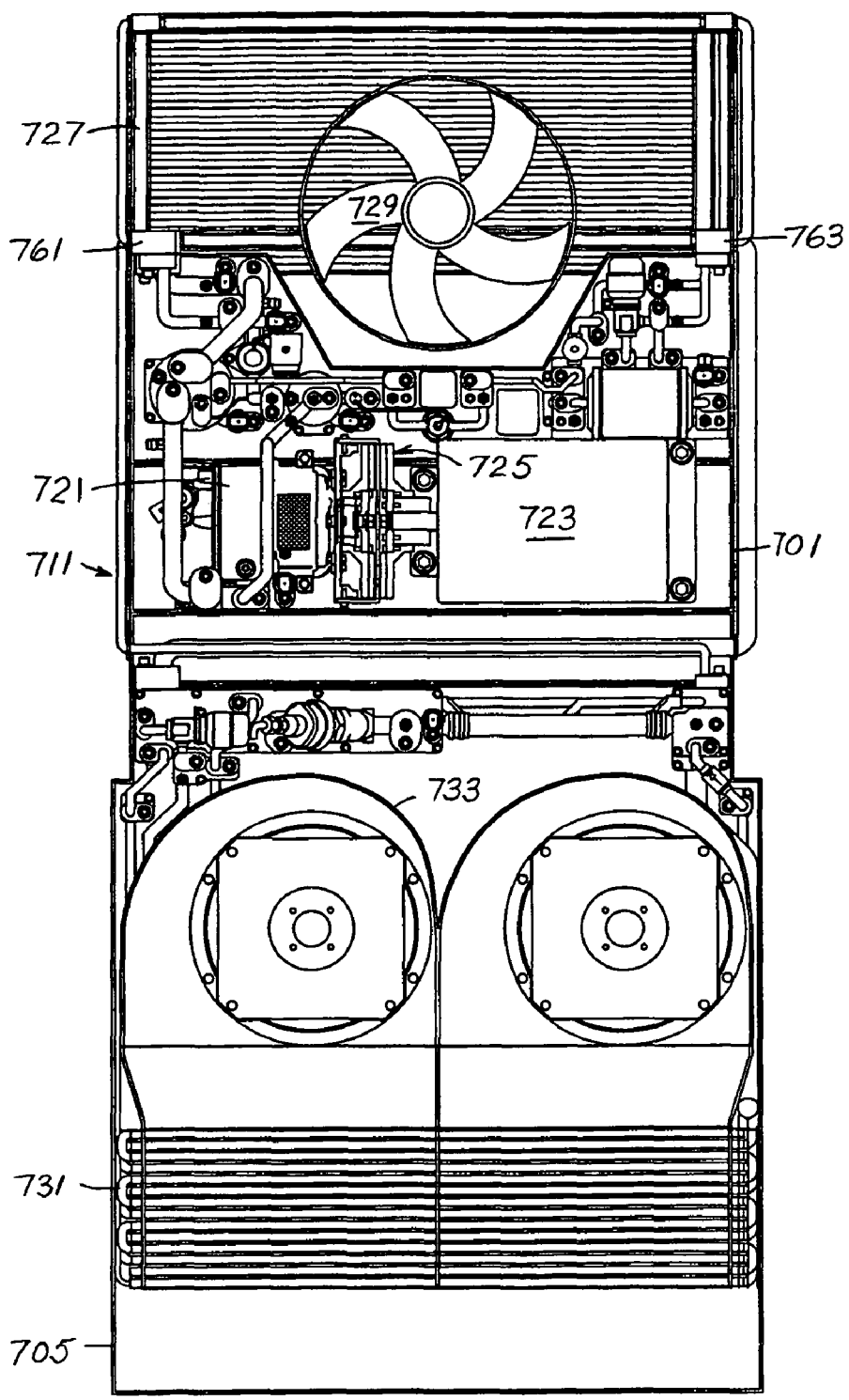
FIG. 60 shows the modules interconnected by the twistable tube connection for flexible installation and repositioning of modules.

FIG. 60 is a top view of the assembled elements. Compressor 721 is driven by motor 723 coupled to the compressor through a magnetic coupling 725. A condenser coil 727 is mounted in the condenser module 709. Condenser fan 729 is mounted on a lid on the condenser. Evaporator coil 731 is mounted on the evaporator module 705 and evaporator fans 733 are mounted on an evaporator module lid. The fluid line harness 711 is shown connected to the modules.

Figures 61, 62:
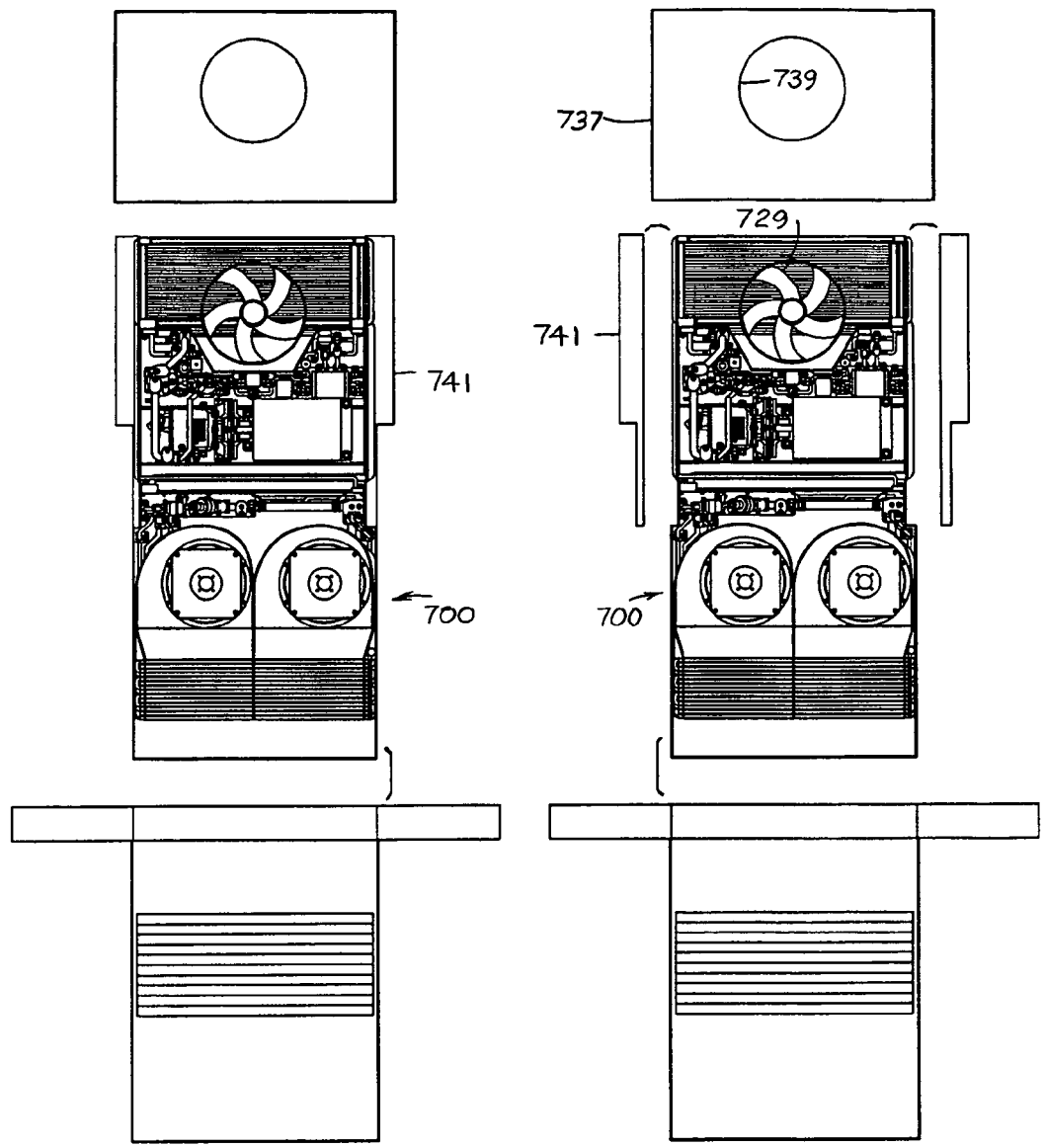
FIG. 61 shows mounting sides prior to attachment to the modules.
FIG. 62 shows mounting sides connected to the modules as frames for connecting the modules to the container or other conditioned space.

FIG. 61 shows sides 741 ready to attach to the modules. Cover 737 is a cover attached to the truck which has an opening 739 aligned with the condenser fan 729 when the cover is assembled on the truck.

FIG. 62 shows the sides 741 mounted on the modules of the refrigeration unit 700.

Figure 63:
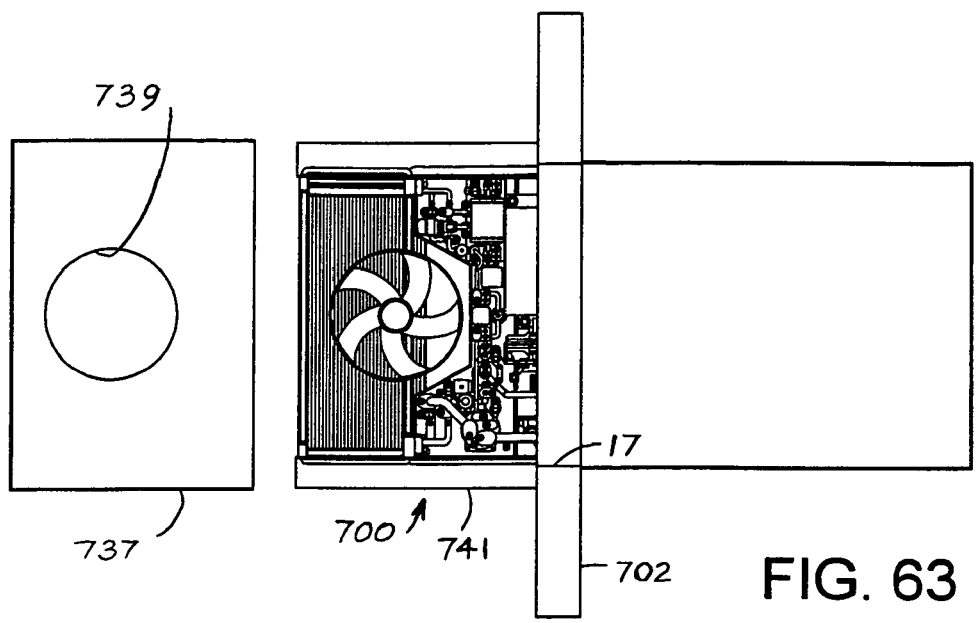
FIG. 63 shows the assembled side frames connected to the container front wall for mounting the self-contained refrigeration unit in the container.

FIG. 63 shows the refrigeration unit 700 mounted in the front wall 702 of a container with the sides 741 attached to a fixed frame around the opening 17 in the front wall to hold the entire refrigeration unit 700 in the front wall.

Figure 64:
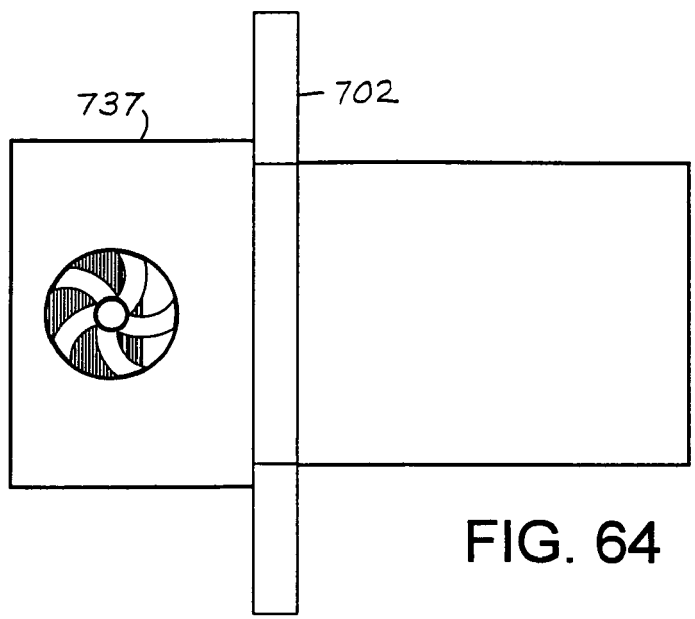
FIG. 64 shows the external cover connected to the front wall of the container and covering the compressor and subassembly module and the evaporator module and evaporator module lid-mounted fan.
Figure 65:
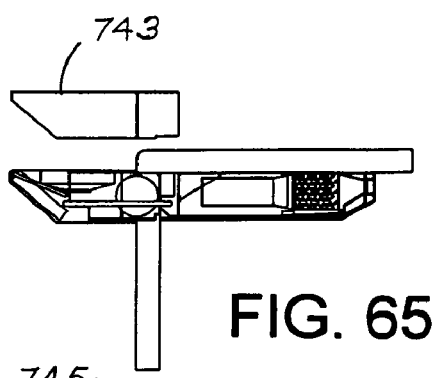
FIGS. 65-68 show side mounting frames for mounting the modules in different positional relationships of modules in a flexible transport refrigeration system.
Figure 67:
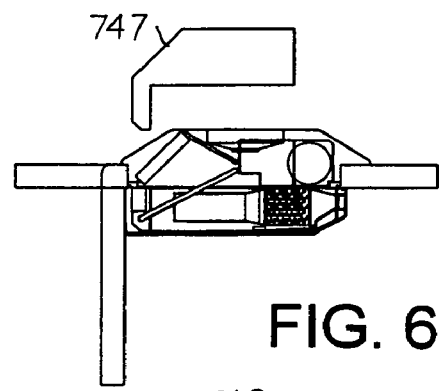
Figure 66:
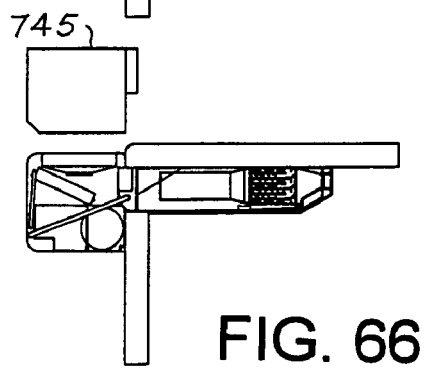
Figure 68:
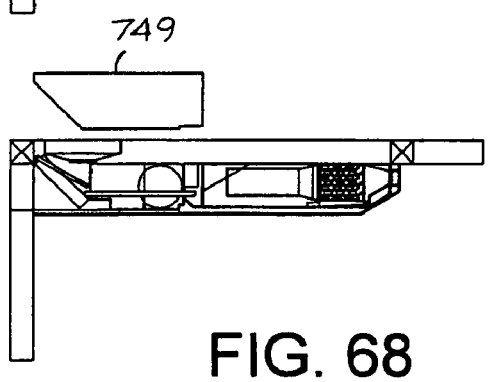

FIG. 64 shows the cover 737 reattached to the front wall 702 of the truck trailer container.

FIGS. 65-68 shows various forms of side attachments 743, 745, 747 and 749 which are used in different configurations of the flexibly connected modules of the refrigeration units 700 to hold the refrigeration units attached to the containers in different relative positions of the modules within the refrigeration units.

Figure 70:
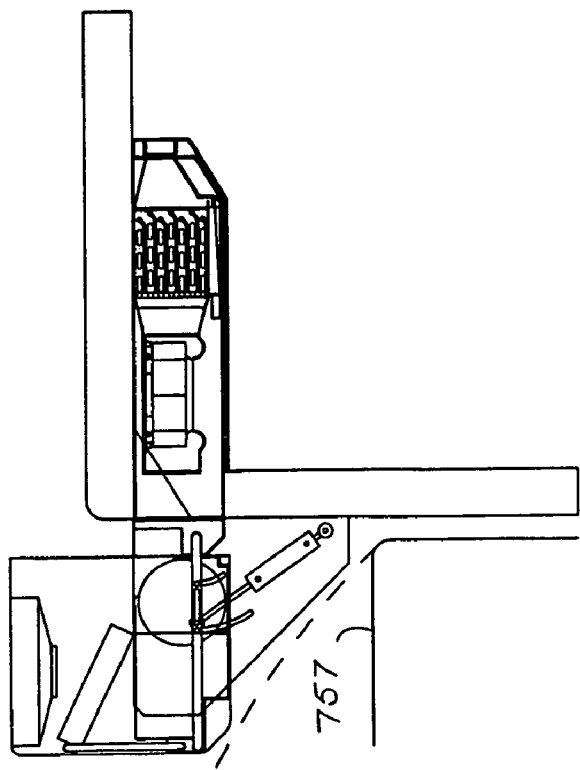
FIGS. 69 and 70 show liftable compressor and evaporator modules for providing access to an engine beneath a tilting cab.
Figure 69:
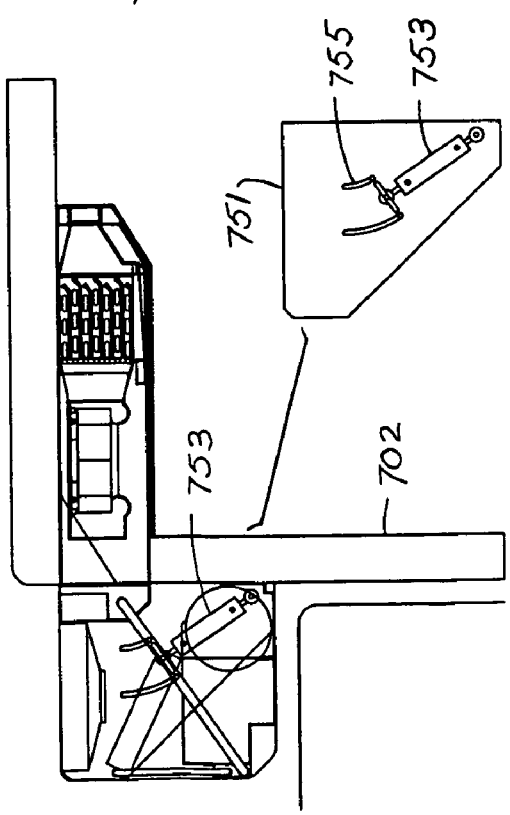

FIGS. 69 and 70 show sides 751 with actuators 753 and guide grooves 755 for raising compressor and condenser modules so that a truck cab 757 may be tilted to reach engine components.

Figure 71:
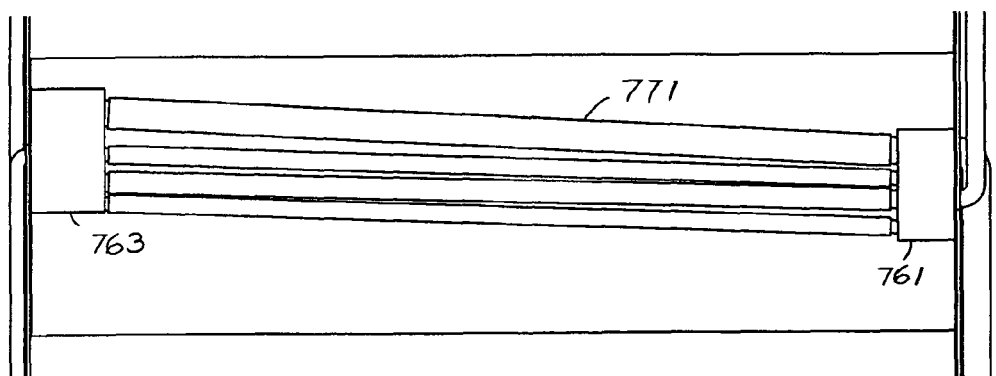

FIG. 71 shows a front elevation in partial view of the fluid harness 711 with mounting blocks 761 and 763, which are also shown in FIG. 60, attached to the compressor module 701.

Figure 72:
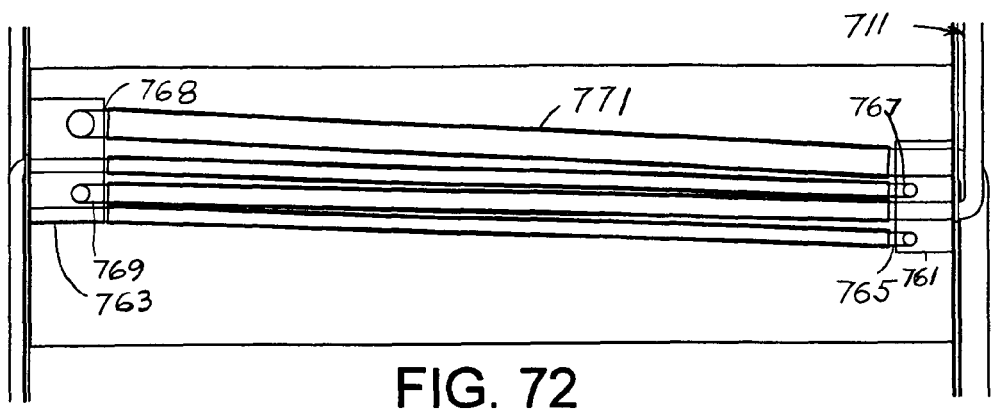
FIGS. 71-73 show twistable tube connections between the compressor module and other modules.

As shown in FIG. 72 in partial cross-section, refrigerant tubes 765 and 767 have ends secured in blocks 761 and have opposite ends passing through blocks 763. Refrigerant tubes 768 and 769 have ends secured in block 763 and have opposite ends passing through block 761. Shell covers 771 on the tubes prevent the tubes from buckling as the tubes twist to allow repositioning of the modules of the refrigeration unit.

Figure 73:
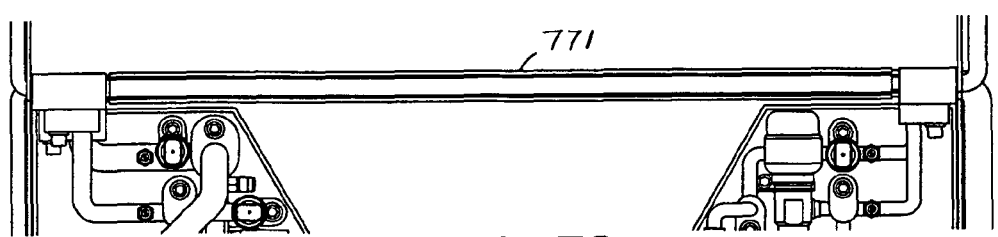

FIG. 73 is a partial view of the tubes and shell covers 771 as appear between the blocks 761 and 763 in FIG. 60.

FIGS. 74 and 75 show two tube connections of the fluid tube harness 711 to the condenser module 709. FIG. 74 shows the tubes 773 and 775. Tube 775 is fixed at one end 777 to the condenser module 709 and is turnable at the other end 779 in bearing sleeve 781. Tube 773 is fixed at one end 783 to the condenser module 709. The other end 785 of tube 773 is turnable in bearing sleeve 787. The twisting of tubes between the fixed ends and the bearing sleeves allows the repositioning of the condenser module 709 with respect to the compressor module. Sleeves 771 are placed over the tubes to prevent buckling of the tubes when they are twisted. Plates 789 at opposite sides of the condenser modules 709 are connected through the guide openings 775 to the actuators 753, as shown in FIG. 69.

Figure 76:
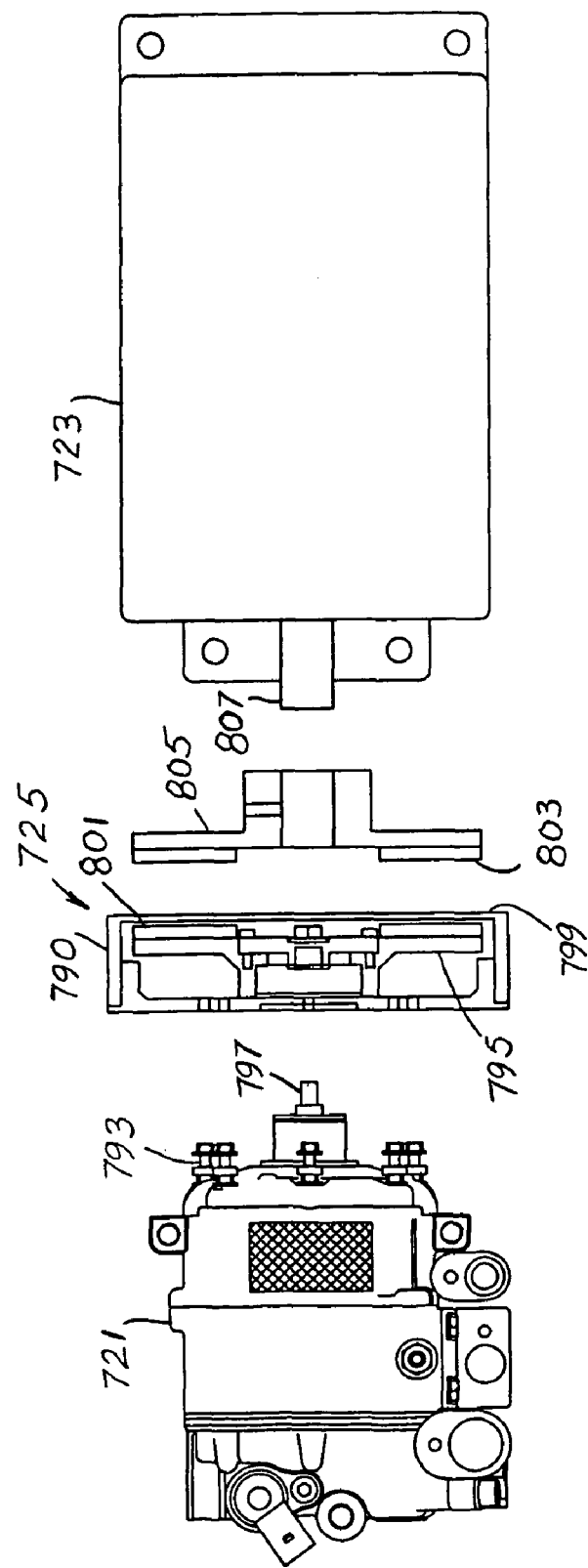
FIG. 76 is an exploded view of the compressor, drive motor and magnetic coupling.
Figure 77:
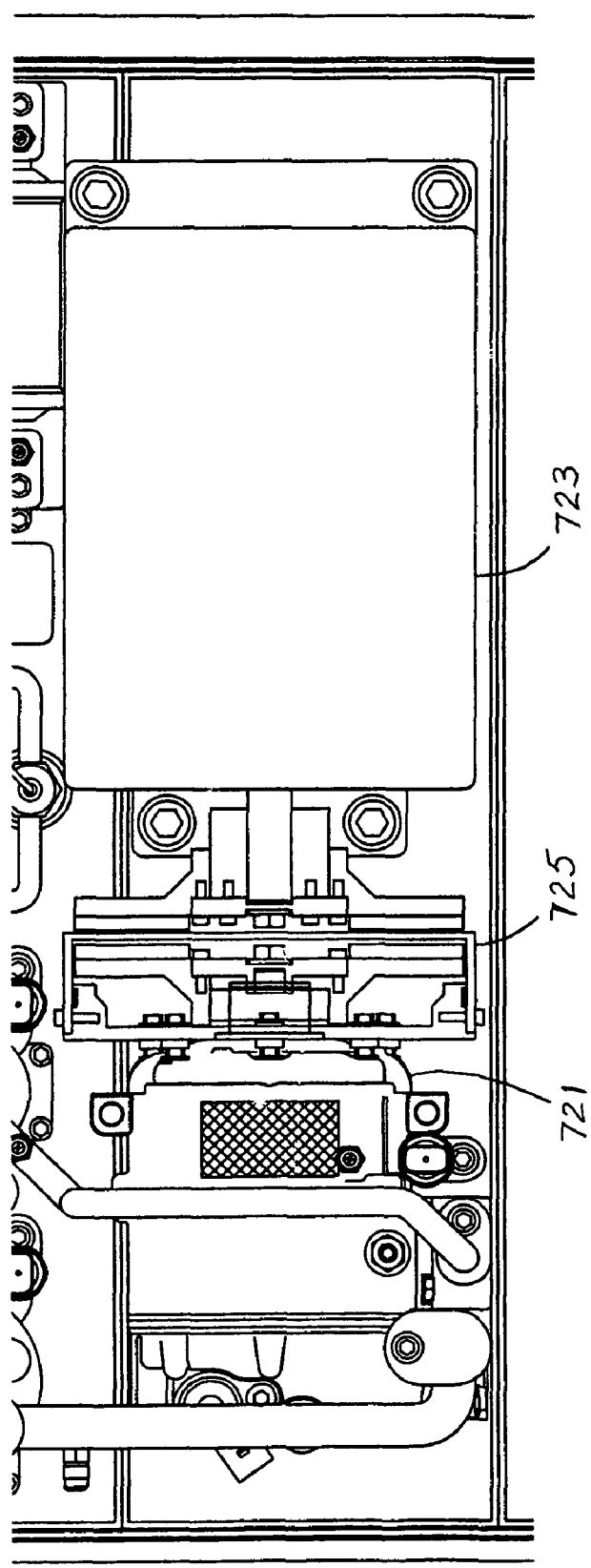
FIG. 77 is an assembled view of the compressor hermetically sealed magnetic drive attached to the compressor and the complemental magnetic drive attached to the motor.

FIGS. 76 and 77 show the motor and compressor connection.

FIG. 76 is an exploded view showing compressor 721 and the motor 723 which are to be coupled by the magnetic drive connection 725. The hermetically sealed chamber 790 has a plate 791 which is secured by bolts 793 to the compressor housing. A first magnetic coupler 795 is connected to the compressor drive shaft 797. The entire chamber 790 is sealed to the compressor, providing a hermetically sealed unit to prevent escape of refrigerant. A thin cover 799 separates the magnets 801 from the magnets 803 on the drive part 805, which is connected to the motor drive shaft 807. The units are shown assembled in FIG. 77.

Figure 78:
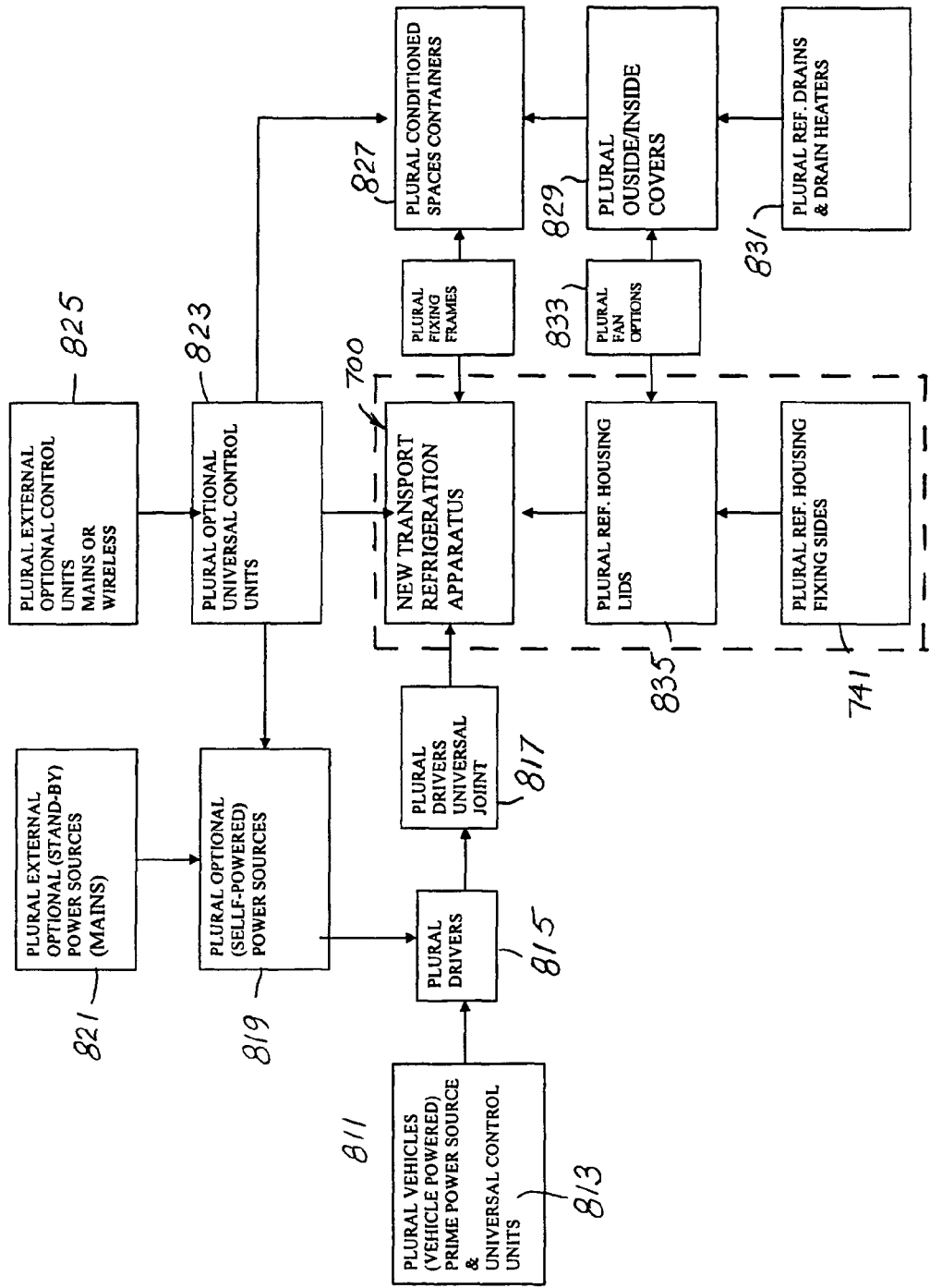
FIG. 78 is a schematic representation of the drives, drive connections and conditioned space containers showing cover, drain, fan, drive and control options.

FIG. 78 schematically shows options of the new refrigeration units. Any number of vehicle drives 811 with universal control units 813 may provide plural drives 815 to plural universal drive joints 817. Optional power sources 819 may be connected to the drives 815, and plural external optional standby power sources and electrical mains may supply the optional power sources 819. Optional control units 823, which are connected to the new refrigeration apparatus 700, may have inputs from external controls 825, external power sources 819 and the containers 827, which have the conditioned spaces. The containers have outside and internal covers 829, and drains and drain heaters 831 are connected to the internal covers. The covers may have fans 833 which force external air through the condenser and internal air through the evaporators. The new transport refrigeration apparatus 700 has the option of having evaporator fans and condenser fans in the lids 835 of the condenser and evaporator modules. Plural housing fixing sides 741 are provided so that the new transport refrigeration apparatus 700 may be arranged and held together and connected to the front wall of a container by mechanical connections of the fixing sides. A tamper evident seal 743 may be provided around the complete transport refrigeration apparatus 700.

Figure 79:
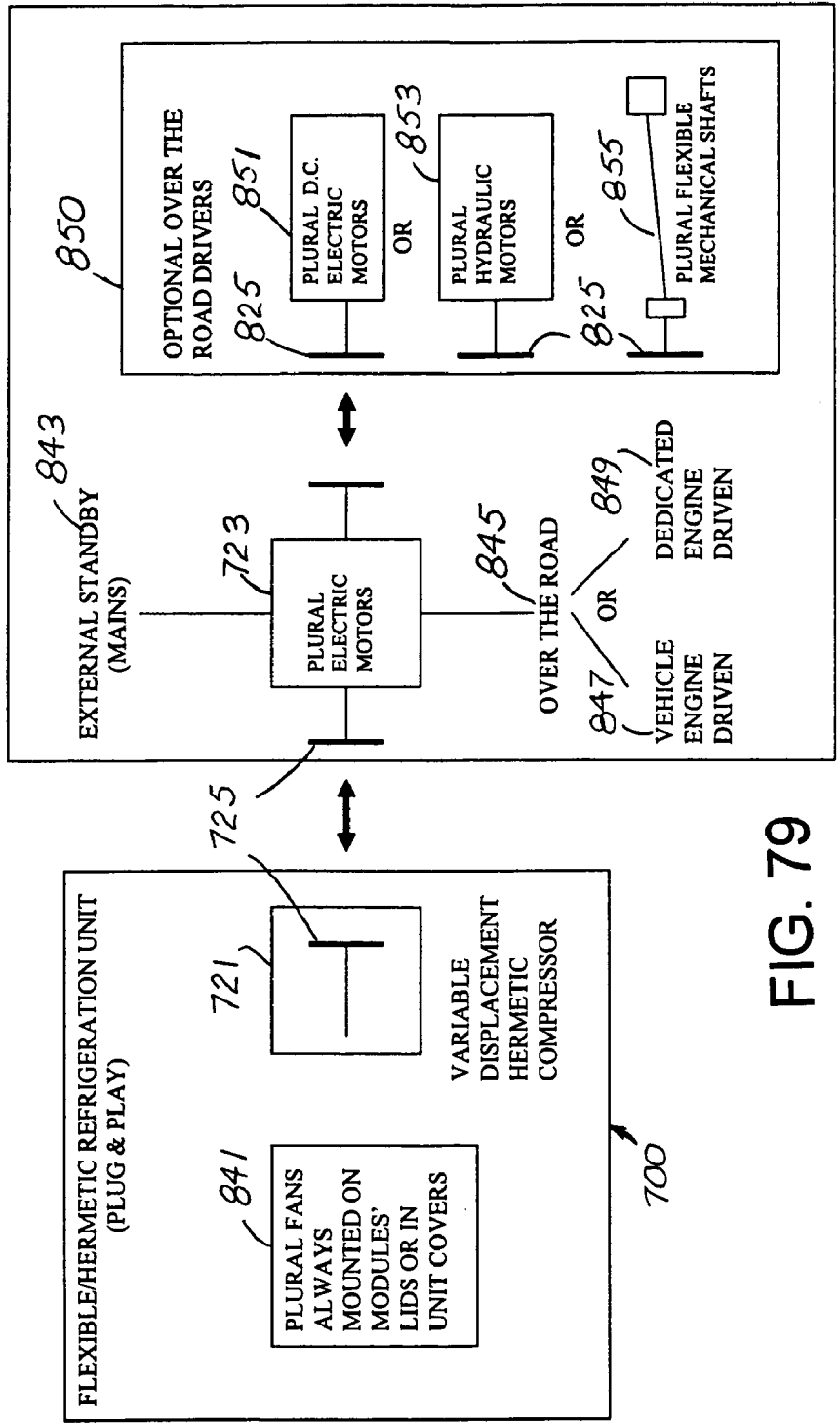
FIG. 79 is a schematic representation of a universally driven transport refrigeration system with magnetic drives for a hermetic magnetic coupler on a compressor.

FIG. 79 schematically represents driver connections for the flexible hermetic refrigeration 700. In that unit fans are always mounted on module lids or in unit covers 841, and the variable displacement hermetic compressor 721 is always driven by a magnetic coupler 725. Plural electric motors 723 drive the magnetic coupler 725. External standby power such as from mains 843 is available to drive the plural electric motors. Over the road 845 the motors are vehicle-engine driven 847 or dedicated-engine driven 849. Optional over-the-road drivers 850 are plural DC electric motors 851, plural hydraulic motors 853, or flexible mechanical shafts 855, which drive the magnetic couplings 825.

Figure 80:
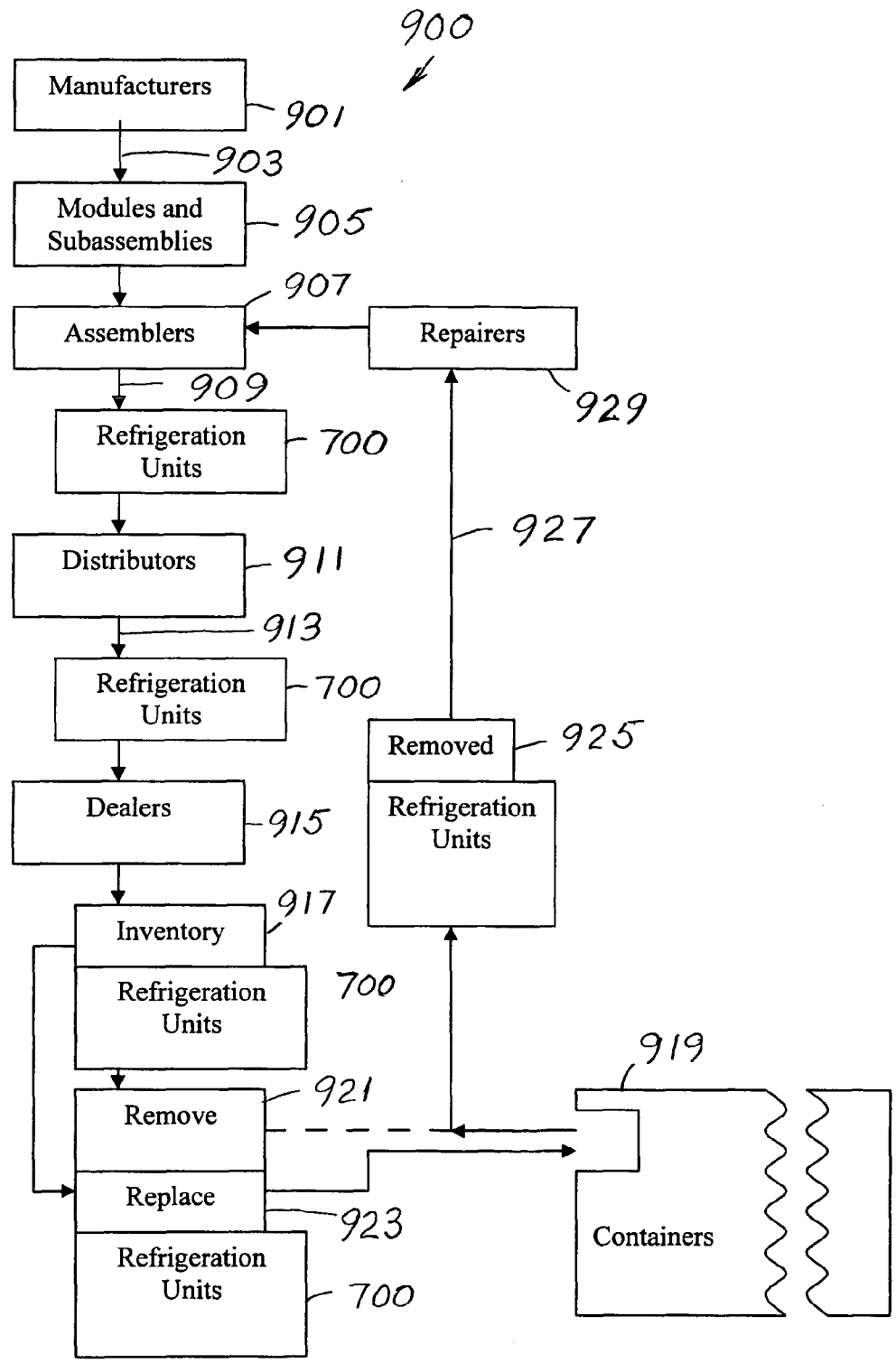
FIG. 80 is a schematic representation of a refrigeration unit supply and replacement system.

As shown in FIG. 80, the transport refrigeration system 900 employs manufacturers 901 which ship 903 modules and subassemblies 905 to assemblers 907. The assemblers ship 909 the self-contained flexible refrigeration units 700 to distributors 911, who in turn ship 913 the refrigeration units 700 to dealers 915. The dealers 915 maintain a limited number of self-contained transport refrigeration systems 700 in inventory 917. When a transport container 919 has problems with a refrigeration unit, the dealers 915 remove 921 the old unit and replace 923 the old unit with a fresh self-contained refrigeration unit 700. The removed refrigeration units 925 are shipped 927 to repairers 929, which employ skilled refrigeration system workers. After the refrigeration units have been repaired, they are transferred 931 to the assemblers to test and reuse the complete refrigeration systems 700 or to remove and test and reuse valid modules and subassemblies 905.

Figure 81:
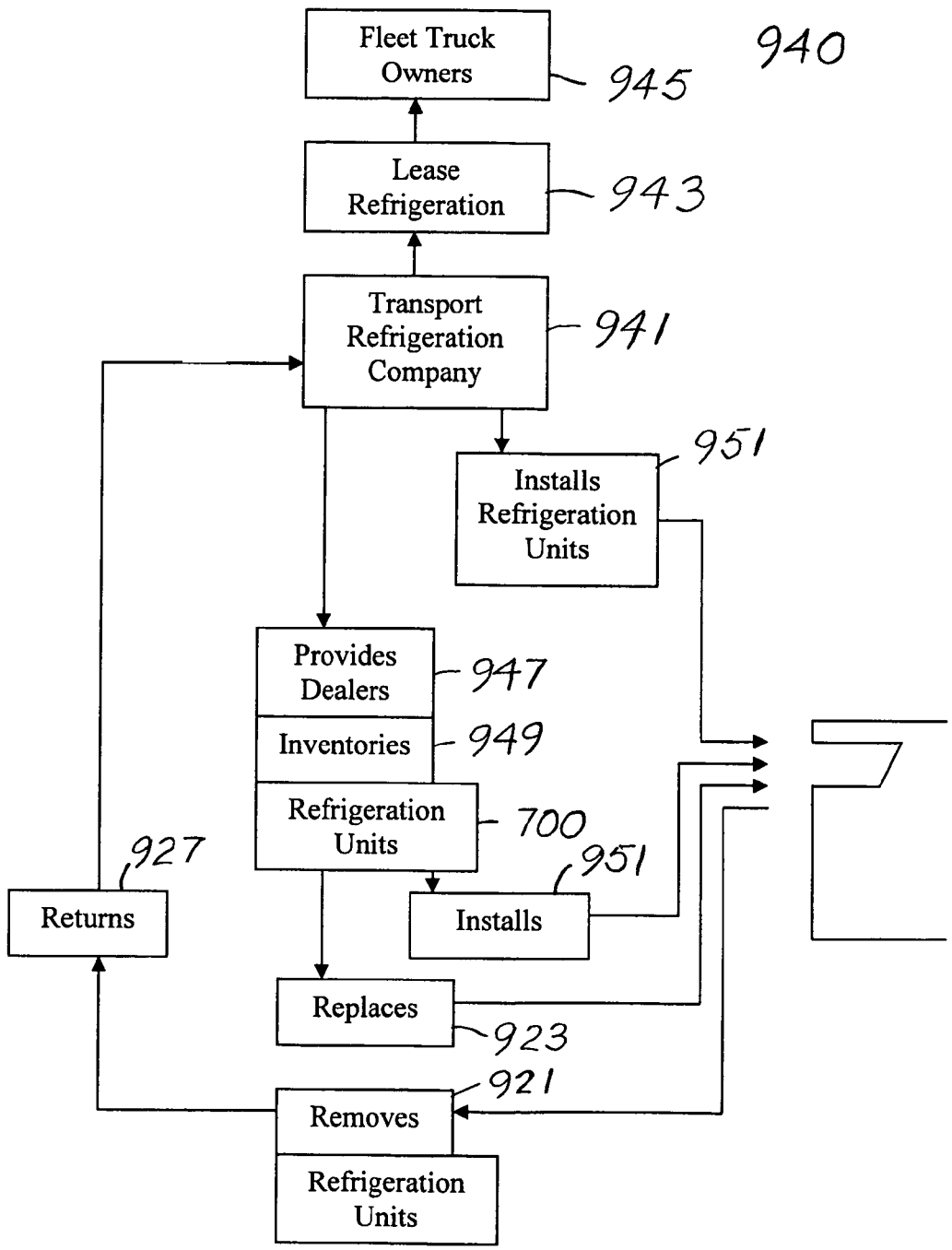
FIG. 81 is a schematic representation of a leasing system for refrigeration.

FIG. 81 shows schematically the leasing system 940. A transport refrigeration company 941 leases refrigeration 943 to fleet owners, truck owners or container owners 945. The transport refrigeration company provides dealers 947 with inventories 949 of complete self-contained transport refrigeration systems 700. The dealers 947 install 951 refrigeration units 700 in containers 919. When a particular container or trailer or other conditioned space has trouble with the refrigeration units, the dealer removes 921 the refrigeration unit and replaces 923 a refrigeration unit 700 from its inventory 949. The dealer returns 927 the removed refrigeration unit to the transport refrigeration company, which then sends another unit for the dealers' inventory.

While the invention has been described with reference to specific embodiments, modifications and variations of the invention may be constructed without departing from the scope of the invention, which is defined in the following claims.

I claim:

1. A refrigeration system comprising:
    a frame for securing in an opening of a conditioned space;
    a mounting for rigidly connecting to the frame;
    removable connectors selectively connecting and disconnecting the mounting from the frame in the opening of the conditioned space;
    a flexible monoblock refrigeration unit having:
    a first heat exchanger module for rigidly connecting to the mounting and having a first heat exchanger for modulating temperature of the conditioned space;
    a compressor module for rigidly connecting to the mounting;
    a refrigerant control assembly connected to the compressor module;
    a second heat exchanger module for rigidly connecting to the mounting;
    a first set of refrigerant connections flexibly connecting the compressor module and the refrigerant control assembly with the first heat exchanger module for communicating refrigerant between the compressor module and the first heat exchanger module; and
    a second set of refrigerant connections flexibly connecting the compressor module and the refrigerant control assembly to the second heat exchanger module;
    wherein the conditioned space is a cargo container having an interior which is the conditioned space, and further comprising an internal foraminous cover extending inward in the interior of the cargo container from near the opening and preventing access to cargo in the container when the refrigeration unit is removed and replaced;
    further comprising a coil in the first heat exchanger module, and an internal fan mounted on the internal cover for moving air in the cargo container through the coil.

2. The system of claim 1, wherein the entire flexible monoblock refrigeration unit is removable from the conditioned space by removing the connectors and removing the mounting from the frame, and wherein an entire replacement refrigeration unit is connectable to the frame in the opening for modulating temperature in the conditioned space.

3. The system of claim 1, wherein the refrigeration system is a transport refrigeration system and multiple complete refrigeration units are inventoried by dealer installers who remove the mounting and defective refrigeration unit, remove the mounting from the modules, align modules of an entire replacement refrigeration unit with the mounting, attach the mounting to modules of a replacement refrigeration unit and replace and exchange an entire defective refrigeration unit with a working refrigeration unit by mechanics having no refrigeration skills.

4. The system of claim 1, wherein the first heat exchanger module and the second heat exchanger module have removable lids and fans mounted in the removable lids.

5. The system of claim 1, wherein the sets of flexible refrigerant connections are rigid twistable refrigerant tubes mounted on axes of flexible interconnections between the compressor module and the first heat exchanger module, and between the compressor module and the second heat exchanger.

6. The system of claim 1, wherein the compressor module further comprises a variable or fixed displacement compressor and a universal drive connection connected to the compressor.

7. The system of claim 1, further comprosing a condensate collector in the internal foraminous cover, a drain connected to the cover for conducting condensate away from the conditioned space, and a heater on the drain for keeping the drain free of ice.

8. The system of claim 1, further comprising an external cover mounted on an outside of the cargo container near the opening for covering the compressor module and the second heat exchanger module.

9. The system of claim 8, further comprising a heat exchanger coil in the second heat exchanger module, and an external fan connected to the external cover for moving air through the second heat exchanger coil.

10. The system of claim 1, wherein the refrigerant connections are flexible refrigerant connections, whereby the replacement refrigeration modules have flexible interconnections and the modules are repositioned with respect to each other when connecting the refrigeration modules on the mounting, and whereby a replacement refrigeration unit that replaces a removed unit is reconfigured to match a configuration of the removed refrigeration unit.

11. The system of claim 1, wherein the conditioned space further comprises an enclosure and an internal foraminous cover is connected to the enclosure for separating the first heat exchanger module from the interior of the enclosure, and a removable external cover is connected for shielding the compressor and second heat exchanger modules.

12. The system of claim 1, wherein the control assembly further comprises a compressor temperature control subassembly.

13. The system of claim 1, further comprising a vehicle carrying the conditioned space for transporting cargo in the space, a compressor driver connection connected to a compressor on the compressor module, a compressor driver connected to the compressor driver connection, a power source connected to the driver, an electronic control unit connected to the vehicle and to the compressor module, sensors connected to the interior and exterior of the conditioned space and a first heat exchanger temperature control subassembly mounted in the first heat exchanger module and connected to the sensors and to the electronic control unit.

14. The system of claim 1, wherein the mounting has side plates for attaching to sides of the modules for mounting the side plates on the frame.

15. The system of claim 1, further comprising a compressor on the compressor module and a universal magnetic coupling connected to the compressor for driving the compressor by a complementary magnetic coupling attached to a driver for the compressor.

16. The system of claim 1, wherein the refrigerant connections are rigid twistable tubes with rigid connections at ends of the tubes.

17. The system of claim 1, wherein the refrigerant connections are tubes twistable around axes of the tubes, the tubes having middle portions extending along sides of the modules and having intermediate portions extending through axially aligned guides at opposite sides of the modules and having end portions extending across the modules and fixed to rigid end connectors at ends of the tubes.

18. The system of claim 17, wherein the end connectors are offset from an axis of the guides and the end portions of the tubes are twistable between the guides and the rigid end connectors.

19. A refrigeration method, comprising:
providing a self-contained refrigeration unit;
providing a first heat exchanger module in the unit;
providing a second heat exchanger module in the unit;
providing a compressor module in the unit;
providing a refrigerant control assembly with the compressor module in the unit;
connecting the refrigerant control assembly to the compressor module;
flexibly interconnecting the first heat exchanger module to the compressor module and refrigerant control assembly;
flexibly interconnecting the second heat exchanger module to the compressor module and refrigerant control assembly;
providing a first set of flexible refrigerant connections between the first heat exchanger module and the compressor module and refrigerant control assembly;
providing a second set of flexible refrigerant connections between the compressor module and control assembly and the second heat exchanger module; and
providing a rigid mounting for connecting to the modules and creating a monoblock refrigeration unit,
wherein the refrigeration method is a transport refrigeration method, and further comprising leasing refrigeration to container, truck and fleet owners for lease periods according to refrigeration needs, providing complete self-contained transport refrigerator units, installing the refrigeration units in containers, trucks and fleets owned or operated by the container, truck and fleet owners, supplying limited non complex inventories of the complete self-contained transport refrigeration units to dealers, removing malfunctioning complete self-contained transport refrigeration units from individual ones of the containers or trucks by the dealers, and replacing the complete self-contained transport refrigeration units by complete self-contained replacement refrigeration units by the dealers during the lease periods.

20. The method of claim 19, further comprising providing a variable or fixed displacement compressor and a universal drive connection to the compressor on the compressor module.

21. The method of claim 20, further comprising:
providing a connecting frame on an opening of a conditioned space;
mounting the first heat exchanger module, the second heat exchanger module and the compressor module on the mounting;
connecting the mounting to the frame with removable connectors; and
connecting a compressor driver to the drive connection.

22. The method of claim 21, further comprising disconnecting the driver from the universal drive connection, disconnecting and removing the connectors from the frame, removing the mounting and the unit from the frame on the conditioned space, storing the removed unit, replacing a different unit from an inventory on the enclosure by arranging and connecting modules of the replacement unit on the mounting, connecting the mounting on the replacement unit to the frame with the connectors, and connecting the driver to the drive connection of the replacement unit.

23. The method of claim 22, further comprising maintaining the inventory of replacement units at a dealer, and wherein the removing and replacing the units on the enclosure is accomplished by workers unskilled in refrigeration, and further comprising shipping the removed units from the dealer to a distributor and sending replacement units from the distributor to the dealer.

24. The method of claim 19, wherein the complete self-contained transport refrigeration units are monoblock transport refrigeration units.

25. The method of claim 19, wherein the complete self-contained transport refrigeration units are flexible monoblock transport refrigeration units.

\* \* \* \* \*